(12) United States Patent
Ide et al.

(10) Patent No.: US 11,977,693 B2
(45) Date of Patent: May 7, 2024

(54) POSITION INDICATOR AND INPUT SYSTEM

(71) Applicant: Wacom Co., Ltd., Saitama (JP)

(72) Inventors: Nobutaka Ide, Saitama (JP); Koji Yano, Saitama (JP); Takahiko Hoen, Saitama (JP); Mu-Tzu Chen, Saitama (JP); Tadakuni Tsubota, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/180,043

(22) Filed: Mar. 7, 2023

(65) Prior Publication Data

US 2023/0221815 A1 Jul. 13, 2023

Related U.S. Application Data

(63) Continuation of application No. PCT/JP2021/033242, filed on Sep. 10, 2021.
(Continued)

(30) Foreign Application Priority Data

Jun. 25, 2021 (JP) .................. 2021-105774
Jun. 25, 2021 (JP) .................. 2021-105775
Jun. 25, 2021 (JP) .................. 2021-105776

(51) Int. Cl.
*G06F 3/038* (2013.01)
*G06F 3/02* (2006.01)
(Continued)

(52) U.S. Cl.
CPC ............. *G06F 3/0383* (2013.01); *G06F 3/02* (2013.01); *G06F 3/03545* (2013.01); *G06F 3/0442* (2019.05)

(58) Field of Classification Search
None
See application file for complete search history.

(56) References Cited

U.S. PATENT DOCUMENTS

2012/0256830 A1* 10/2012 Oda .................. G06F 3/041
345/157
2014/0340326 A1* 11/2014 Kameyama ......... G06F 3/03545
345/173

FOREIGN PATENT DOCUMENTS

JP 2014222488 A 11/2014
JP 2014222492 A 11/2014
(Continued)

OTHER PUBLICATIONS

International Search Report, dated Nov. 22, 2021, for International Patent Application No. PCT/JP2021/033242. (11 pages) (with English Translation).

*Primary Examiner* — Nicholas J Lee
(74) *Attorney, Agent, or Firm* — Seed IP Law Group LLP

(57) ABSTRACT

A position indicator that is used with a position detection device including a position detection sensor, the position indicator including a first function module and a second function module. The first function module includes a core body that, in operation, is brought into contact with an input surface for position detection in the position detection sensor, and a position detection signal transmission circuit, in operation, that transmits a position detection signal to the position detection sensor. The second function module includes a first function circuit that, in operation, generates characteristic selection information corresponding to a characteristic of the core body or a characteristic of the input surface and transmits the characteristic selection information, or a second function circuit that, in operation, generates a stimulus corresponding to the characteristic selection information such that a user who is holding the position indicator audibly or tactilely perceives the stimulus.

17 Claims, 24 Drawing Sheets

Related U.S. Application Data

(60) Provisional application No. 63/094,288, filed on Oct. 20, 2020.

(51) Int. Cl.
*G06F 3/0354* (2013.01)
*G06F 3/044* (2006.01)

(56) References Cited

FOREIGN PATENT DOCUMENTS

| | | |
|---|---|---|
| JP | 2015225527 A | 12/2015 |
| JP | 2016184444 A | 10/2016 |
| JP | 2019148923 A | 9/2019 |
| WO | WO 2016031329 A1 | 3/2016 |
| WO | WO 2017110362 A1 | 6/2017 |

* cited by examiner

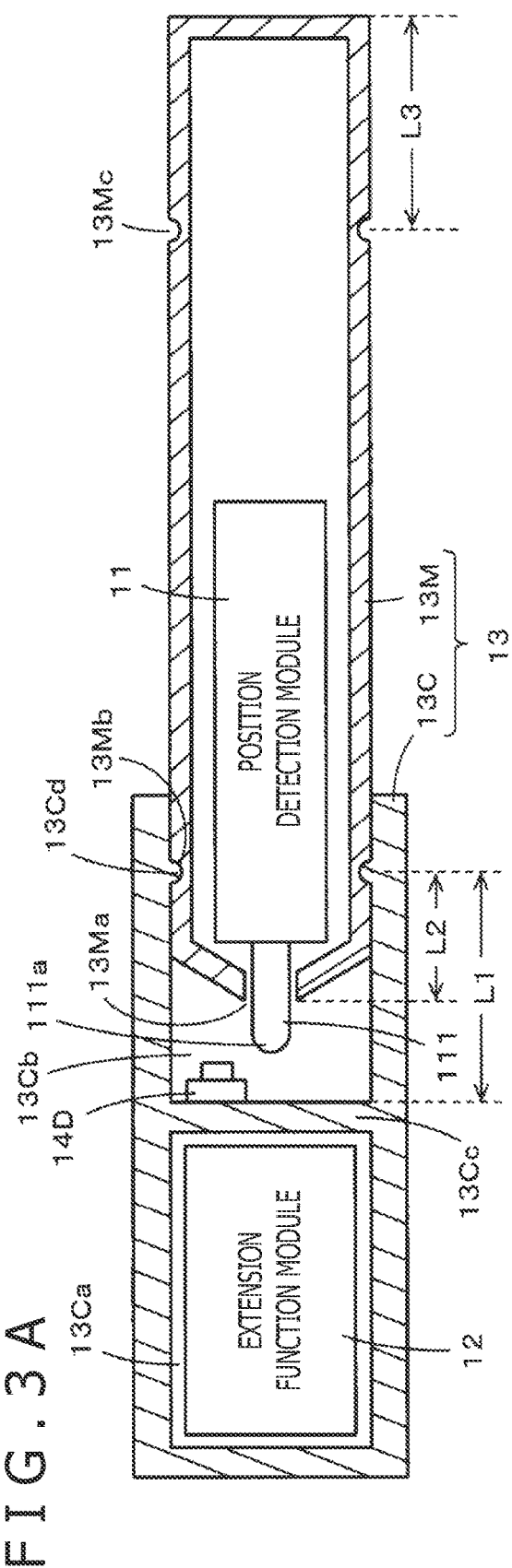

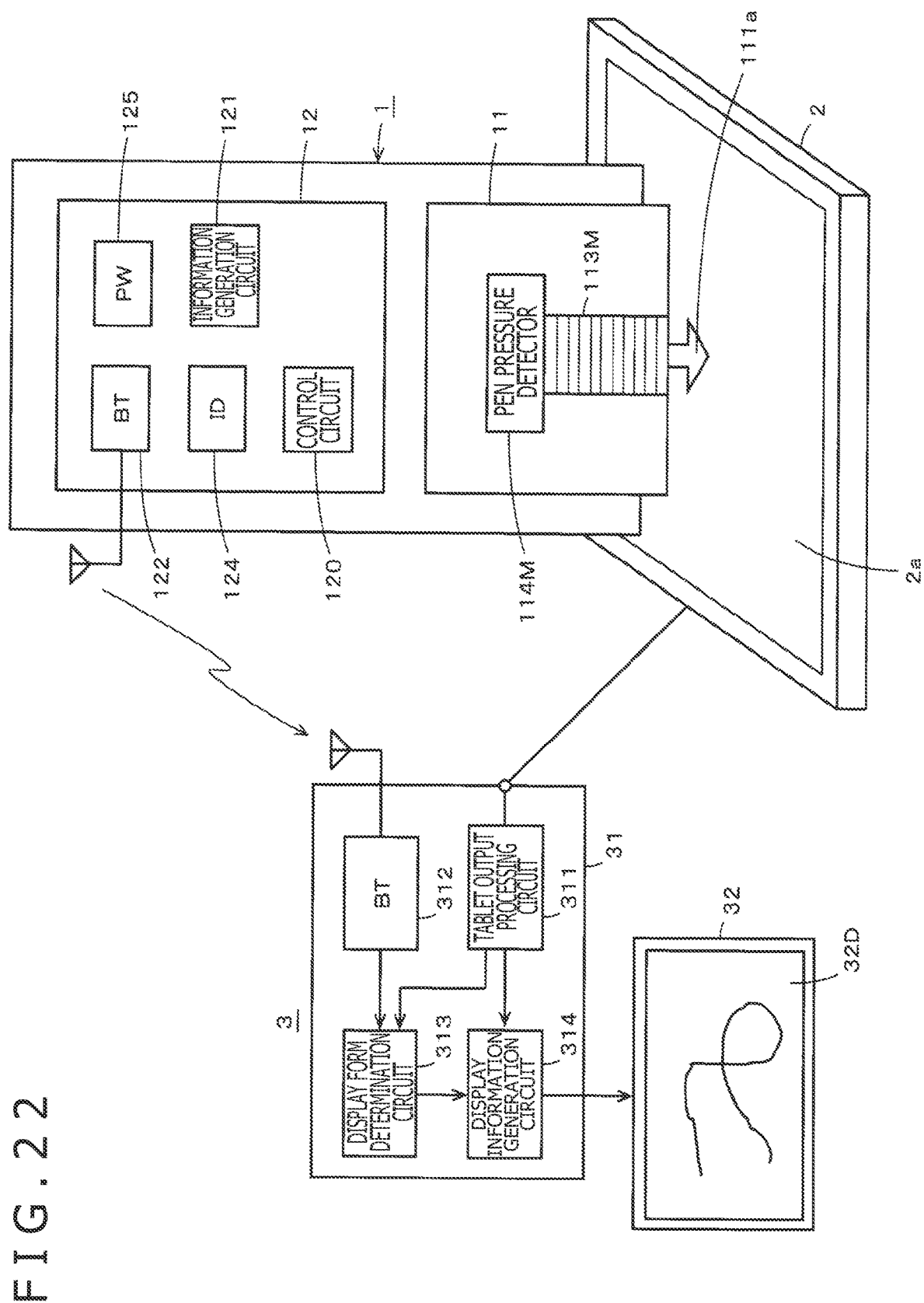

FIG.24A
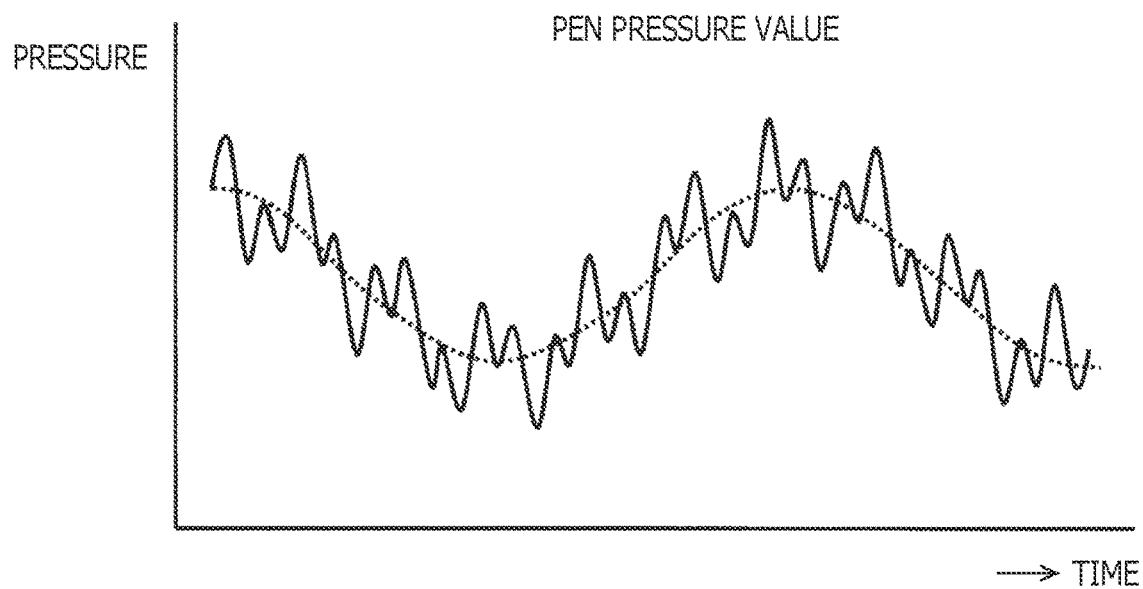
FIG.24B
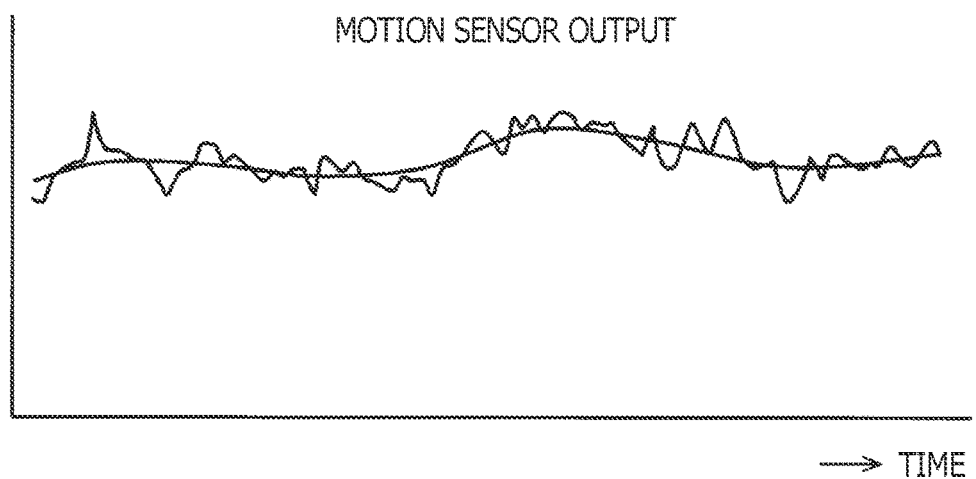
FIG.25
| MOTION DETECTION OUTPUT | MATERIAL OF INPUT SURFACE |
|---|---|
| TYPE 1 | GLASS |
| TYPE 2 | HARD RESIN |
| TYPE 3 | SOFT RESIN |
| TYPE 4 | PAPER |
| ⋮ | ⋮ |

FIG. 30
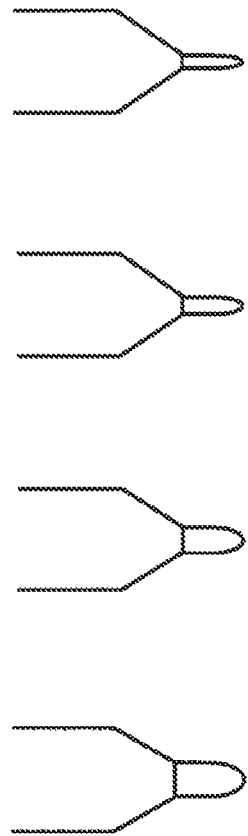
| MATERIAL OF INPUT SURFACE \ CORE DENSITY/HARDNESS | B | HB | 2H | 3H |
|---|---|---|---|---|
| GLASS | SP1, VB1 | SP2, VB2 | SP3, VB3 | SP4, VB4 |
| KENT PAPER | SP5, VB5 | SP6, VB6 | SP7, VB7 | SP8, VB8 |
| DRAWING PAPER | SP9, VB9 | SP10, VB10 | SP11, VB11 | SP12, VB12 |
| JAPANESE PAPER | SP13, VB13 | SP14, VB14 | SP15, VB15 | SP16, VB16 |
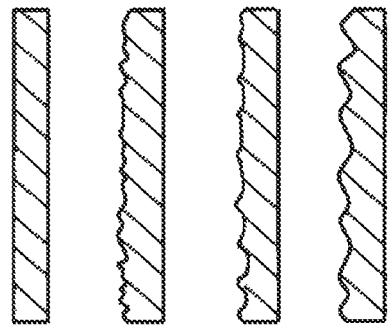

POSITION INDICATOR AND INPUT SYSTEM

BACKGROUND

Technical Field

The present disclosure relates to a position indicator that is used with a position detection device including a position detection sensor. Also, the present disclosure relates to an input system including a position indicator, a position detection device, and an information processing device.

Description of the Related Art

Mice and keyboards have been used as operation input sections of an information processing device such as a personal computer (hereinafter, referred to as a PC). Meanwhile, position indicators to be used with a position detection device including a position detection sensor have been used as operation input sections to input characters and the like or draw a picture and the like. A position indicator that is an input tool including a stick-like casing and having a pen-like shape is generally called an electronic stylus.

When a position on an input surface that is provided in a detective region of a position detection sensor is indicated by a position indicator such as an electronic stylus, a position detection device detects the coordinates of the position in the detective region of the position detection sensor indicated by the position indicator. A motion trace (writing trace) of the position indicated by the position indicator is formed as writing trace data indicating detected continuous position coordinates. On the basis of the writing trace data, the writing trace is displayed on a display screen.

Display screen-equipped input systems, in which position indicators are used as operation input sections, are categorized into a type including a position indicator and a digitizer device or tablet device that has a display screen-equipped display device function, a position detection device function, and an information processing device function, and a type including a digitizer or tablet constituting a position detection device equipped with no display screen, an information processing device such as a PC to which the digitizer or tablet is connected and which has a display screen, and a position indicator.

For the position indicators or electronic styluses, operability and use forms that are equivalent to those of a conventional writing tool such as a pencil with respect to a writing medium such as a paper sheet have been desired. In recent years, some people desire to use an electronic stylus having a conventional shape and a conventional casing that have been used for pencils or ball-point pens which form writing traces on writing mediums such as paper sheets. Specifically, an electronic stylus body part having all the electronic stylus functions is formed into a cartridge (electronic stylus cartridge) structure, and the cartridge of the electronic stylus body part is formed into the same shape (the same width, the same length, and an analogous pen tip side configuration) as a ball-point pen refill. If so, the electronic stylus cartridge can be installed in an exterior case (outer housing) of a ball-point pen.

On the basis of this idea, an electronic stylus cartridge having the same shape as a ball-point pen refill has been provided (see WO2016/031329, for example). This electronic stylus cartridge can be used in the same manner as a ball-point pen which is a conventional writing tool, and there is no change from the use feeling of a conventional writing part (the electronic stylus can be used like a conventional writing part). That is, since the electronic stylus is formed by installing a cartridge into a casing of a ball-point pen which is a writing tool, an input to an electronic device can be performed while the same use feeling as a ball-point pen is given.

WO2016/031329 further proposes an electronic stylus in which a plurality of electronic stylus cartridges are installed into an exterior case (outer housing) of a multi-color ball-point pen. In this case, unique identification information (cartridge ID) is given to each of the electronic stylus cartridges, the identification information is transmitted to a position detection device and an information processing device, so that the information processing device can identify an electronic stylus cartridge selected by a knock operation. Accordingly, the color, the line thickness, and the like of a writing trace of the electronic stylus can be changed.

In addition, a pencil-type electronic stylus has also been implemented by providing a hole in the axial direction of a wooden pencil casing and inserting an electronic stylus cartridge into the hole. Moreover, a pencil-type electronic stylus with an electronic eraser attached on a tail end, which is opposite to a pen tip side, has been proposed. Specifically, two electronic stylus cartridges are used and mounted on the tip end and the tail end, and different signal frequencies are set for the tip end and the tail end to be distinguished from each other, or the electronic stylus cartridges are caused to transmit different pieces of identification information (cartridge IDs) such that the electronic stylus cartridge on the tip end and the electronic stylus cartridge on the tail end are distinguished from each other. In a case where an input is performed with the electronic stylus cartridge on the tip end, the input may be processed as motion of writing a character or drawing a picture, for example. In a case where an input is performed with the electronic stylus cartridge on the tail end, the input may be processed as motion of deleting the inputted character or picture.

In an input system using a conventional electronic stylus, display attributes, for example, the line type, the line width, and the line density, of a writing trace of an electronic stylus to be displayed on a display screen of a tablet device or a PC, are usually not indicated by the electronic stylus side, but are selected by a user using an information processing device function of the tablet device or the PC. Further, a configuration of also allowing the user to select the type of a writing medium by using the information processing device function of the tablet device or the PC can be implemented.

However, when such a user's operation of selecting the line type, the line width, and the line density of the writing trace as well as the type of a writing medium, for example, paper, is performed through the tablet device or the PC, an indication input operation using the electronic stylus is stopped because the selecting operation needs to be a quite different operation from the indication input operation, which is inconvenience. Moreover, this causes a problem that the efficiency and smoothness of a writing input work using the electronic stylus are deteriorated.

Hardness of a pen tip (hardness of a core body) of an electronic stylus may be previously determined in correspondence with identification information of the electronic stylus. On the basis of the identification information received from the electronic stylus, a tablet device or a PC may determine the hardness of the core body of the electronic stylus and recognize a line type and a line width corresponding to the determined hardness of the core body, so that a writing trace is displayed with the recognized line type and line width.

The density and line width of a writing trace of a writing tool such as a pencil depend not only on the hardness of a core of the pencil but also on a characteristic of a writing medium such as paper during writing. Also for electronic styluses, operability and use forms that are equivalent to those of a conventional writing tool such as a pencil with respect to a writing medium such as a paper sheet have been desired as previously explained.

However, there has been a problem that, only with identification information on an electronic stylus, the hardness of the core body of the electronic stylus and one specific writing medium can be designated, but an optional writing medium during writing cannot be designated.

BRIEF SUMMARY

In view of the above problems, an object of the present disclosure is to implement a position indicator with which a writing trace corresponding to an actual writing input state or a writing trace under a certain state designated by a user can be displayed on an information processing device side, with a simple configuration.

Another object of the present disclosure is to implement an input system in which a writing trace corresponding to an actual writing input state or a writing trace under a certain state designated by a user can be displayed on an information processing device side.

A further object of the present disclosure is to, in a case where a writing trace corresponding to an actual writing input state or a writing trace under a certain state designated by a user can be displayed, feed back to the user a feeling that is obtained at the time of writing input corresponding to the displayed writing trace.

In order to solve the above problems, there is provided a position indicator that is used with a position detection device including a position detection sensor, the position indicator including a first function module and a second function module. The first function module includes a core body that is brought into contact with an input surface for position detection in the position detection sensor, and a position detection signal transmission circuit that transmits a position detection signal to the position detection sensor. The second function module includes a first function circuit that generates characteristic selection information corresponding to a characteristic of the core body and/or a characteristic of the input surface and transmits the generated characteristic selection information to an outside, and/or a second function circuit that generates a stimulus corresponding to the characteristic selection information such that a user who is holding the position indicator audibly and/or tactilely perceives the stimulus.

In the position indicator having the above configuration, the second function module generates the characteristic selection information corresponding to the characteristic of the core body and/or the characteristic of the input surface, and the generated characteristic selection information is transmitted to an outside which is an information processing device, for example.

Accordingly, a writing trace having a line width and a line density corresponding to the characteristic selection information transmitted from the position indicator can be displayed at the information processing device. Specifically, a writing trace corresponding to a characteristic of the core body and a characteristic of the input surface under the actual use environment or a writing trace corresponding to a characteristic of the core body and a characteristic of the input surface designated by the user can be displayed at the information processing device.

Further, in the position indicator, the second function module generates a stimulus corresponding to the characteristic selection information such that the user who is holding the position indicator audibly and/or tactilely perceives the stimulus. Accordingly, the user can get a writing-input-time feeling corresponding to the characteristic of the core body and/or the characteristic of the input surface.

Moreover, there is provided an input system including a position indicator, a position detection device including a sensor for detecting a position indicated by the position indicator, and an information processing device. The position indicator includes a core body that is brought into contact with an input surface for position detection in the sensor, a position detection signal transmission circuit that transmits a position detection signal to the sensor, a characteristic selection information generation circuit that generates characteristic selection information corresponding to a characteristic of the core body and/or a characteristic of the input surface, and a transmission circuit that transmits the characteristic selection information generated by the characteristic selection information generation circuit, to an external device. The position detection device detects a position indicated by the position indicator, on the basis of reception of the position detection signal through the sensor, and supplies information regarding the detected position indicated by the position indicator to the information processing device. The information processing device acquires the characteristic selection information transmitted from the position indicator and displays, in a display form corresponding to the acquired characteristic selection information, a writing trace of the position indicator based on the information regarding the position indicated by the position indicator, the information being received from the position detection device.

According to the input system having the above configuration, the information processing device uses the characteristic selection information generated by the position indicator, so that a writing trace of the position indicator based on information regarding the position indicated by the position indicator can be displayed as a writing trace corresponding to an actual writing input state or a writing trace obtained under a certain state designated by the user.

Furthermore, there is provided a position indicator that is used with a position detection device including a position detection sensor, the position indicator including a core body that is brought into contact with an input surface for position detection in the position detection sensor, a position detection signal transmission circuit that transmits a position detection signal to the position detection sensor, and a stimulus generation circuit that generates a stimulus such that a user who is holding the position indicator audibly and/or tactilely perceives the stimulus. The stimulus generation circuit generates a stimulus corresponding to a state change that occurs in the position indicator during an input operation with the core body being in contact with the input surface.

In the position indicator having the above configuration, a stimulus corresponding to a state change that occurs in the position indicator during an input operation with the core body being in contact with the input surface is generated. Accordingly, the user can get a writing-input-time feeling corresponding to the characteristic of the core body and/or the characteristic of the input surface.

BRIEF DESCRIPTION OF THE SEVERAL VIEWS OF THE DRAWINGS

FIGS. 3A and 3B are diagrams depicting another configuration example of the position indicator according to the embodiment of the present disclosure;

FIG. 22 is a diagram depicting a configuration example of the input system according to the embodiment of the present disclosure, the input system using the position indicator according to the embodiment of the present disclosure;

FIGS. 24A and 24B are diagrams for explaining the processing operation example in the input system according to the embodiment of the present disclosure, the input system using the position indicator according to the embodiment of the present disclosure;

FIG. 25 is a diagram for explaining the processing operation example in the input system according to the embodiment of the present disclosure, the input system using the position indicator according to the embodiment of the present disclosure;

FIG. 30 is a diagram for explaining the configuration example of FIG. 29; and

DETAILED DESCRIPTION

Hereinafter, a position indicator according to an embodiment of the present disclosure as well as an input system according to an embodiment of the present disclosure, the input system using the position indicator according to the embodiment, will be explained with reference to the drawings.

Figure 1:
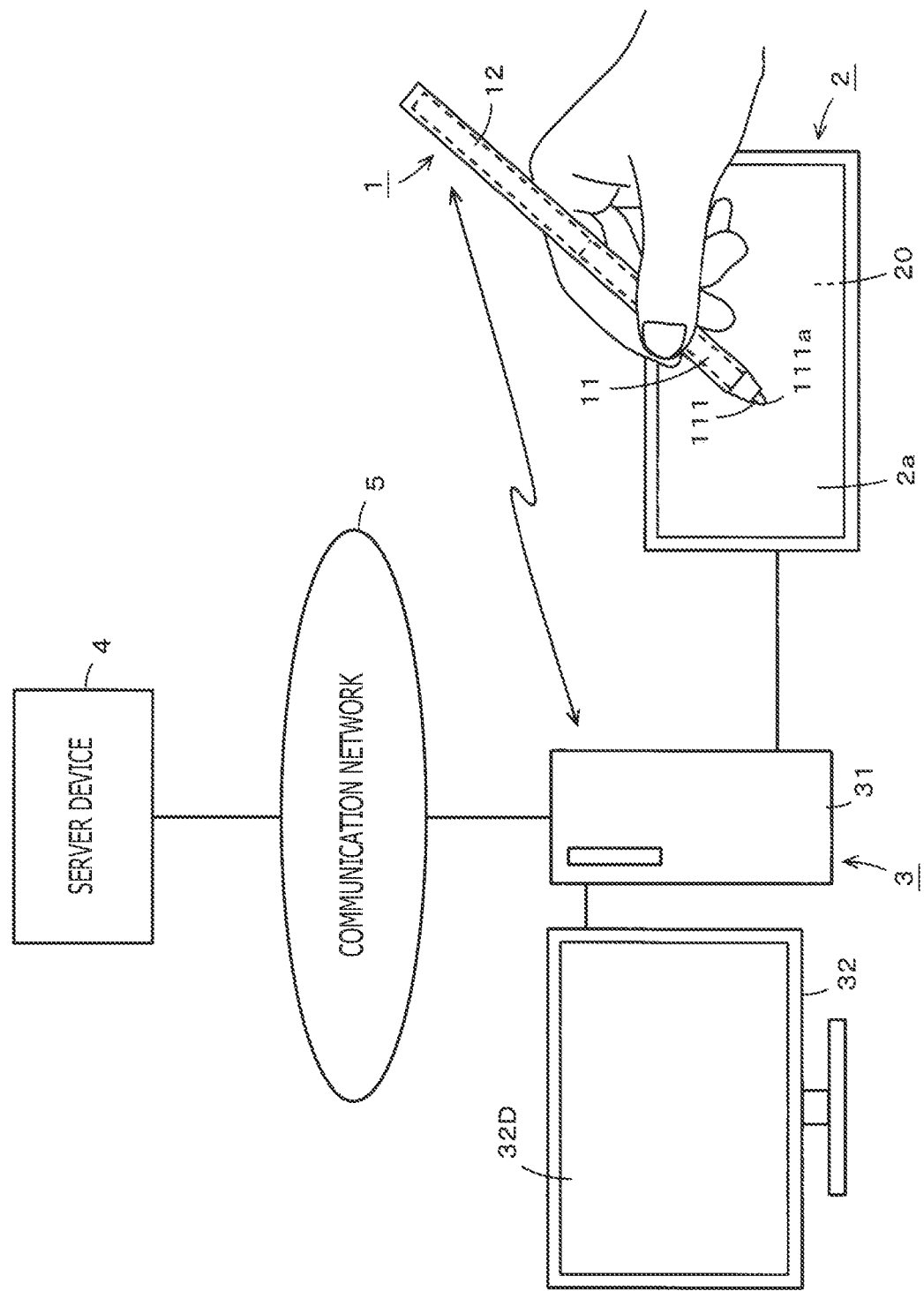
FIG. 1 is a diagram depicting a general configuration example of an input system according to an embodiment of the present disclosure, the input system using a position indicator according to an embodiment of the present disclosure.

FIG. 1 is a diagram depicting a configuration example of an input system according to an embodiment. The input system according to the present embodiment includes an electronic stylus 1 which is an example of the position indicator according to the embodiment, a tablet 2 which constitutes an example of a position detection device, and a PC 3 which constitutes an example of an information processing device.

The tablet 2 includes a position detection sensor 20 that is disposed on a rear side of an input surface 2a for receiving an indication input from the electronic stylus 1, and further includes a position detection circuit (not depicted in FIG. 1) that is connected to the position detection sensor 20. The position detection circuit detects, on the input surface 2a, a position (position coordinates) indicated by the electronic stylus 1 on the basis of a position detection signal with which the electronic stylus 1 and the position detection sensor 20 interact with each other. Signal interaction including a position detection signal between the electronic stylus 1 and the position detection sensor 20 may be performed by an electromagnetic induction method or by a capacitive coupling method.

The tablet 2 is connected to the PC 3, and supplies detection information (hereinafter, position detection information) regarding the position (position coordinates) on the input surface 2a indicated by the electronic stylus 1 and information such as those described later, to the PC 3. The tablet 2 and the PC 3 may be connected to each other in a wired or wireless manner. In the example in FIG. 1, the tablet 2 is not equipped with a display screen.

The PC 3 is formed by connecting a display device 32 to an information processing device part 31. The information processing device part 31 connected to the tablet 2 receives the position detection information from the tablet 2, generates information for displaying a writing trace as a continuous time change of the position on the input surface 2a indicated by the electronic stylus 1 (as a trace of the position on the input surface 2a indicated by the electronic stylus 1), and displays the information on a display screen 32D of the display device 32.

In the present embodiment, from the electronic stylus 1 and the tablet 2, the PC 3 receives, separately from the position detection information, position detection-related information which is supplied from the electronic stylus 1 or the tablet 2 to the PC 3 when an indication is inputted to the input surface 2a by the electronic stylus 1. The position detection-related information supplied from the tablet 2 is pen pressure information or identification information received from the electronic stylus 1. The position detection-related information supplied from the electronic stylus 1 will be explained later.

When displaying, on the display screen 32D of the display device 32, a writing trace or the like based on the position detection information received from the tablet 2, the information processing device part 31 of the PC 3 uses the position detection-related information received from the electronic stylus 1 and/or the tablet 2. In this case, the information processing device part 31 may generate and use information based on the position detection-related information, instead of directly using the position detection-related information, in order to determine display attributes for displaying the writing trace or the like. For example, as examples of the position detection-related information, pen attributes such as a pen type, core body hardness, a core body width, and a core body shape are determined in advance in correspondence with the identification information supplied from the electronic stylus 1. The information processing device part 31 includes a storage device for table information for obtaining the pen attributes from the identification information supplied from the electronic stylus 1.

The table information may previously be stored in the information processing device part 31. However, in the present example, a server device 4 for providing the table information is connected to a communication network 5, and the information processing device part 31 previously accesses the server device 4 via the communication network 5, and downloads and stores the table information.

General Explanation of Electronic Stylus 1 Embodying Position Indicator

The electronic stylus 1 of the present embodiment includes two function modules, i.e., a first function module 11 and a second function module 12.

The first function module 11 includes a core body 111 (see FIG. 1) having a tip end 111a that is brought into contact with the input surface 2a of the tablet 2, and further includes a position detection signal transmission circuit that transmits a position detection signal to the position detection sensor 20. In addition, in the present example, the first function module 11 has a function of detecting information regarding a pen pressure being applied to the core body 111, and supplying the detected information together with the position detection signal to the position detection sensor 20. In the following explanation, the first function module 11 will be referred to as the position detection module 11.

In the present embodiment, the second function module 12 has either one or both of the following two functions. That is, one of the two functions of the second function module 12 is a function of generating information (hereinafter, referred to as characteristic selection information) for selecting a display form of displaying, at the PC 3, a writing trace which is a trace of the position on the input surface 2a indicated by the electronic stylus 1, and transmitting the generated characteristic selection information to the PC 3 in this example. For this function, the second function module 12 includes an information generation circuit that generates the characteristic selection information and a transmission circuit that transmits the generated characteristic selection information.

The display form of displaying a writing trace, includes line attributes, such as the density of a line and the width of a line, of the writing trace and further includes a line format, such as a blur of a writing trace line, corresponding to a characteristic of the core body 111 and a characteristic of the material or the like of the input surface 2a.

Further, the other one of the two functions of the second function module 12 is a function of giving, via a casing of the electronic stylus 1, a stimulus similar to that obtained during a writing input with a pen tip of the core body 111 of the electronic stylus 1 being in contact with the input surface 2a, to a user who is holding the electronic stylus 1. In the present embodiment, for this second function, the second function module 12 includes a stimulus generation circuit that generates a stimulus to be audibly and/or tactually perceived by the user who is holding the electronic stylus 1. As an example of a section for generating a stimulus that is audibly perceived, a loudspeaker is provided. As an example of a section for generating a stimulus that is tactually perceived, a vibrator is provided.

A drive source for driving the stimulus generation circuit is a drive signal that is generated on the basis of the characteristic selection information generated by the information generation circuit. Such a drive signal may be generated by the electronic stylus 1 or may be acquired from the PC 3. In the case where a drive signal is acquired from the PC 3, the characteristic selection information generated by the information generation circuit is supplied to the PC 3, and the PC 3 receives the characteristic selection information, generates a drive signal on the basis of the characteristic selection information, and returns the drive signal to the electronic stylus 1.

It is to be noted that a drive signal may be supplied to an electronic stylus other than the electronic stylus 1 having received the characteristic selection information. In such a case, a stimulus corresponding to a characteristic of the core body and a characteristic of the input surface under the use state of the electronic stylus 1 having generated the characteristic selection information is transmitted to the other electronic stylus.

The second function module 12 may have both of the above-described functions of the information generation circuit and the stimulus generation circuit or may have either one of the two functions.

Since an extended function other than the position indicating function is added to the electronic stylus 1, the second function module 12 is referred to as the extension function module 12 in the following explanation.

Arrangement Example of Position Detection Module 11 and Extension Function Module 12 in Electronic Stylus 1

Figure 2A:
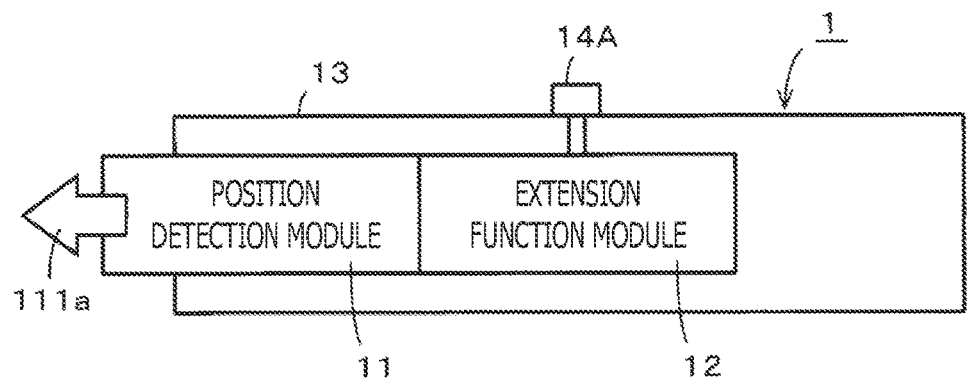
FIGS. 2A to 2C are diagrams depicting configuration examples of the position indicator according to the embodiment of the present disclosure.
Figure 2B:
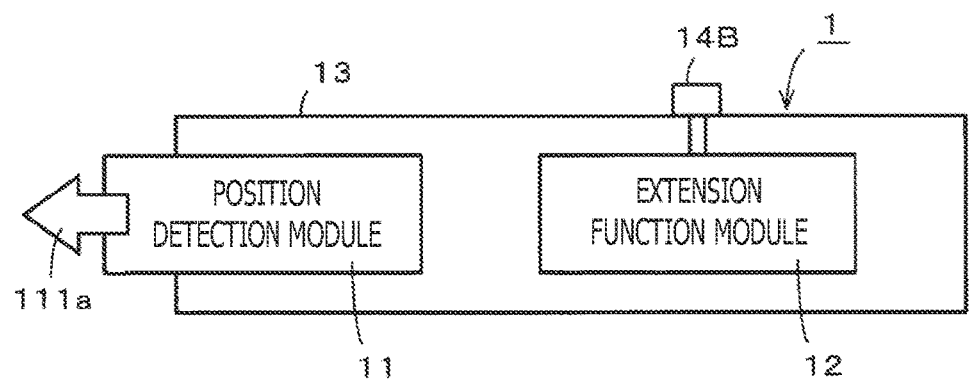
Figure 2C:
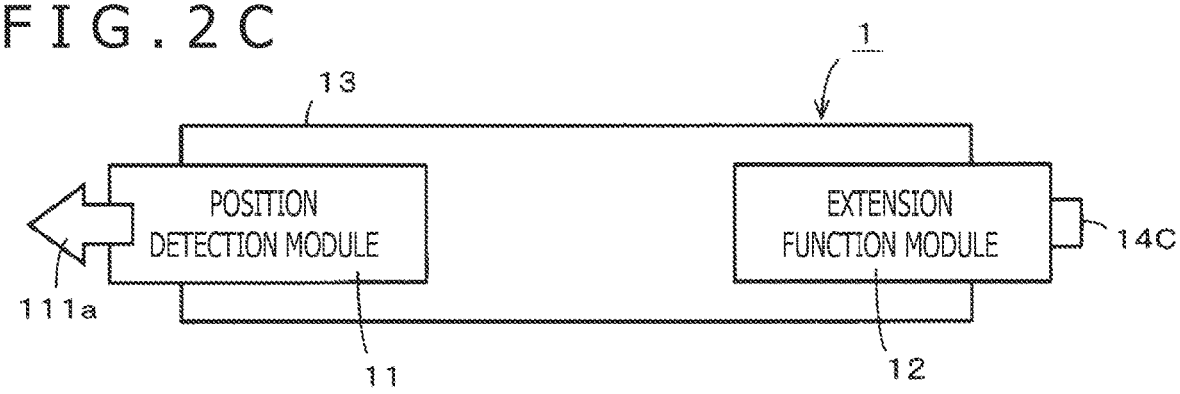

FIGS. 2A to 2C are diagrams for explaining arrangement examples of the position detection module 11 and the extension function module 12 in the electronic stylus 1. The electronic stylus 1 includes a stick-like pen casing 13. The position detection module 11 and the extension function module 12 are disposed side by side in an axial direction of the stick-like pen casing 13. In this case, the tip end 111a of the core body 111 which is included in the position detection module 11 is projectable to an outside from an opening that is defined on one end side in the axial direction of the pen casing 13.

The electronic stylus 1 depicted in FIG. 2A has a structure in which the position detection module 11 and the extension function module 12 are integrally formed. In this case, the position detection module 11 and the extension function module 12 may be disposed on a single circuit board, or may be formed on different circuit boards and then be coupled into an integrated structure.

Further, after being integrated, the position detection module 11 and the extension function module 12 may be housed and fixed in the pen casing 13, or may be embedded and fixed in the pen casing 13. In this case, as depicted in FIG. 2A, the tip end 111a of the core body 111 of the position detection module 11 is formed to be projected to the outside from the opening that is defined on the one end side (hereinafter, referred to as the pen tip side) in the axial direction of the pen casing 13.

The extension function module 12 includes a start switch for actuating the extension function module 12. In FIG. 2A, when an operation part 14A that is disposed on the electronic stylus 1 so as to be operated by the user of the electronic stylus 1 is operated, the start switch is turned on/off. In the example depicted in FIG. 2A, the operation part 14A is disposed in a position, on an outer circumferential side surface of the pen casing 13, corresponding to a fixation position of the extension function module 12 in the pen casing 13 in such a way that the user can operate the operation part 14A. To input a position indication by bringing the tip end 111a of the core body 111 of the position detection module 11 into contact with the input surface 2a of the tablet 2, the user operates the operation part 14A to turn on the start switch.

It is to be noted that the position detection module 11 and the extension function module 12 integrated together may be formed into a cartridge that is attachable to/detachable from the pen casing 13. In this case, an operation part, which is omitted in the drawing, for turning on/off the start switch of the extension function module 12 is disposed on the other end side (hereinafter, referred to as the tail end side) in the axial direction of the pen casing 13, and is connected to turn on/off the start switch of the extension function module 12 of the cartridge installed in the pen casing 13.

In addition, the cartridge including the position detection module 11 and the extension function module 12 integrated together may be connected to a knock mechanism part that is disposed on the casing of the electronic stylus 1 in such a way that, according to a knocking operation performed by the user, the knock mechanism part causes the pen tip side (the tip end 111a of the core body 111) of the position detection module 11 to be projected to the outside from the opening defined on the one end side in the axial direction of the pen casing 13.

Thus, in the case where the knock mechanism is used, the start switch of the extension function module 12 is formed to be automatically turned on/off according to a knock operation performed by the user, in such a manner as described in Japanese Patent Laid-Open No. 2016-184444, for example, so that the start switch is on when the pen tip side of the position detection module 11 is projected to the outside from the opening defined on the one end side in the axial direction of the pen casing 13.

Alternatively, the pen casing 13 may be sectioned into two portions in the axial direction in such a way that one of the casing portions is rotatable with respect to the other casing portion, and the cartridge including the position detection module 11 and the extension function module 12 integrated together may be movable in the axial direction according to rotation of the one casing portion with respect to the other casing portion, so that the pen tip side of the position detection module 11 is projected to the outside from the opening defined on the one end side in the axial direction of the pen casing 13.

Also in the case where such a rotation mechanism causes the pen tip side of the position detection module 11 to be projected to the outside from the opening defined on the one end side in the axial direction of the pen casing 13, the start switch is automatically turned on/off according to a rotational operation performed by the user, in such a manner as described in Japanese Patent Laid-Open No. 2016-184444, so that the start switch is on when the pen tip side of the position detection module 11 is projected to the outside from the opening defined on the one end side in the axial direction of the pen casing 13.

Next, in the electronic stylus 1 depicted in FIG. 2B, the position detection module 11 and the extension function module 12 are formed separately from each other, and the extension function module 12 is housed and fixed in the pen casing 13, or is embedded and fixed in the pen casing 13. In the present example, an operation part 14B is disposed in a position, on an outer circumferential side surface of the pen casing 13, corresponding to a position where the extension function module 12 is fixed in the pen casing 13, as depicted in FIG. 2B in such a way that the user can operate the operation part 14B. With use of the operation part 14B, the start switch of the extension function module 12 is turned on/off.

The position detection module 11 in the example of FIG. 2B may be housed and fixed in the pen casing 13 or be embedded and fixed in the pen casing 13, or may be attachable to/detachable from the pen casing 13.

In the electronic stylus 1 in the example of FIG. 2C, the position detection module 11 and the extension function module 12 are separately formed, and the extension function module 12 can be attached to/detached from the pen casing 13 of the electronic stylus 1 in a state where a casing of the extension function module 12 is partially projected from an opening on the rear end side of the pen casing 13. Further, in the present example, an operation part 14C for turning on/off the start switch of the extension function module 12 is disposed on a portion, of the casing of the extension function module 12, projected from the rear end side of the pen casing 13 of the electronic stylus 1, as depicted in FIG. 2C in such a way that the user can operate the operation part 14C.

Also in the example of FIG. 2C, the position detection module 11 may be housed and fixed in the pen casing 13 or be embedded and fixed in the pen casing 13, or may be attachable to/detachable from the pen casing 13.

In the above-described examples of the electronic stylus 1, the position detection module 11 and the extension function module 12 are disposed in the same pen casing 13 of the electronic stylus 1. However, the pen casing 13 may be divided into two portions, for example, a main body casing portion and a cap portion of the electronic stylus 1, in such a manner as to be connected together in the axial direction, and further, the position detection module 11 and the extension function module 12 may be disposed in the two respective divided casing portions.

FIGS. 3A and 3B are diagrams illustrating an example of the electronic stylus 1 in which the pen casing 13 is divided into a main body casing portion 13M and a cap portion 13C. In the present example, the position detection module 11 is disposed in the main body casing portion 13M while the extension function module 12 is disposed in the cap portion 13C, as depicted in FIGS. 3A and 3B.

The main body casing portion 13M of the present example has a cylindrical shape having a predetermined outer diameter R with an opening 13Ma defined on one end side in the axial direction, as depicted in FIGS. 3A and 3B. Further, in a state where the tip end 111a of the core body 111 is projected from the opening 13Ma, the position detection module 11 is disposed in the main body casing portion 13M. In the present example, the other end side in the axial direction of the main body casing portion 13M is closed.

In addition, the cap portion 13C includes a housing section 13Ca that houses the extension function module 12, and a recess section 13Cb that covers one end side or a rear end side in the axial direction of the main body casing portion 13M, as depicted in FIGS. 3A and 3B. The inner diameter of the recess section 13Cb is set to be slightly larger than the outer diameter R of the main body casing portion 13M. In the present example, a wall section 13Cc is disposed between the housing section 13Ca and the recess section 13Cb. A press button 14D constituting the operation part for turning on/off the start switch of the extension function module 12 is disposed on the wall section 13Cc.

Further, a ring-like projection section 13Cd is formed in a position, on an inner circumferential wall surface of the recess section 13Cb of the cap portion 13C, spaced apart by a predetermined distance L1 from a bottom surface of the recess section 13Cb. Ring-like grooves 13Mb and 13Mc to be fitted to the ring-like projection section 13Cd of the cap portion 13C are formed in the opening 13Ma side and the tail end side of an outer circumferential side surface of the main body casing portion 13M. As depicted in FIGS. 3A and 3B, the ring-like groove 13Mb on the opening 13Ma side on the outer circumferential side surface of the main body casing portion 13M is formed in a position spaced apart by a distance L2 (<L1) from an end of the opening 13Ma, while the ring-like groove 13Mc on the tail end side on the outer circumferential side surface of the main body casing portion 13M is formed in a position spaced apart by a distance L3 (L2<L3<L1) from a tail end-side end surface.

In this case, the distance L2 is defined such that, when the cap portion 13C is put to cover the opening 13Ma side of the main body casing portion 13M and the ring-like projection section 13Cd of the cap portion 13C is fitted and locked into the ring-like groove 13Mb on the opening 13Ma side of the main body casing portion 13M, the press button 14D on the wall section 13Cc on a bottom portion of the recess section 13Cb of the cap portion 13C is not pressed by the core body 111 of the position detection module 11 or by the opening 13Ma side of the main body casing portion 13M, as depicted in FIG. 3A.

In addition, the distance L3 is defined such that, when the cap portion 13C is put to cover the tail end side of the main body casing portion 13M and the ring-like projection section 13Cd of the cap portion 13C is fitted and locked into the ring-like groove 13Mc on the tail end side of the main body casing portion 13M, the press button 14D on the wall section 13Cc on the bottom portion of the recess section 13Cb of the cap portion 13C is pressed by the tail end-side end surface of the main body casing portion 13M, as depicted in FIG. 3B.

That is, when the cap portion 13C is put to cover the opening 13Ma side of the main body casing portion 13M and is locked to the main body casing portion 13M, the press button 14D is not pressed. Accordingly, the off state of the start switch of the extension function module 12 is kept. When the cap portion 13C is put to cover the tail end side of the main body casing portion 13M and is locked to the main body casing portion 13M, the press button 14D is pressed. Accordingly, the start switch of the extension function module 12 is turned on to actuate the extension function module 12.

Further, the cap portion 13C may be put to cover the tail end side of the main body casing portion 13M, and the cap portion 13C may be made rotatable with respect to the main body casing portion 13M, the cartridge including the position detection module 11 housed in the main body casing portion 13M may be movable in the axial direction according to rotation of the main body casing portion 13M with respect to the cap portion 13C, and the tip end 111a of the core body 111 of the position detection module 11 may be projected to the outside from the opening defined on the one end side in the axial direction of the main body casing portion 13M.

Figure 4A:
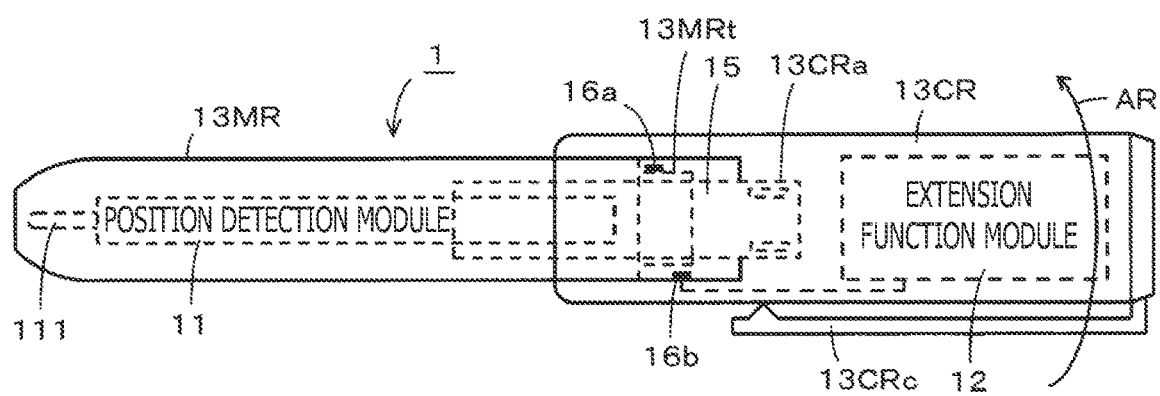
FIGS. 4A and 4B are diagrams depicting another configuration example of the position indicator according to the embodiment of the present disclosure.
Figure 4B:
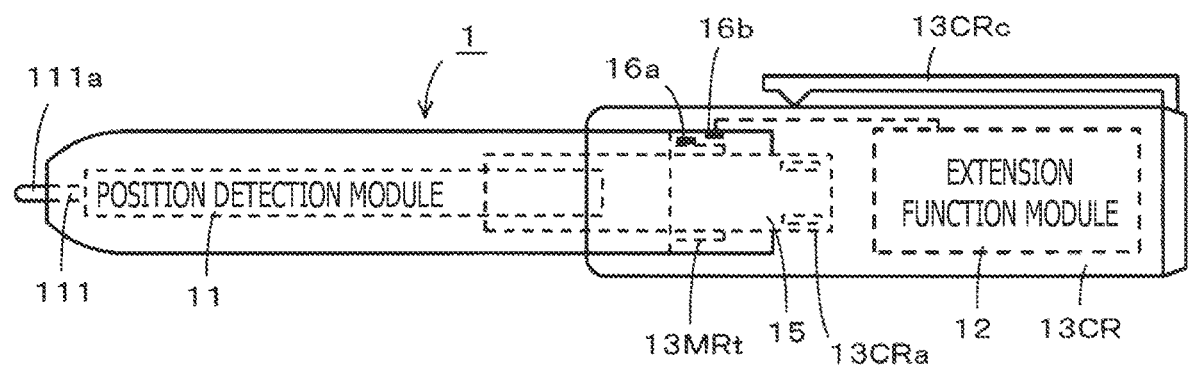

FIGS. 4A and 4B are diagrams for explaining a configuration example of the electronic stylus 1 having a configuration in which the tip end 111a of the core body 111 of the cartridge including the position detection module 11 is projected in a rotational way. The electronic stylus 1 of the present example is formed by fitting a cap portion 13CR to a main body casing portion 13MR in a rotatable manner.

The position detection module 11 having the cartridge configuration is disposed in the main body casing portion 13MR of the present example. Further, the main body casing portion 13MR includes on a tail end 13MRt side thereof a rotational projection mechanism portion 15 that rotates the cap portion 13CR with respect to the main body casing portion 13MR such that the tip end 111a of the core body 111 of the position detection module 11 having the cartridge configuration is projected from an opening in the main body casing portion 13MR.

The rotational projection mechanism portion 15 is formed so as to be screwed into the tail end 13MRt of the main body casing portion 13MR. When the rotational projection mechanism portion 15 is removed from the main body casing portion 13MR, the position detection module 11 having the cartridge configuration can be inserted into or removed from the main body casing portion 13MR. The tail end side of the position detection module 11 having the cartridge configuration is inserted to the rotational projection mechanism portion 15 and is held therein. The cap portion 13CR is rotatable with respect to the main body casing portion 13MR, while it is fitted to the rotational projection mechanism portion 15 to be able to impart rotation to the rotational projection mechanism portion 15.

The extension function module 12 is disposed in the cap portion 13CR, as in the above-described examples. The cap portion 13CR includes a fitting section 13CRa that is fitted to the rotational projection mechanism portion 15 when the cap portion 13CR is put to cover the tail end side of the main body casing portion 13MR. Therefore, when the cap portion 13CR is rotated as indicated by an arrow AR in FIG. 4A, the rotational projection mechanism portion 15 is also rotated to cause the tip end 111a of the core body 111 of the position detection module 11 having the cartridge configuration to be projected from the opening in the main body casing portion 13MR.

Further, in the electronic stylus 1 of the present example, a permanent magnet 16a is provided on the tail end 13MRt side of the main body casing portion 13MR while a magnetic sensor 16b is provided on the cap portion 13CR such that the permanent magnet 16a and the magnetic sensor 16b come close to each other when the cap portion 13CR is rotated, as depicted in FIGS. 4A and 4B. Further, the magnetic sensor 16b is connected to a control circuit for performing control to turn on/off the start switch disposed on the extension function module 12 in the cap portion 13CR.

Further, in the electronic stylus 1 of the present example, in a state where the position detection module 11 including the tip end 111a of the core body 111 is fully housed in the main body casing portion 13MR, the permanent magnet 16a and the magnetic sensor 16b are relatively distant from each other, as depicted in FIG. 4A. Therefore, the magnetic sensor 16b does not detect a magnetic flux of the permanent magnet 16a, and the level of a sensor output of the magnetic sensor 16b becomes low. Accordingly, the start switch of the extension function module 12 enters an off state.

In this state, when the cap portion 13CR is rotated to cause the tip end 111a of the core body 111 of the position detection module 11 to be projected from the main body casing portion 13MR, the permanent magnet 16a and the magnetic sensor 16b come close to each other. Therefore, the magnetic sensor 16b detects the magnetic flux of the permanent magnet 16a, and the level of the sensor output of the magnetic sensor 16b becomes high. Accordingly, the start switch of the extension function module 12 is turned on, and the extension function module 12 enters an actuated state. That is, in the electronic stylus 1 of the present example, when the tip end 111a of the core body 111 of the position detection module 11 is projected from the main body casing portion 13MR and a position indication input is enabled, the start switch is turned on, and also, the extension function module 12 enters an actuated state.

It is to be noted that the configuration for detecting the rotational position of the cap portion 13CR with respect to the main body casing portion 13MR is not limited to the configuration using a magnet and a magnetic sensor. For example, in place of the magnetic sensor, a switch member that is turned on/off when the cap portion 13CR is rotated from the state in FIG. 4A to the state depicted in FIG. 4B may be provided to the cap portion 13CR such that the control circuit of the extension function module 12 controls the on/off state of the start switch by monitoring the on/off state of the switch member.

Material of Casing of Electronic Stylus

Next, the pen casing 13, the main body casing portion 13M or 13MR, and the cap portion 13C or 13CR of the electronic stylus 1 are formed from resin. However, wood may be used instead. Alternatively, a combination of resin and wood may be used. Also, metal may partially be used.

Figure 5:
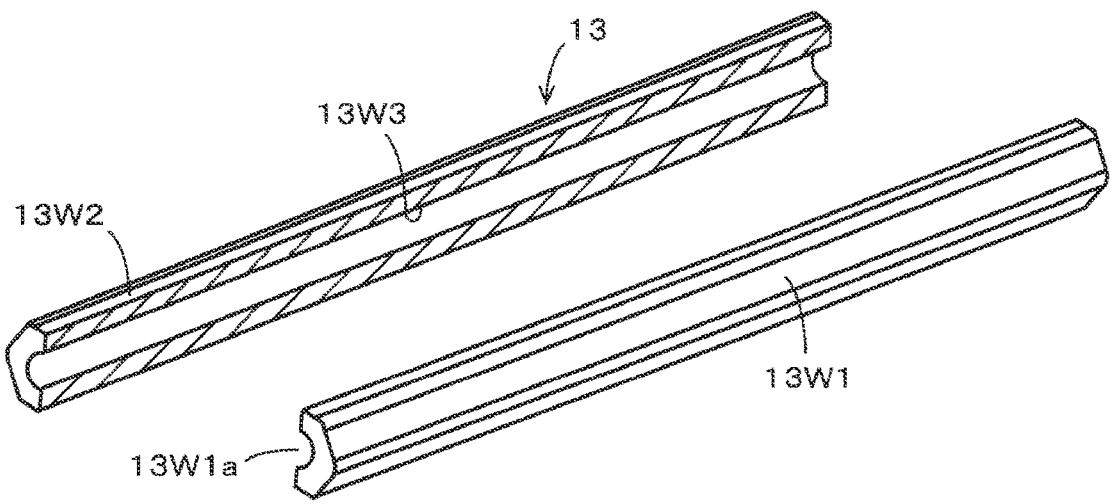
FIG. 5 is a diagram depicting one example of a casing of the position indicator according to the embodiment of the present disclosure.

For example, a wooden material depicted in FIG. 5 can be used for the one pen casing 13 in which the position detection module 11 and the extension function module 12 are disposed, as depicted in FIGS. 2A to 2C.

In the example in FIG. 5, casing halves 13W1 and 13W2 are formed by splitting a columnar wooden material having a hexagonal cross section into equal two parts along an axial direction (along a cut surface passing through an axial center). In respective cut end surfaces of the casing halves 13W1 and 13W2, recesses 13W1a and 13W2a each having a transverse cross section that is semicircular about the axial center of the original hexagonal column are formed along the axial direction.

Figure 6A:
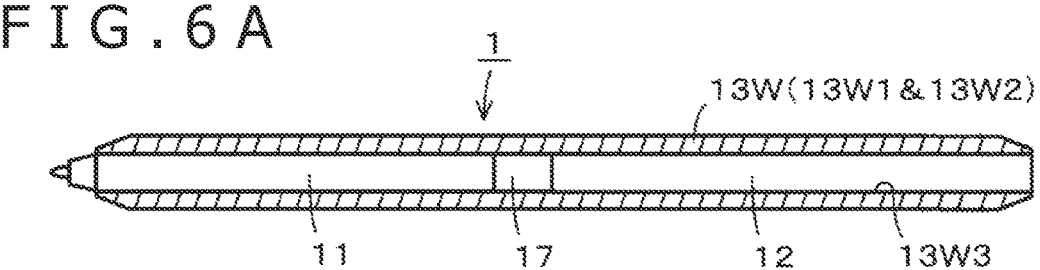
FIGS. 6A and 6B are diagrams depicting a configuration example of the position indicator according to the embodiment of the present disclosure.

Then, the cut end surfaces of the casing halves 13W1 and 13W2 are bonded together to form a pen casing 13W having a columnar hollow portion 13W3 formed of the recesses 13W1a and 13W2a, as depicted in a cross sectional view in FIG. 6A. Then, the position detection module 11 and the extension function module 12 are arranged side by side in the axial direction in the columnar hollow portion 13W3 of the pen casing 13W, as depicted in FIG. 6A. In the present example, the position detection module 11 and the extension function module 12 are formed into a cartridge configuration in which the components of the position detection module 11 and the extension function module 12 are housed in respective long stick-like casings 11K and 12K.

Figure 6B:
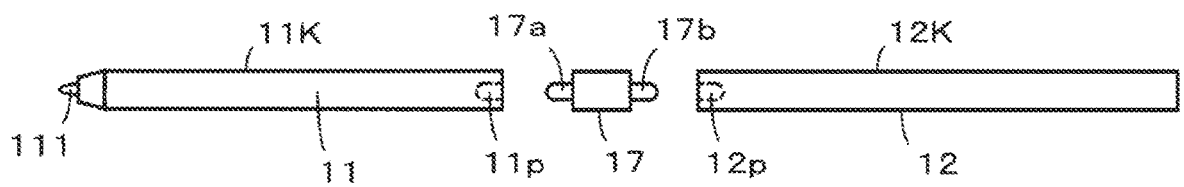

In this case, at a midpoint in the axial direction of the columnar hollow portion of the pen casing 13W, a locking portion 17 for locking the position detection module 11 and the extension function module 12 in the pen casing 13W is fixed so as not to move in the axial direction in the pen casing 13W, as depicted in FIGS. 6A and 6B.

In the present example, the locking portion 17 has, on the position detection module 11 side, a fitting projection 17a to be fitted to a fitting recess 11p that is disposed on the tail end of the casing 11K of the position detection module 11. The locking portion 17 further has, on the extension function module 12 side, a fitting projection 17b to be fitted to a fitting recess 12p that is disposed on the tail end side of the electronic stylus 1 in the casing 12K of the extension function module 12.

Therefore, in the electronic stylus 1 of the present example, when the position detection module 11 is inserted and pushed, from the fitting recess 11p side, into an opening on the pen tip side of the wooden pen casing 13W, the fitting recess 11p is fitted to the fitting projection 17a of the locking portion 17. Accordingly, the position detection module 11 is locked in the pen casing 13W. In the locked state, a portion of the tip end side of the casing 11K of the position detection module 11 and the tip end 111a of the core body 111 are projected to the outside from the pen casing 13W. It is to be noted that, when the projected portion is grasped and pulled, the position detection module 11 is removed from the pen casing 13W. That is, the position detection module 11 is exchangeable.

In addition, when the extension function module 12 is inserted and pushed, from the fitting recess 12p side, into an opening on the tail end side of the wooden pen casing 13W, the fitting recess 12p is fitted to the fitting projection 17b of the locking portion 17, and the extension function module 12 is locked in the pen casing 13W. Further, in the present example, the start switch disposed on the extension function module 12, which is not depicted in the drawing, is turned on when the fitting recess 12p is fitted to the fitting projection 17b of the locking portion 17, and thus, the extension function module 12 becomes operable.

Further, a fitting recess is disposed in an end surface, of the extension function module 12, exposed to the tail end side of the pen casing 13W. An extraction tool is fitted into the fitting recess and then is pulled, so that the extension function module 12 is removed from the pen casing 13W. That is, the extension function module 12 is exchangeable. It is to be noted that the extension function module 12 may be configured such that a part of the tail end side thereof is projected to the outside from the tail end side of the pen casing 13W in the locked state. In this case, when the projected portion may be grasped and pulled, the extension function module 12 can be removed from the pen casing 13W.

In addition, for example, the structure for turning on/off the start switch of the extension function module 12 is not limited to the above-described examples. For example, an operation part for turning on/off the start switch of the extension function module 12 may be provided on the tail end side of the extension function module 12 in such a manner as to be projected from the tail end side of the pen casing 13W. The operation part may be depressed, for example, to turn on/off the start switch of the extension function module 12.

Figure 7:
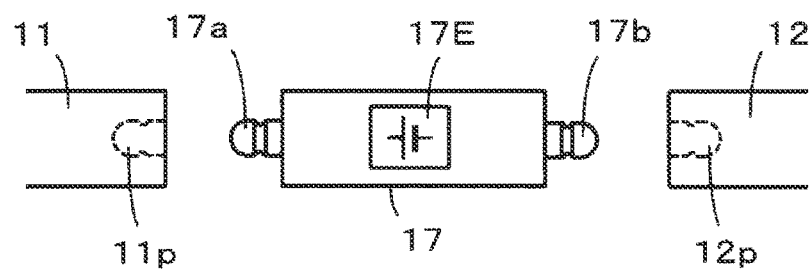
FIG. 7 is a diagram depicting a configuration example of a part of the position indicator according to the embodiment of the present disclosure.

It is to be noted that, in the examples in FIGS. 6A and 6B and FIG. 7, the fitting projections 17a and 17b are provided to the locking portion 17 while the fitting recesses 11p and 12p are provided to the position detection module 11 and the extension function module 12. However, the fitting recesses may be provided to the locking portion 17 while the fitting projections may be provided to the position detection module 11 and the extension function module 12. Alternatively, a fitting recess may be provided to either one of the position detection module 11 and the extension function module 12 while a fitting projection may be provided to the other module, and a corresponding fitting projection and a corresponding fitting recess may be provided to the locking portion 17.

In some cases, electronic circuits included in the position detection module 11 and the extension function module 12 each need to receive supply of a power source voltage. If this is taken into consideration, a battery 17E may be disposed in the locking portion 17 as depicted in FIG. 7, and the fitting recess 11p in the position detection module 11 and the fitting projection 17a on the locking portion 17 may include conductive bodies, for example, conductive metal. Further, the fitting recess 12p in the extension function module 12 and the fitting projection 17b on the locking portion 17 may include conductive bodies, for example, conductive metal. Accordingly, a power source voltage can be supplied from the battery 17E to the position detection module 11 and the extension function module 12.

It is to be noted that the electronic circuit of the position detection module 11 may have a structure that does not need to receive supply of a power source voltage. In this case, the fitting recess 11p in the position detection module 11 and the fitting projection 17a on the locking portion 17 do not necessarily include conductive bodies.

The battery 17E may be a primary battery or may be a rechargeable secondary battery. In the case where the battery 17E is a secondary battery, a charging electrode may be disposed on an outer circumferential side surface of the pen casing 13W. In addition, the battery 17E which is a secondary battery may be charged in a non-contact manner through electromagnetic induction, field induction, or the like.

Configuration Example of Position Detection Module 11

The position detection module 11 may adopt an electromagnetic induction method or a capacitance method.

Example of Electromagnetic Induction Method

Figure 8:
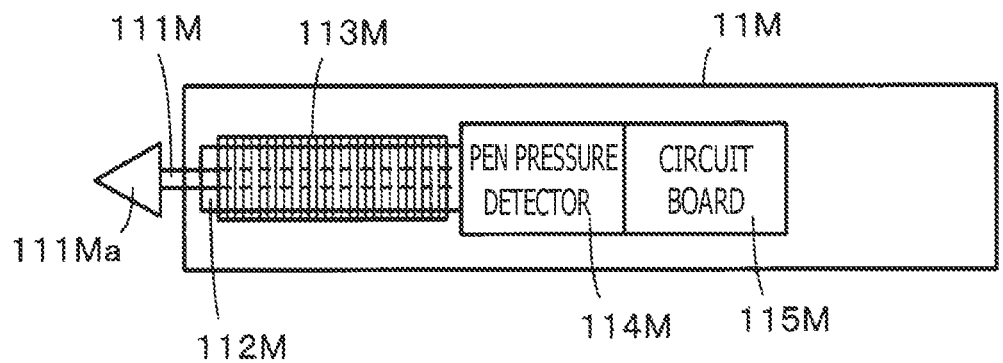
FIG. 8 is a diagram for explaining a configuration example of a first function module constituting the position indicator according to the embodiment of the present disclosure.

FIG. 8 depicts a configuration example of a position detection module 11M which is of the electromagnetic induction method. The position detection module 11M of the present example includes a coil 113M that is wound around a magnetic core which is, for example, a ferrite core 112M, a pen pressure detector 114M, and a circuit board 115M. The ferrite core 112M has a through hole (not depicted) extending in the axial direction. A core body 111M is inserted through the through hole. Further, an end opposite to a tip end 111Ma of the core body 111M inserted in the through hole of the ferrite core 112M is fitted to the pen pressure detector 114M. The core body 111M includes a non-conductive material, for example, resin.

The pen pressure detector 114M detects a pressure (pen pressure) being applied to the tip end 111Ma of the core body 111M during a writing input with the tip end 111Ma of the core body 111M being in contact with the input surface 2a of the tablet 2. In the present example, the pen pressure detector 114M includes a well-known device that detects such a pressure as a capacitance change.

Figure 9:
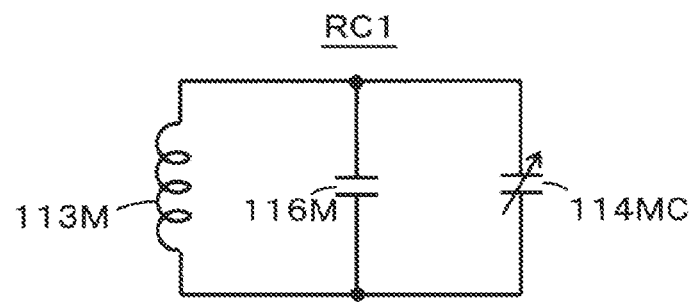
FIG. 9 is a diagram depicting a circuit configuration example of a main part of a position detection module in the example of FIG. 8.

A capacitor 116M is disposed on the circuit board 115M as depicted in FIG. 9. The capacitor 116M and the coil 113M constitute a resonance circuit. In the present example, a resonance circuit RC1 on which the capacitor 116M and a variable capacitance capacitor 114MC including the pen pressure detector 114M are connected in parallel with the coil 113M, as depicted in FIG. 9, is formed on the circuit board 115M.

Figure 10:
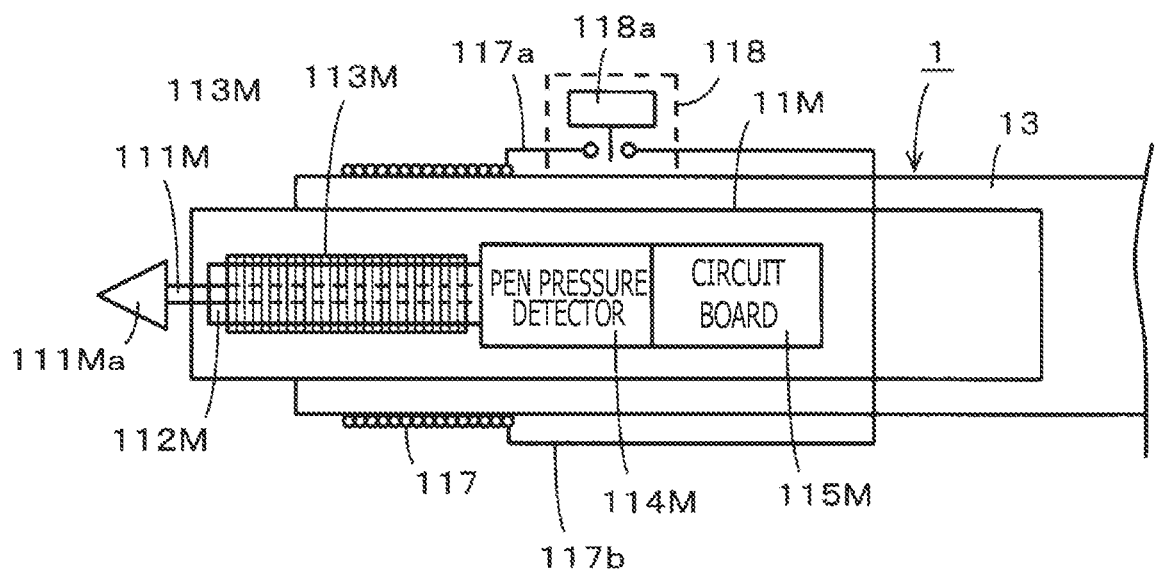
FIG. 10 is a diagram for explaining another configuration example of the first function module constituting the position indicator according to the embodiment of the present disclosure.

Further, the position detection module 11M of the electromagnetic induction method may be configured to supply a signal corresponding to an on/off operation of a side switch which can be operated by the user, to the position detection sensor of the tablet 2. FIG. 10 is a diagram depicting a configuration example of the position detection module 11M having a side switch.

Specifically, a side switch 118 is provided on the pen casing 13 of the electronic stylus 1 of the present example, and further, as a member for shifting a resonance frequency of the resonance circuit RC1 in the position detection module 11M, a coil 117 that can magnetically be coupled with the coil 113M of the resonance circuit in the position detection module 11M so as to establish mutual induction coupling is disposed on an outer circumference of the pen tip side of the pen casing 13, as depicted in FIG. 10. The side switch 118 is configured to be turned on when an operation part 118a is pressed down. The side switch 118 is connected between one end 117a and the other end 117b of the coil 117. It is to be noted that, in the present example, a capacitor is disposed in series with the side switch 118.

Figure 11:
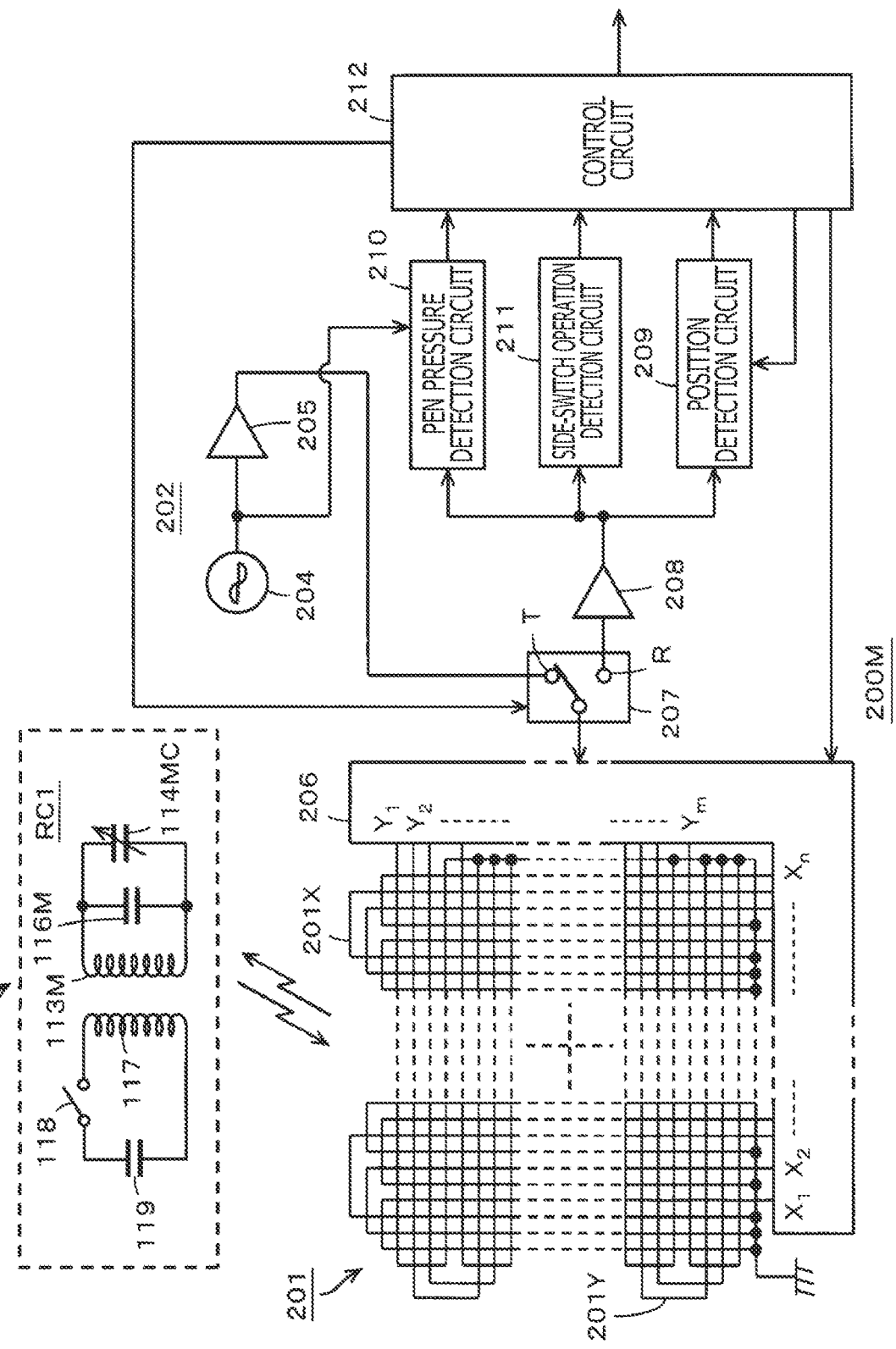
FIG. 11 is a diagram depicting a configuration example of a position detection device that is used with the position indicator according to the embodiment of the present disclosure.

FIG. 11 is a diagram depicting a circuit configuration example of the electronic stylus 1 including the position detection module 11M in FIG. 10, and a circuit configuration example of a position detection device 200M of the tablet 2 that conducts position detection by being electromagnetically coupled with the electronic stylus 1.

Specifically, the electronic stylus 1 includes, as a circuit configuration of the position detection module 11M, the first resonance circuit RC1 that is formed by connecting the coil 113M, the capacitor 116M, and the variable capacitance capacitor 114MC including the pen pressure detector 114M in parallel. In addition, the side switch 118 and a capacitor 119 are connected between the one end 117a and the other end 117b of the coil 117 disposed in the casing 13 of the electronic stylus 1. When the side switch 118 is turned on, a closed circuit of a second resonance circuit RC2 that includes the coil 117 and the capacitor 119 is generated. However, to form the closed circuit, it may be sufficient to connect the one end and the other end of the coil 117 by turning on the side switch 118 without providing the capacitor 119.

When the side switch 118 in the electronic stylus 1 is off, the second resonance circuit RC2 is not formed, so that the closed circuit for applying a current to the coil 117 is not formed. In this case, a mutual induction action does not occur between the coil 113M of the first resonance circuit RC1 of the position detection module 11M of the electronic stylus 1 and the coil 117 of the second resonance circuit RC2. Therefore, a resonance frequency of the resonance circuit RC1 of the position detection module 11M of the electronic stylus 1 becomes equal to a frequency f1 that is determined by the coil 113M, the capacitor 116M, and the variable capacitance capacitor 114MC.

On the other hand, when the side switch 118 in the electronic stylus 1 is turned on by a user's operation, the resonance circuit RC2 including the coil 117 and the capacitor 119 is generated, and the closed circuit for causing a current to flow through the coil 117 is formed. Accordingly, the resonance frequency of the first resonance circuit RC1 of the position detection module 11M of the electronic stylus 1 causes a mutual induction action between the coil 113M and the coil 117 of the second resonance circuit RC2. Consequently, the resonance frequency of the first resonance circuit RC1 of the position detection module 11M of the electronic stylus 1 becomes equal to a frequency f2 that is different from the frequency f1.

The position detection device 200M includes a position detection sensor 201 of the electromagnetic induction method and a position detection circuit 202. The position detection sensor 201 is formed by layering an X-axis direction loop coil group 201X and a Y-axis direction loop coil group 201Y.

The position detection circuit 202 includes an oscillator 204, a current driver 205, a selection circuit 206, a switch connection circuit 207, a reception amplifier 208, a position detection circuit 209, a pen pressure detection circuit 210, a side-switch operation detection circuit 211, and a control circuit 212. The control circuit 212 includes a microprocessor. The control circuit 212 controls the selection circuit 206 to select a loop coil, and controls the switch connection circuit 207 to perform switching, and further, controls processing timings of the position detection circuit 209 and the pen pressure detection circuit 210.

Further, the X-axis direction loop coil group 201X and the Y-axis direction loop coil group 201Y of the position detection sensor 201 are connected to the selection circuit 206. The selection circuit 206 sequentially selects one loop coil from the two loop coil groups 201X and 201Y. The oscillator 204 generates an alternating-current (AC) signal having a frequency f0. The oscillator 204 supplies the generated AC signal to the current driver 205 and the pen pressure detection circuit 210. The current driver 205 converts the AC signal supplied by the oscillator 204 to a current and sends the current to the switch connection circuit 207.

The switch connection circuit 207 switches a connection destination (a transmission-side terminal T, a reception-side terminal R) of the loop coil selected by the selection circuit 206, under control of the control circuit 212. The current driver 205 is connected to the transmission-side terminal T which is one of the connection destinations, while the reception amplifier 208 is connected to the reception-side terminal R which is the other connection destination. In a case where a signal is transmitted from the position detection sensor 201, the switch connection circuit 207 is switched to the terminal T side. On the other hand, in a case where the position detection sensor 201 receives a signal from an outside, the switch connection circuit 207 is switched to the terminal R side.

In the case where the switch connection circuit 207 is switched to the terminal T side, a current is supplied from the current driver 205 to the loop coil selected by the selection circuit 206. As a result, a magnetic field is generated in the loop coil. Accordingly, transmission of a signal (radio wave) to be applied to the corresponding first resonance circuit RC1 of the position detection module 11M of the electronic stylus 1 becomes possible.

On the other hand, in the case where the switch connection circuit 207 is switched to the terminal R side, an induction voltage generated at the loop coil selected by the selection circuit 206 is transmitted to the reception amplifier 208 via the selection circuit 206 and the switch connection circuit 207. The reception amplifier 208 amplifies the induction voltage supplied from the loop coil and sends the amplified voltage to the position detection circuit 209, the pen pressure detection circuit 210, and the side-switch operation detection circuit 211.

That is, at each of the loop coils in the X-axis direction loop coil group 201X and the Y-axis direction loop coil group 201Y, an induction voltage is generated by radio waves sent (returned) from the first resonance circuit RC1 of the position detection module 11M of the electronic stylus 1.

Regarding a resonance frequency component of the first resonance circuit RC1 of the position detection module 11M of the electronic stylus 1, the position detection circuit 209 detects an induction voltage generated at a loop coil, or detects a received signal, and then, converts an output signal of the detected signal to a digital signal and outputs the digital signal to the control circuit 212.

On the basis of digital signals regarding resonance frequency components supplied from the position detection circuit 209, or voltage value levels of induction voltages generated in the respective loop coils, the control circuit 212 calculates values of the X-axis and Y-axis coordinates of a position indicated by the tip end 111Ma of the core body 111M of the position detection module 11M of the electronic stylus 1.

The pen pressure detection circuit 210 detects a reception signal supplied from the reception amplifier 208 in synchronization with an AC signal supplied from the oscillator 204, and detects a pen pressure being applied to the tip end 111Ma of the core body 111M of the position detection module 11M of the electronic stylus 1 on the basis of a frequency deviation (phase difference) between these signals.

The side-switch operation detection circuit 211 detects the resonance frequency of the first resonance circuit RC1 of the position detection module 11M of the electronic stylus 1 on the basis of the frequency of an output signal supplied from the reception amplifier 208, and detects whether or not the detected frequency is a resonance frequency of the off time of the side switch 118 or a resonance frequency of the on time of the side switch 118. The side-switch operation detection circuit 211 outputs the detection result to the control circuit 212. The control circuit 212 detects whether the side switch 118 is in an on state or an off state on the basis of the output from the side-switch operation detection circuit 211.

The control circuit 212 transmits, as an output of the tablet 2, information regarding the coordinate values of the detected position indicated by the electronic stylus 1, the pen pressure value, and the detection result as to whether the side switch 118 is on/off, to the PC 3.

In the above-described example of the electronic stylus 1, even with the position detection module 11M having the cartridge configuration to be housed in the pen casing 13, the side switch 118 can be disposed on the electronic stylus 1.

The position detection module 11M of the electromagnetic induction method having been described so far does not require a power source. In this configuration, a pen pressure detection output from the pen pressure detector 114M is detected, as a change in the resonance frequency of the resonance circuit RC1, by the position detection device. In contrast, the position detection module 11M of the electromagnetic induction method can also be configured to convert a pen pressure detection output from the pen pressure detector 114M into a digital value, for example, and transmit the digital value to the position detection device 200M side. In this case, a control circuit for achieving this needs to be provided to the position detection module 11M, and also a power source voltage is required. A battery may be disposed to generate a power source voltage for the position detection module 11M. However, if a configuration which will described below is achieved, the power source voltage may be generated by energy supply from the position detection sensor side without any battery.

Figure 12:
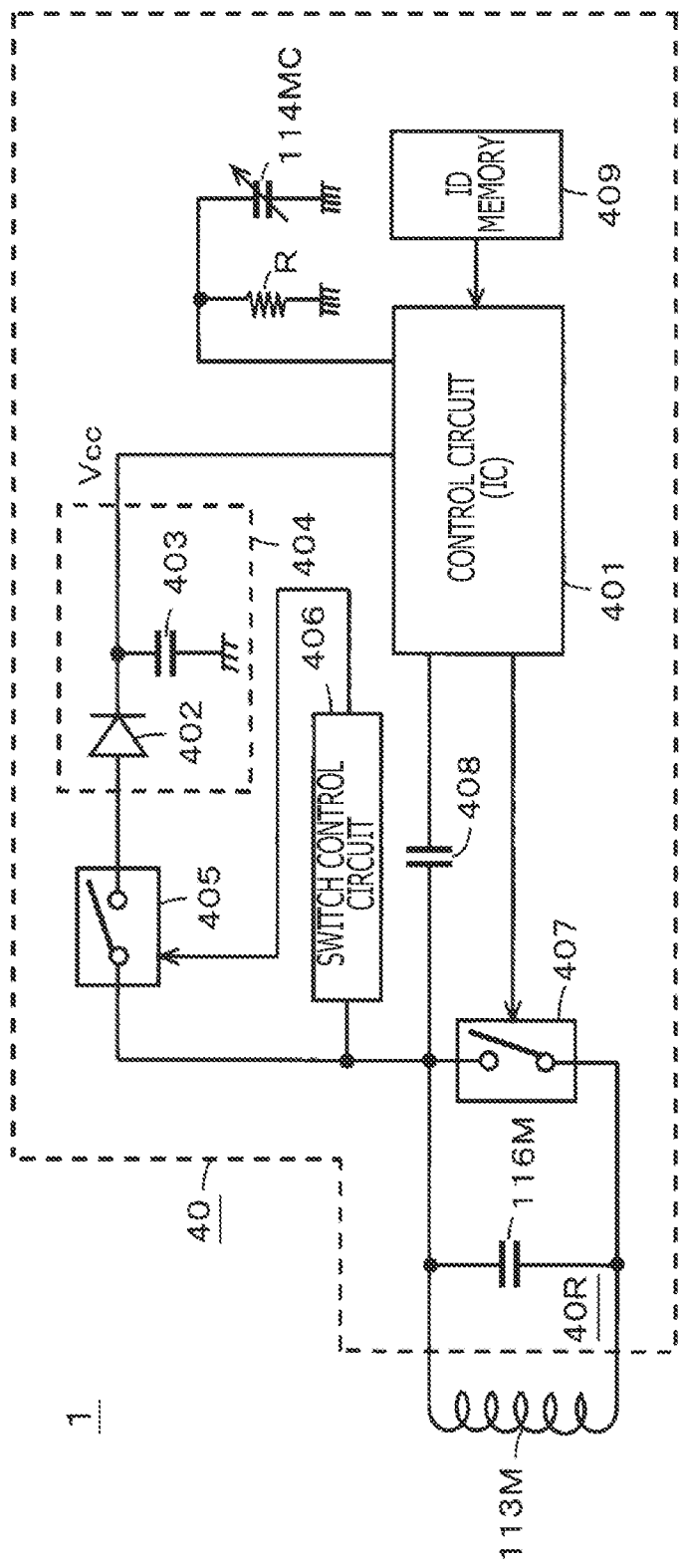
FIG. 12 is a diagram depicting an electronic circuit configuration example of the first function module constituting the position indicator according to the embodiment of the present disclosure.

FIG. 12 depicts a configuration example of an electronic circuit 40 of the circuit board 115M of the position detection module 11M in the above case. In the present example, a resonance circuit 40R of the position detection module 11M of the electronic stylus 1 is configured to exchange a signal for position detection by being electromagnetically induction-coupled with a conductor of the position detection sensor of the tablet 2, and to transmit pen pressure information detected by the pen pressure detector 114M and identification information on the position detection module 11M (hereinafter, the identification information on the position detection module 11M is referred to as identification information ID1) to the position detection sensor 201 of the tablet 2.

Specifically, in the electronic circuit 40, the resonance circuit 40R is formed by connecting the capacitor 116M in parallel with the coil 113M as depicted in FIG. 12. The electronic circuit 40 includes a control circuit 401 that controls transmission of the pen pressure information and the identification information as additional information, as depicted in FIG. 12. In the present example, the control circuit 401 is formed as an integrated circuit (IC).

The IC forming the control circuit 401 is configured to operate with a power source Vcc obtained by rectifying, through a rectification circuit (power source supply circuit) 404 including a diode 402 and a capacitor 403, an AC signal received, as a result of electromagnetic coupling, by the resonance circuit 40R from the position detection sensor 201 of the tablet 2.

In the present example, a switch circuit 405 that is normally in an open state (normal open state) is disposed between the resonance circuit 40R and the rectification circuit 404. In addition, a switch control circuit 406 that generates a switch control signal for turning on the switch circuit 405 by using an AC signal received through the resonance circuit 40R from the position detection sensor 201 of the tablet 2 is disposed. When the electronic stylus 1 is brought close to the tablet 2, the switch circuit 405 is turned on by the switch control signal supplied from the switch control circuit 406, and the power source voltage Vcc is generated from the rectification circuit 404, so that the control circuit 401 enters an operating state.

In the present example, a switch circuit 407 the on/off state of which is controlled by the control circuit 401 is connected in parallel with the resonance circuit 40R including the coil 113M and the capacitor 116M. The control circuit 401 receives a timing signal transmitted from the tablet 2, via a capacitor 408 and controls operation/non-operation of the resonance circuit 40R by controlling the on/off state of the switch circuit 407 on the basis of the timing signal. Accordingly, the control circuit 401 transmits additional information which is digital information in a manner that will be described later.

Further, in the present example, a variable capacitance capacitor 114MC including the pen pressure detector 114M is connected to the control circuit 401, and a resistor R is connected in parallel with the variable capacitance capacitor 114MC, as depicted in FIG. 12. After charging the variable capacitance capacitor 114MC, the control circuit 401 causes the variable capacitance capacitor 114MC to be discharged through the resistor R, and measures a period of time required till the both-end voltage of the variable capacitance capacitor 114MC reaches a predetermined threshold. Accordingly, the capacitance of the variable capacitance capacitor 114MC is measured.

The control circuit 401 calculates a pen pressure value from the measured value of the capacitance in the variable capacitance capacitor 114MC. Then, the control circuit 401 converts information regarding the calculated pen pressure value to a digital signal of multiple bits to control the on/off state of the switch circuit 407. Accordingly, the control circuit 401 converts the information regarding the pen pressure value to an amplitude shift keying (ASK) modulation signal or an on off keying (OOK) modulation signal and transmits the modulation signal to the tablet 2 at a timing that is temporally separated from a timing of a position detection signal.

In the present example, an ID memory 409 is connected to the control circuit 401. The ID memory 409 stores, as identification information ID11M on the position detection module 11M, a unique digital signal of multiple bits including a manufacturer number and a product number, for example.

The control circuit 401 reads out the identification information ID11M stored in the ID memory 409 and controls the on/off state of the switch circuit 407. Accordingly, the control circuit 401 converts the identification information ID11M to an ASK modulation signal or an OOK modulation signal. The control circuit 401 transmits the modulation signal to the tablet 2 at a timing different from the timings of the above-described position detection signal and the pen pressure value information.

Example of Capacitance Method

Figure 13A:
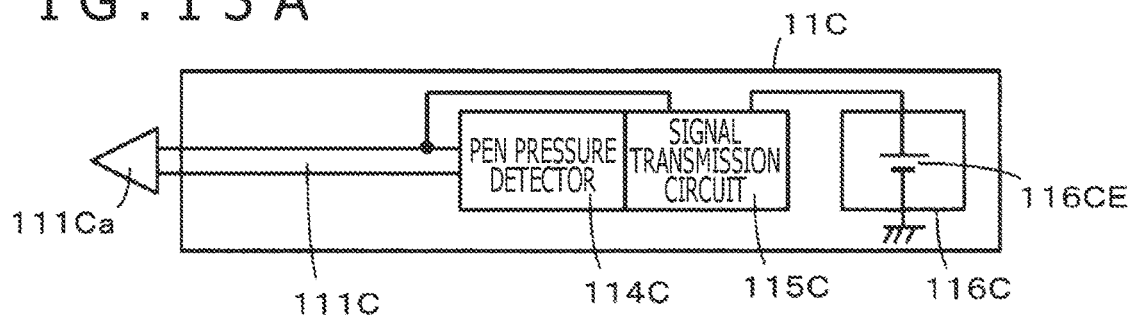
FIGS. 13A and 13B are diagrams for explaining another configuration example of the first function module constituting the position indicator according to the embodiment of the present disclosure.
Figure 13B:
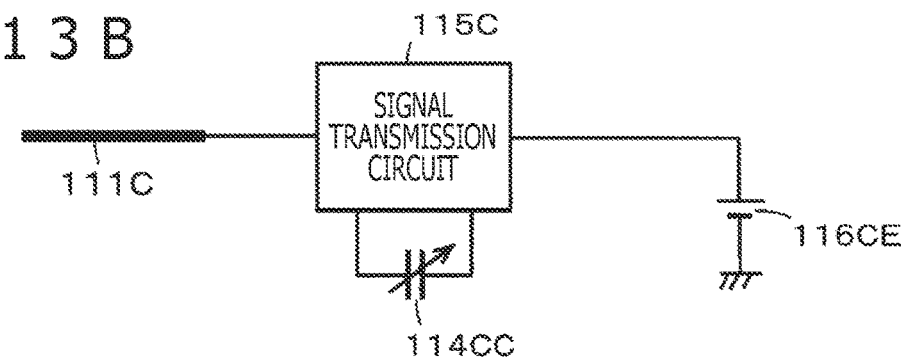

FIGS. 13A and 13B depict a configuration example of a position detection module 11C of the capacitance method. In the present example, the position detection module 11C includes a core body 111C formed from a conductive material, for example, conductive metal, a pen pressure detector 114C, and a signal transmission circuit 115C. Further, in the present example, a primary battery 116CE is disposed as a power source circuit 116C. In the present example, the signal transmission circuit 115C includes an LC oscillation circuit that uses resonance between a coil and a capacitor.

An end opposite to a tip end 111Ca of the core body 111C is fitted to the pen pressure detector 114C. The pen pressure detector 114C detects a pressure (pen pressure) being applied to the tip end 111Ca of the core body 111C during a writing input with the tip end 111Ca of the core body 111C being in contact with the input surface 2a of the tablet 2. In the present example, the pen pressure detector 114C includes a well-known unit that detects a capacitance change, like the pen pressure detector 114M.

A variable capacitance capacitor 114CC including the pen pressure detector 114C is connected to the signal transmission circuit 115C. The resonance frequency of the LC resonance circuit forming the signal transmission circuit 115C varies according to the capacitance in the variable capacitance capacitor 114CC. Specifically, the frequency of a frequency signal outputted from the signal transmission circuit 115C varies according to the capacitance in the variable capacitance capacitor 114CC.

In the present example, a power source voltage is supplied from the primary battery 116CE to the signal transmission circuit 115C, and a signal output end of the signal transmission circuit 115C is connected to the core body 111C including a conductive material.

The electronic stylus 1 including the position detection module 11C of the example in FIG. 13B transmits a frequency signal supplied from the signal transmission circuit 115C, to the position detection sensor of a capacitance-method position detection device of the tablet 2 through the core body 111C.

Figure 14A:
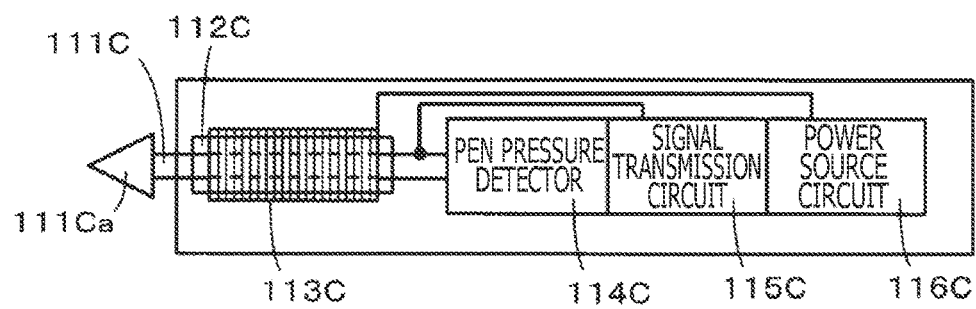
FIGS. 14A and 14B are diagrams for explaining another configuration example of the first function module constituting the position indicator according to the embodiment of the present disclosure.
Figure 14B:
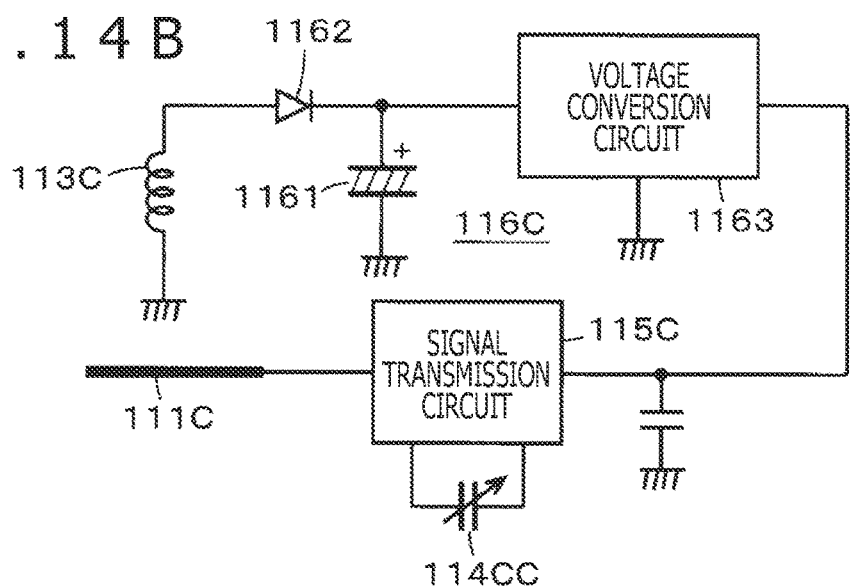

FIGS. 14A and 14B depict another example of the position detection module 11C of the capacitance method. In this example, in place of a primary battery, an electric double layer capacitor 1161 that is charged by a charging circuit of the electromagnetic induction method is used as the power source circuit 116C.

That is, in the position detection module 11C of the present example, a coil 113C is wound around a magnetic core, for example, a ferrite core 112C, having a through hole for allowing the core body 111C to pass therethrough as depicted in FIG. 14A. The core body 111C is fitted to the pen pressure detector 114C through the through hole in the ferrite core 112C.

When the electronic stylus 1 is mounted on a charger (not depicted), an induced electromotive force is generated in the coil 113C of the position detection module 11C by an alternate magnetic field generated by the charger. Accordingly, the electric double layer capacitor 1161 is charged via a diode 1162 as depicted in FIG. 14B. Then, a voltage conversion circuit 1163 converts a voltage stored in the electric double layer capacitor 1161 to a constant voltage and supplies the constant voltage for a power source for the signal transmission circuit 115C. The signal transmission circuit 115C having received the power source transmits a signal of a predetermined frequency to the position detection sensor of the position detection device of the capacitance method of the tablet 2 through the core body 111C.

Figure 15:
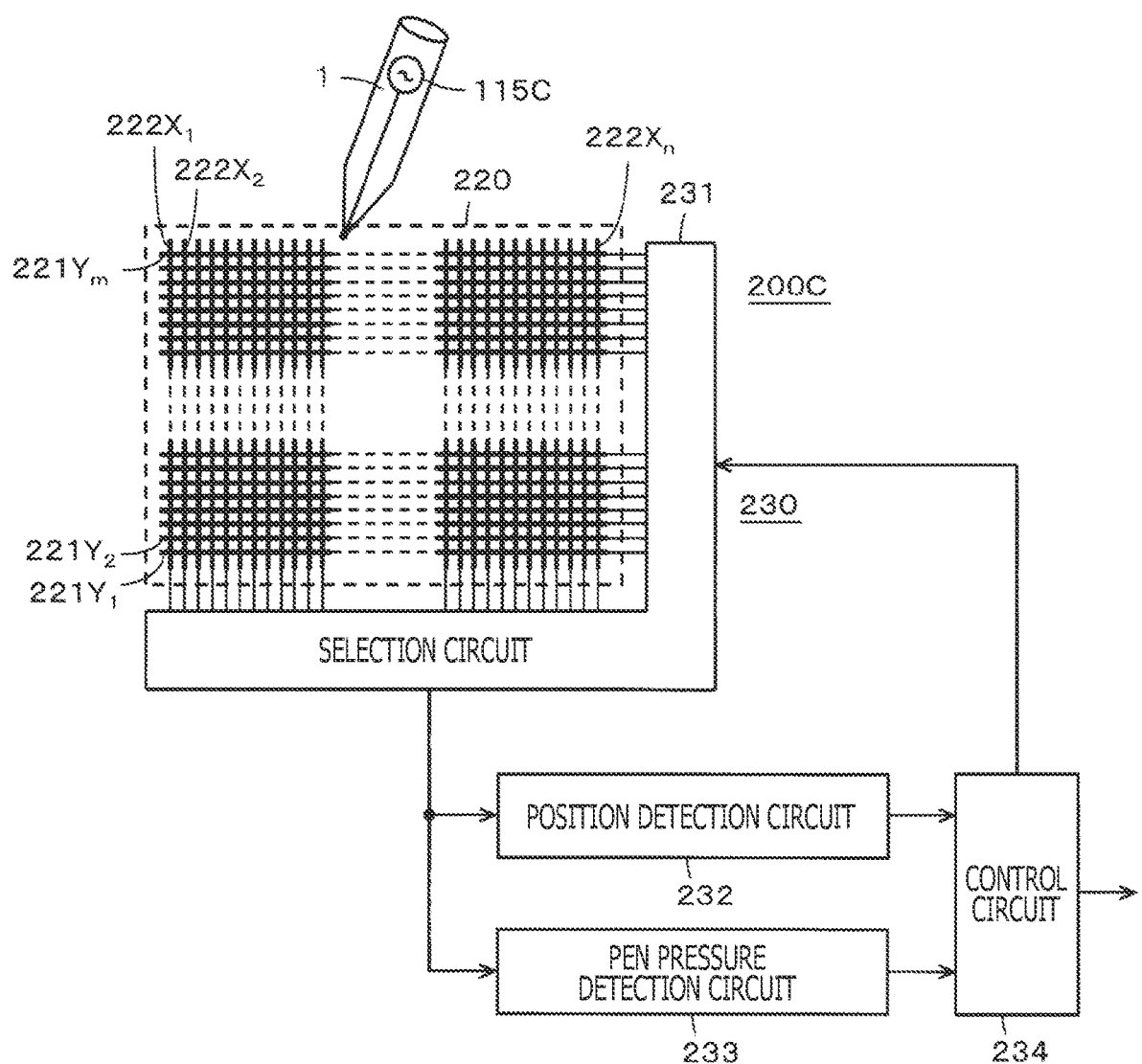
FIG. 15 is a diagram depicting another configuration example of the position detection device that is used with the position indicator according to the embodiment of the present disclosure.

FIG. 15 is a diagram depicting a circuit configuration example of a position detection device 200C of the tablet 2 for conducting position detection by establishing capacitive coupling with the electronic stylus 1 including the position detection module 11C of the present example.

The position detection device 200C of the present example includes a position detection sensor 220 of the capacitance method and a position detection circuit 230 that is connected to the position detection sensor 220, as depicted in FIG. 15. The position detection sensor 220 includes a first conductor group in which a plurality of first conductors $221Y_1$, $221Y_2$, . . . , and $221Y_m$ (m is an integer of 1 or greater) extending in a transverse direction (X-axis direction) in the present example are arranged in parallel at predetermined intervals in the Y-axis direction, and a second conductor group in which a plurality of second conductors $222X_1$, $222X_2$, . . . , and $222X_n$ (n is an integer of 1 or greater) extending in a direction intersecting the extension direction of the first conductors $221Y_1$ to $221Y_m$, in the present example, extending in a longitudinal direction (Y-axis direction) orthogonal to the extension direction of the first conductors $221Y_1$ to $221Y_m$, are arranged at predetermined intervals in the X-axis direction, for example.

In the following explanation, if the first conductors $221Y_1$ to $221Y_m$ are not necessarily differentiated from one another, each of them is referred to as a first conductor 221Y. Similarly, if the second conductors $222X_1$ to $222X_n$ are not necessarily differentiated from one another, each of them is referred to as a second conductor 222X.

The position detection circuit 230 includes a selection circuit 231 that serves as an input/output interface with respect to the position detection sensor 220, a position detection circuit 232, a pen pressure detection circuit 233, and a control circuit 234.

The selection circuit 231 selects one conductor 221Y or 222X from the first conductor group or the second conductor group on the basis of a control signal supplied from the control circuit 234. The position detection circuit 232 extracts, for the conductor selected by the selection circuit 231, only a frequency component of a signal transmitted from the position detection module 11C of the electronic stylus 1 and outputs information corresponding to a signal level of the extracted frequency component, to the control circuit 234. The control circuit 234 calculates the coordinates of a position, on the position detection sensor 220, indicated by the tip end 111Ca of the core body 111C of the position detection module 11C of the electronic stylus 1 on the basis of the information corresponding to the signal level supplied from the position detection circuit 232.

The pen pressure detection circuit 233 detects the frequency of a frequency signal transmitted from the position detection module 11C of the electronic stylus 1 and supplies information regarding the detected frequency to the control circuit 234. On the basis of the frequency information transmitted from the pen pressure detection circuit 233, the control circuit 234 calculates a pen pressure value detected by the pen pressure detector 114C.

Then, the control circuit 234 supplies, to the PC 3, the pen pressure value and the calculated coordinate value of the position indicated by the electronic stylus 1.

It is to be noted that, in the above-described position detection module 11C of the capacitance method, pen pressure value information is transmitted, as a frequency change of a frequency signal supplied from the signal transmission circuit 115C, to the tablet 2. However, the pen pressure value information may be transmitted to the position detection device of the tablet 2 by ASK modulation or OOK modulation of a frequency signal supplied from the signal transmission circuit 115C, in the same manner as in the electronic circuit of the position detection module 11M of the electromagnetic induction method in the example in FIG. 12. In addition, the identification information ID11C on the position detection module 11C also can be transmitted to the position detection device of the tablet 2 by ASK modulation or OOK modulation of a frequency signal supplied from the signal transmission circuit 115C.

It is to be noted that, in the case where the electronic stylus 1 using the position detection module 11C of the capacitance method uses an LC oscillation circuit as the signal transmission circuit 115C, the coil 117 and the side switch 118 are disposed around the casing 13 of the electronic stylus 1, as depicted in FIG. 10, so that the frequency of a frequency signal supplied from the signal transmission circuit 115C also can be changed according to the on/off state of the side switch 118. Therefore, a configuration having a side switch can be achieved.

It is to be noted that, in the above-described position detection module 11M and the above-described position detection module 11C, additional information such as pen pressure value information and identification information ID11M or ID11C may be transmitted, separately from a position detection signal, to the tablet 2 through a wireless communication circuit that is provided by Bluetooth (registered trademark) standard, for example. In this case, however, the position detection module 11M also requires a power source circuit.

Configuration Example of Extension Function Module 12

Figure 16:
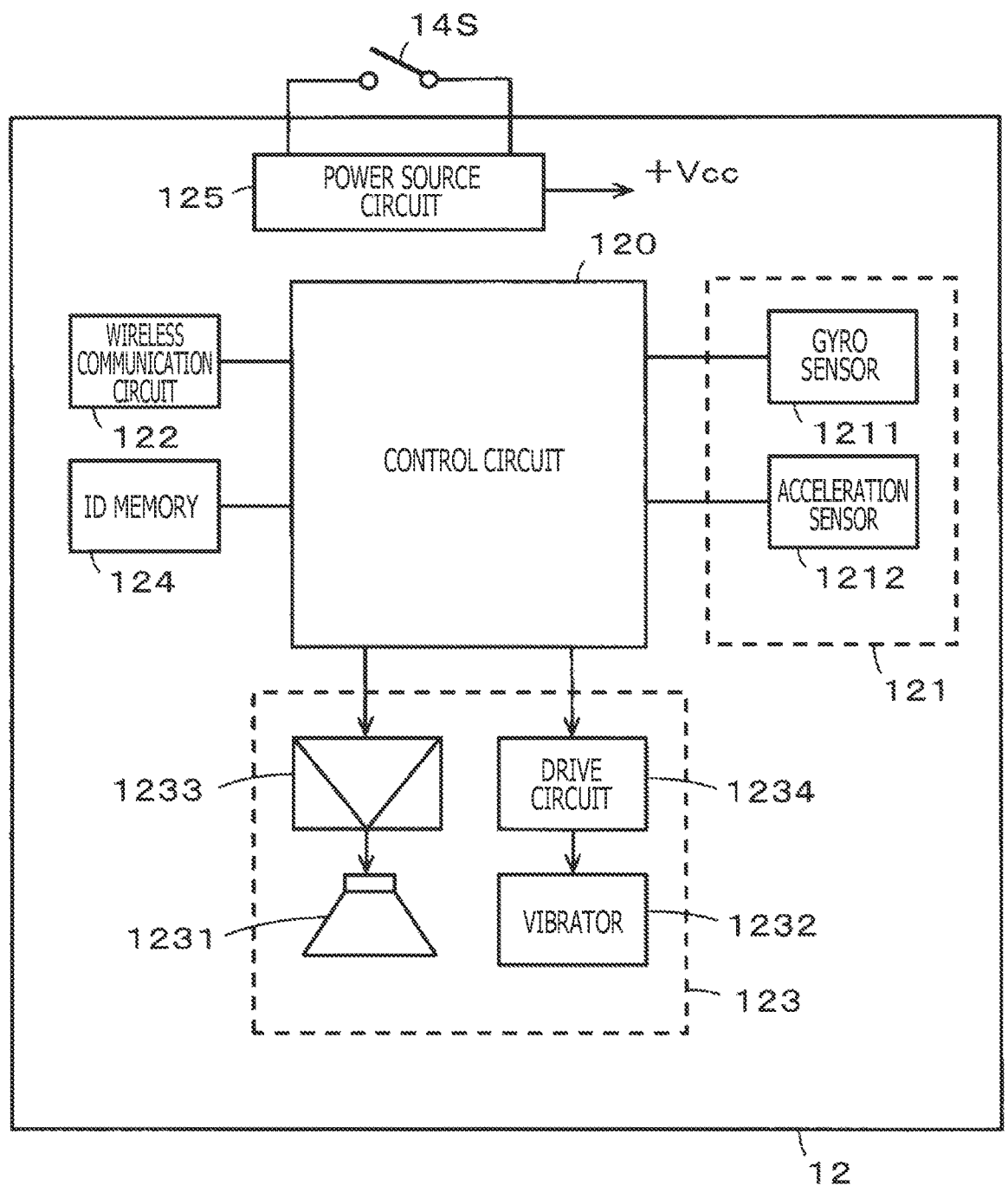
FIG. 16 is a diagram for explaining a configuration example of a second function module constituting the position indicator according to the embodiment of the present disclosure.

Next, a configuration example of the extension function module 12 will be explained. FIG. 16 is a block diagram depicting a configuration example of the extension function module 12. The extension function module 12 in the example of FIG. 16 includes an information generation circuit 121 that generates characteristic selection information and a wireless communication circuit 122 that is an example of a transmission circuit that transmits the generated characteristic selection information, as previously described. In addition, in the present example, the extension function module 12 includes a stimulus generation circuit 123. In the present example, the extension function module 12 further includes an ID memory 124 that stores identification information on the extension function module 12 (hereinafter, referred to as identification information ID2 on the extension function module 12). The identification information ID2 stored in the ID memory 124 is unique information including a manufacturer number and a product number, for example.

The extension function module 12 of the present example is formed by connecting the information generation circuit 121, the wireless communication circuit 122, the stimulus generation circuit 123, and the ID memory 124 to a control circuit 120 that controls the general operation of the extension function module 12. The control circuit 120 includes a microprocessor and is configured t circuit o execute control operation processing in accordance with a previously-installed software program.

The control circuit 120, the information generation circuit 121, and the wireless communication circuit 122 constitute a first function circuit. In addition, the control circuit 120, the information generation circuit 121, and the stimulus generation circuit 123, or the control circuit 120, the wireless communication circuit 122, and the stimulus generation circuit 123 constitute a second function circuit. It is to be noted that a texture detector 10TX, which will be explained later, the control circuit 120, and the stimulus generation circuit 123 constitute the second function circuit, in another case.

A power source circuit 125 is provided to the extension function module 12 of the present example. A power source voltage Vcc generated by the power source circuit 125 is supplied to each of the control circuit 120, the information generation circuit 121, the wireless communication circuit 122, the stimulus generation circuit 123, and the ID memory 124. The power source circuit 125 includes a power storage element which is a primary battery or a rechargeable secondary battery, not depicted in FIG. 16. In the example in FIG. 16, a start switch including a power source switch 14S is connected to the power source circuit 125. When the power source switch 14S is turned on, the power source circuit 125 is started to supply the power source voltage Vcc to the above-described circuits. Accordingly, operation of the extension function module 12 is started.

It is to be noted that both the information generation circuit 121 and the stimulus generation circuit 123 are not necessarily mounted on the extension function module 12. It is sufficient to provide either one of the circuits to the extension function module 12. Also, the ID memory 124 is not necessarily disposed, and can be omitted. Moreover, without providing the wireless communication circuit 122, wired connection may be used to transmit the generated characteristic selection information to the PC 3.

A writing trace of a writing tool depends on a characteristic of a pen tip of the writing tool and a characteristic of a writing medium such as a paper sheet on which writing is performed. Therefore, in the present embodiment, the information generation circuit 121 generates, as characteristic selection information for selecting a display form of displaying a writing trace, information corresponding to a characteristic of the core body 111, particularly, of the tip end 111a, to be brought into contact with the input surface 2a and corresponding to a characteristic of the input surface 2a. In this case, the characteristic selection information may be generated as information (referred to as actual characteristic selection information) that is acquired during an actual writing input with the electronic stylus 1 being in contact with the input surface 2a.

In the present example, motion of the tip end 111a of the core body 111 of the electronic stylus 1 during an actual writing input with the electronic stylus 1 being in contact with the input surface 2a is acquired as the actual characteristic selection information. Therefore, in the present example, the information generation circuit 121 includes motion sensors for detecting motion that corresponds to motion of the tip end 111a of the core body 111 of the electronic stylus 1. As the motion sensors of the present example, a gyro sensor (angular velocity sensor) 1211 and an acceleration sensor 1212 are provided. It is to be noted that the actual characteristic selection information is also actual characteristic correspondence information including information regarding motion corresponding to an actual characteristic of the tip end 111a of the core body 111 of the electronic stylus 1 during an actual writing input with the electronic stylus 1 being in contact with the input surface 2a.

For example, when the tip end 111a of the core body 111 having characteristics such as predetermined hardness, a predetermined shape, a predetermined width, a predetermined size, and a predetermined material is used to input a position indication on the input surface 2a having characteristics such as predetermined surface roughness, a predetermined thickness, and predetermined hardness and a material-unique characteristic, the tip end 111a of the core body 111 moves according to the characteristics of the input surface 2a. The gyro sensor 1211 and the acceleration sensor 1212 each detect motion corresponding to motion of the tip end 111a of the core body 111 and supply a detection output of the detected motion to the control circuit 120.

The control circuit 120 converts, as actual characteristic selection information, the motion detection outputs of the gyro sensor 1211 and the acceleration sensor 1222 received from the information generation circuit 121 to transmission signals to be transmitted to the PC 3, and transmits the transmission signals to the PC 3 via the wireless communication circuit 122. It is to be noted that a motion detection output to be transmitted via the wireless communication circuit 122 of the extension function module 12 is synchronized with a writing input operation that is performed with the core body 111 of the position detection module 11 being in contact with the input surface of the position detection sensor. Therefore, it is obvious that the motion detection output is also timing-synchronized with pen pressure value information and a coordinate output to be transmitted to the PC 3 through the tablet 2.

The control circuit 120 of the present example generates a transmission signal that includes the identification information ID2 read from the ID memory 124. The PC 3 side may recognize the identification information ID2 as identification information on the extension function module 12, and further may recognize the identification information ID2 as identification information on the electronic stylus 1 if the identification information ID1 is not transmitted from the position detection module 11 to the PC 3 through the tablet 2. In the case where the identification information ID1 is transmitted from the position detection module 11 to the PC 3 through the tablet 2, the identification information ID1 and the identification information ID2 are recognized, by the PC 3, as identification information (position detection module ID) regarding the position detection module 11 and identification information (extension function module ID) on the extension function module 12, respectively.

The PC 3 executes a process of, for example, reflecting the received actual characteristic selection information in a writing trace which is displayed as a time-series change of a position indicated by the electronic stylus 1 received from the tablet 2. In this case, the actual characteristic selection information is used as actual characteristic correspondence information including information regarding motion of the pen tip corresponding to an actual characteristic.

Further, the PC 3 uses identification information (the pen ID, the position detection module ID, and the extension function module ID) received from the electronic stylus 1, as information for determining a specific display attribute (e.g., the color, density, or thickness of a writing trace to be displayed) for displaying a writing trace of the electronic stylus 1 on a display screen of the PC 3, or as information for determining a specific attribute (e.g., the hardness or the width) of the core body 111. Moreover, the PC 3 transmits and provides the received actual characteristic selection information to another electronic stylus.

The stimulus generation circuit 123 of the present example includes an actuator that generates a stimulus to be audibly and/or tactilely perceived by the user who is holding the electronic stylus 1, as previously explained. Examples of a stimulus to be audibly perceived include a stimulus caused by sound (acoustic stimulus). As an actuator (acoustic vibrator) that generates an acoustic stimulus, a loudspeaker 1231 is provided in the present example.

At least one of a stimulus caused by power, a stimulus caused by vibration, and a stimulus caused by motion is used as a stimulus to be tactilely perceived by the user who is holding the pen casing 13 of the electronic stylus 1. The stimulus generation circuit 123 includes an actuator that generates the above-described stimuluses. As an actuator that gives a vibration stimulus to the user, a vibrator 1232 is provided in the present example. It is to be noted that a rotational vibrator, an extendable vibrator (e.g., a shaft body movement mechanism using a piezoelectric element, a movement mechanism for moving a shaft body forward and rearward or leftward and rightward with use of a coil) may be used as the actuator that generates a stimulus to be tactilely perceived.

The loudspeaker 1231 is disposed so as to allow the user of the electronic stylus 1 to hear sound emitted from the loudspeaker 1231. Therefore, a plurality of small through holes, not depicted, for releasing sound emitted by the loudspeaker 1231 to the outside are disposed in a lateral circumferential surface of the pen casing 13 of the electronic stylus 1. In addition, the vibrator 1232 is configured to vibrate itself to vibrate the pen casing 13 through the extension function module 12 in such a way that the user can perceive the vibration.

In the extension function module 12 of the electronic stylus 1 of the present example, because the actual characteristic selection information received from the information generation circuit 121 is also actual characteristic correspondence information, the control circuit 120 generates a sound signal corresponding to sound generated by friction between the input surface and the tip end 111a of the core body 111 of the electronic stylus 1 when actual characteristic selection information is obtained. Further, the control circuit 120 generates a vibration drive signal corresponding to vibration to be perceived by the user. In addition, also from actual characteristic selection information received from the PC 3 through the wireless communication circuit 122, the control circuit 120 generates a sound signal and a vibration drive signal in the same manner.

The control circuit 120 of the present example stores information regarding a correspondence table between a sound signal and a vibration drive signal corresponding to information regarding various types of actual characteristics (including various values of motion detection outputs) selected by actual characteristic selection information. By using the correspondence table information, the control circuit 120 generates a sound signal and a vibration drive signal from information (motion detection output) that is generated by the information generation circuit 121 or received via the wireless communication circuit 122 and that corresponds to an actual characteristic selected by the actual characteristic selection information. The table information may previously be stored in the control circuit 120. In the present example, however, the table information is mainly previously stored and held in the PC 3. It is to be noted that the PC 3 can acquire necessary table information from the server device 4 via the communication network 5. The same applies to other table information stored and held in the control circuit 120, which will be described later.

The control circuit 120 supplies the generated sound signal to the loudspeaker 1231 via an amplifier 1233, and supplies the generated vibration drive signal to the vibrator 1232 via a drive circuit 1234. Accordingly, the user can perceive, from the loudspeaker 1231, a stimulus generated by sound corresponding to the actual characteristic selection information, and can perceive, from the vibrator 1232, a vibration stimulus corresponding to the actual characteristic selection information.

Desired Characteristic Selection Information

In the present embodiment, without using the above-described actual characteristic selection information, the user is prompted to designate, as a characteristic for the core body 111 and/or the input surface 2a, a characteristic (desired characteristic) desired for the core body 111 and/or the input surface 2a such that information regarding the designated desired characteristic can be transmitted from the extension function module 12 of the electronic stylus 1 to the PC 3. In the following explanation, information regarding a designated desired characteristic is referred to as desired characteristic selection information.

Figure 17:
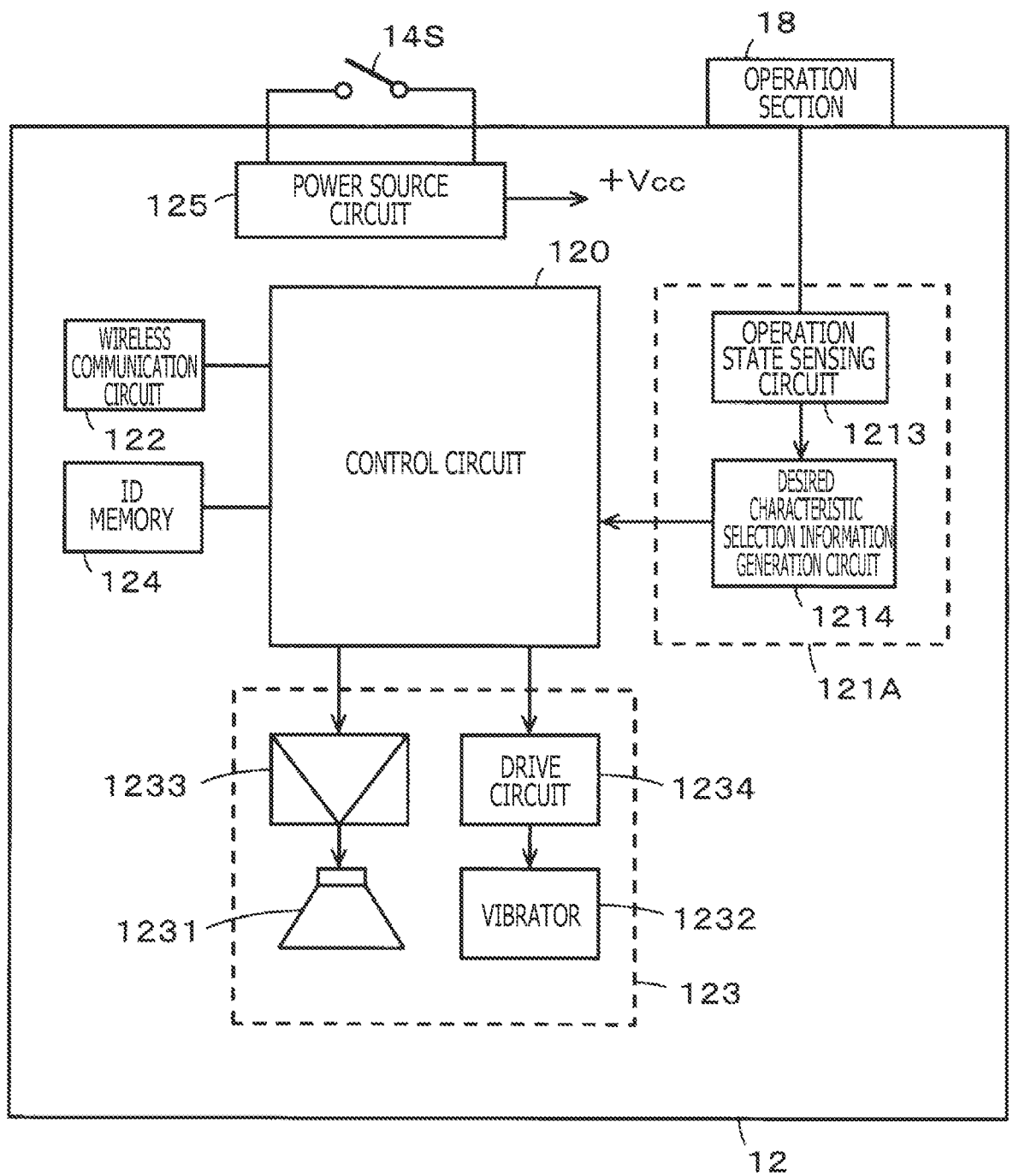
FIG. 17 is a diagram for explaining another configuration example of the second function module constituting the position indicator according to the embodiment of the present disclosure.

FIG. 17 depicts a configuration example of the extension function module 12 of the present example. In the present example, in order to allow the user of the electronic stylus 1 to select and designate a desired characteristic for the core body 111, an operation section 18 that can be operated by the user is provided as depicted in FIG. 17. Further, in the present example, an information generation circuit 121A of the second function module 12 includes an operation state sensing circuit 1213 that detects a desired characteristic designated through the operation section 18 and a desired characteristic selection information generation circuit 1214 that generates, as desired characteristic selection information, designation information based on the detection result obtained by the operation state sensing circuit 1213.

In this case, as the operation section 18, both an operation section for selecting and designating a desired characteristic for the core body 111 and an operation section for selecting and designating a desired characteristic for the input surface 2a may be provided to the electronic stylus 1, or either one of them may be provided to the electronic stylus 1.

Figure 18A:
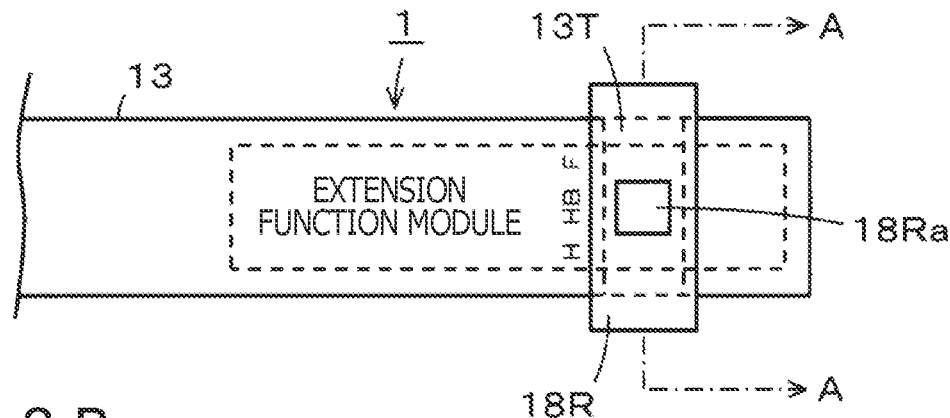
FIGS. 18A and 18B are diagrams for explaining another configuration example of the second function module constituting the position indicator according to the embodiment of the present disclosure.
Figure 18B:
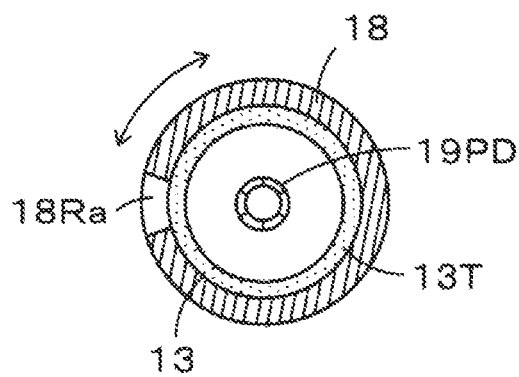
Figure 19:
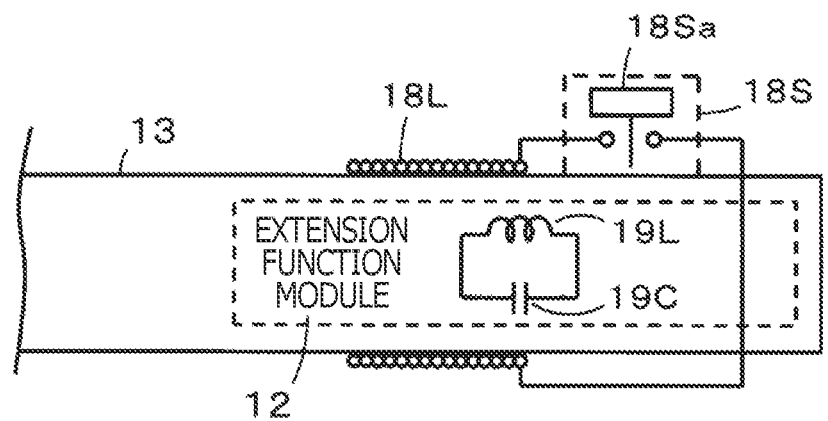
FIG. 19 is a diagram for explaining another configuration example of the second function module constituting the position indicator according to the embodiment of the present disclosure.

FIGS. 18A and 18B and FIG. 19 each depict an example of the operation section 18 though which desired characteristic selection information is designated. FIGS. 18A and 18B and FIG. 19 each depict an example of the operation section for selecting and designating a desired characteristic for the core body 111. In this case, the hardness of the core body 111 is selected as the desired characteristic for the core body 111. For example, for pencils which are writing tools, English letters such as "B," "H," "F," and "HB" are used as indexes for indicating core hardness/density. In the present example, such an English letter for indicating core hardness/density of a pencil is selected as information for designating a desired characteristic for the core body 111.

In the example of FIGS. 18A and 18B, the operation section 18 includes a rotational ring 18R that is disposed in a portion, on the outer circumference of the pen casing 13 of the electronic stylus 1, where the extension function module 12 is disposed in the casing 13 as depicted in FIG. 18A. FIG. 18A is a diagram depicting the rear end side of the electronic stylus 1 where the extension function module 12 is disposed. FIG. 18B is a cross sectional view (A-A cross section) at the position of the rotational ring 18R in FIG. 18A.

The rotational ring 18R is disposed on the outer circumference of the pen casing 13 in such a manner as to be rotatable about the axial center position of the pen casing 13 as depicted in FIGS. 18A and 18B. A portion of the pen casing 13 where the rotational ring 18R is disposed includes a transparent member 13T that allows external light to pass therethrough, as depicted in FIGS. 18A and 18B. An opening 18Ra formed of a through hole is formed in a predetermined position in the circumferential direction in the rotational ring 18R. Therefore, external light enters the inside of the pen casing 13 through the opening 18Ra in the rotational ring 18R and the transparent member 13T in the pen casing 13.

For the extension function module 12 disposed in the pen casing 13, a transparent casing that allows light to pass therethrough is used, if provided. In a position, in the extension function module 12, for receiving light entering from the opening 18Ra in the rotational ring 18R, a light reception sensor 19PD for detecting light entering from the opening 18Ra is disposed along the circumferential direction about the axial center position of the pen casing 13. The light reception sensor 19PD has a plurality of divisional regions in the circumferential direction as depicted in FIG. 18B. The light reception sensor 19PD constitutes the operation state sensing circuit 1213 of the information generation circuit 121A.

Light detection outputs from the respective divisional regions of the light reception sensor 19PD are supplied to the desired characteristic selection information generation circuit 1214 of the information generation circuit 121A. The desired characteristic selection information generation circuit 1214 detects a rotational angular position of the opening 18Ra in the rotational ring 18R on the basis of which one of the divisional regions of the light reception sensor 19PD has a maximum level of light detection output.

In the present example, pencil core hardness/density as a characteristic of the core body 111, which is an example of a desired characteristic, is previously assigned to each of the divisional regions of the light reception sensor 19PD. The desired characteristic selection information generation circuit 1214 detects the pencil core hardness/density assigned to the divisional region having the maximum level of light detection output in the light reception sensor 19PD, and generates desired characteristic selection information for designating the detected pencil core hardness/density.

In this case, the desired characteristic selection information generation circuit 1214 may have correspondence table information on desired characteristic selection information corresponding to the designated hardness of the core body 111, and may generate desired characteristic selection information corresponding to the designated hardness of the core body by using the correspondence table information. The control circuit 120 transmits the desired characteristic selection information generated by the information generation circuit 121A to the PC 3 via the wireless communication circuit 122.

Further, the control circuit 120 stores information regarding a correspondence table between a sound signal and a vibration drive signal corresponding to information regarding various desired characteristics designated by the desired characteristic selection information. By using the correspondence table information, the control circuit 120 generates a sound signal and a vibration drive signal corresponding to a desired characteristic designated by the desired characteristic selection information generated by the information generation circuit 121A or received via the wireless communication circuit 122.

The PC 3 performs a process of, for example, reflecting the received desired characteristic selection information in display of a writing trace which is a time-series change of an indication position of the electronic stylus 1 received from the tablet 2, which will be described later. In addition, the PC 3 can transmit and provide the received desired characteristic selection information to another electronic stylus.

As depicted in FIG. 18A, letters such as "F," "HB," and "H" which each indicate pencil core hardness/density to be designated as a desired characteristic for the core body 111 are printed near the rotational ring 18R on the pen casing 13. By using the printed letters as a guide, the user can designate hardness of the core body 111, which is one example of a desired characteristic, by rotating the rotational ring 18R to adjust the position of the opening 18Ra to the position of the letter indicating the desired hardness of the core body 111.

It is to be noted that, as a desired characteristic, a characteristic of the input surface 2a of the position detection sensor may be designated, instead of a characteristic of the core body 111, by the rotational ring 18R. In this case, different characteristics of the input surface 2a are assigned to the divisional regions of the light reception sensor 19PD. Since the characteristic is determined by the material of the input surface 2a, "glass surface," "hard resin surface," "soft resin surface," "Kent paper," "Japanese paper," and the like can be assigned for designation.

In the example of FIGS. 18A and 18B, the rotational angular position of the rotational ring 18R is optically detected. However, the method for detecting the rotational angular position of the rotational ring 18R is not limited to this example. For example, the rotational angular position of the rotational ring 18R may be magnetically detected. That is, in the case where the rotational angular position is magnetically detected, a magnet is mounted in the position of the opening 18Ra, in place of the opening 18Ra, in the rotational ring 18R. Then, in the extension function module 12, instead of the light reception sensor 19PD having a plurality of divisional regions in the circumferential direction, a plurality of magnetic sensors may be disposed at an interval in the circumferential direction, and further, a correspondence between the respective magnetic sensors and different characteristics (the hardness, for example) of the core body 111 or different characteristics (materials, for example) of the input surface 2a may be defined.

The rotational ring 18R in the above-described embodiment is disposed on the outer circumference of the pen casing 13. However, in a case where the extension function module 12 has a casing and the tail end side of the casing is projected from the pen casing, the rotational ring 18R may be disposed on an outer circumference of the portion, of the casing of the extension function module 12, projected from the tail end side of the pen casing 13.

In addition, the operation section for designating characteristic selection information is not limited to the example using the rotational ring depicted in FIGS. 18A and 18B.

FIG. 19 depicts another example of the operation section for designating characteristic selection information. In this example, a switch operation section that is similar to the side switch disposed on the position detection module 11 is used.

In the example of the operation section 18 depicted in FIG. 19, a switch operation section 18S that is similar to the side switch disposed on the position detection module 11 depicted in FIG. 10 is disposed on the outer circumference of the pen casing 13 of the electronic stylus 1 such that the user can operate the switch operation section 18S. The switch operation section 18S is connected between the winding start and the winding end of a coil 18L that is wound around a position on the outer circumference of the pen casing 13 where the extension function module 12 is housed, in the same manner as that in FIG. 10.

In the present example, the operation state sensing circuit 1213 of the information generation circuit 121A of the extension function module 12, which has been depicted in FIG. 17, includes a resonance circuit including a coil 19L and a capacitor 19C. The desired characteristic selection information generation circuit 1214 detects an on/off state of the switch operation section 18S by monitoring the resonance frequency of the resonance circuit of the operation state sensing circuit 1213, which varies due to the influence of the coil 18L according to the on/off state of the switch operation section 18S. Furthermore, the desired characteristic selection information generation circuit 1214 detects the number of times of repetitions of on/off operations of the switch operation section 18S and the duration of the on time, and generates desired characteristic selection information indicating a desired characteristic designated by the user on the basis of the detection result.

It is to be noted that the information generation circuit of the second function module 12 may have a function of generating both actual characteristic selection information and desired characteristic selection information, and may be configured to generate either actual characteristic selection information or desired characteristic selection information based on the user's selection and transmit the generated characteristic selection information to the PC 3.

Texture Detector

The electronic stylus 1 may include a texture detector that detects textures including a material texture, a raw material texture, a touch texture, and the like of the input surface 2a of the tablet 2, in addition to the position detection module 11 and the extension function module 12.

Figure 20:
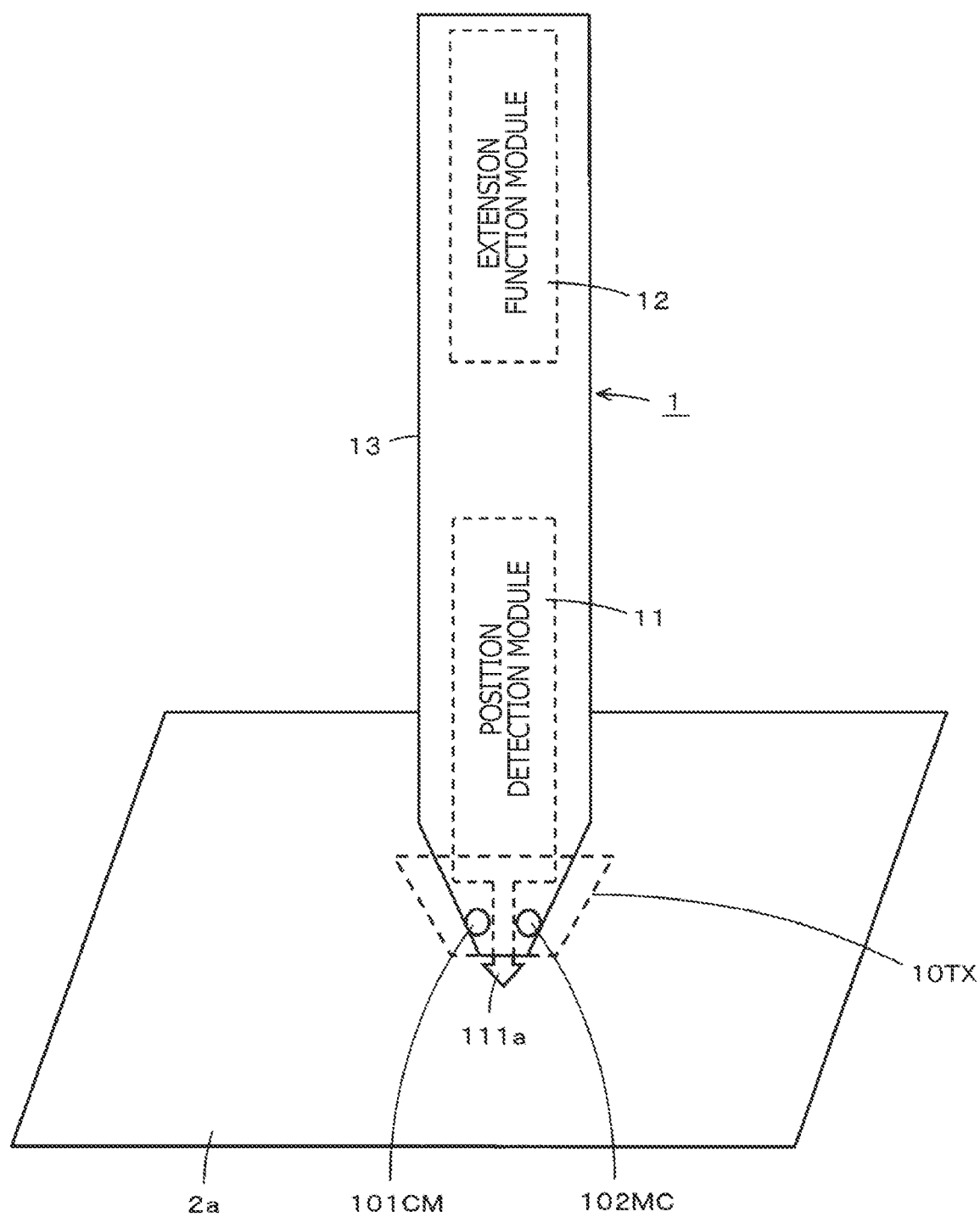
FIG. 20 is a diagram depicting another configuration example of the position indicator according to the embodiment of the present disclosure.

FIG. 20 is a diagram for explaining an example of the electronic stylus 1 including the texture detector. In the electronic stylus 1 of the present example, the position detection module 11 and the extension function module 12 are arranged, inside the pen casing 13, side by side in the axial direction of the pen casing 13 as previously explained, and further, a texture detector 10TX is provided to the pen casing 13 on the tip end 111a side of the core body 111 of the position detection module 11.

In the present example, the texture detector 10TX includes an imaging element 101CM and a microphone 102MC. The imaging element 101CM is mounted in a predetermined position on the outer circumference of the pen casing 13 and is disposed so as to capture the front side of the input surface 2a of the tablet 2. One imaging element 101CM may be disposed, or a plurality of imaging elements 101CM may be disposed in different positions on the outer circumference. The microphone 102MC is also mounted in a predetermined position on the outer circumference of the pen casing 13 and is disposed so as to collect sound generated by friction between the tip end 111a of the core body 111 of the electronic stylus 1 and the front side of the input surface 2a of the tablet 2. One microphone 102MC may be disposed, or a plurality of microphones 102MC may be disposed in different positions on the outer circumference.

In the present example, the texture detector 10TX includes a power source circuit equipped with a primary battery or a secondary battery, which is not depicted, to supply a power source voltage for the imaging element 101CM and the microphone 102MC. In addition, in the present example, the texture detector 10TX includes a wireless communication circuit that performs short-distance wireless communication conforming to the Bluetooth (registered trademark) standard, for example, and thus, has a function of transmitting captured image data on the input surface 2*a* obtained by the imaging element 101CM and sound data collected by the microphone 102MC, to the PC 3.

It is to be noted that, without providing any wireless communication circuit to the texture detector 10TX, the captured image data on the input surface 2*a* obtained by the imaging element 101CM and the sound data collected by the microphone 102MC may be inputted to the control circuit 120 of the extension function module 12, and the control circuit 120 may transmit the data to the PC 3 through the wireless communication circuit 122. Alternatively, without having a power source circuit, the texture detector 10TX may be configured to receive supply of a power source voltage from the extension function module 12.

In the PC 3, the texture detection information received from the texture detector 10TX, in the present example, the captured image data on the input surface 2*a* obtained by the imaging element 101CM and the sound data collected by the microphone 102MC, is subjected to processing that is similar to the above-described processing performed on the actual characteristic selection information in the extension function module 12. That is, the captured image data on the input surface 2*a* obtained by the imaging element 101CM and the sound data collected by the microphone 102MC are information corresponding to an actual characteristic of the input surface 2*a* and can be treated as actual characteristic selection information.

Therefore, in a case where the captured image data on the input surface 2*a* obtained by the imaging element 101CM and the sound data collected by the microphone 102MC are supposed to be inputted to the control circuit 120 of the extension function module 12, the control circuit 120 may transmit, as actual characteristic selection information, the motion detection output information obtained from the information generation circuit 121 and the captured image data and the sound data obtained from the texture detector 10TX, to the PC 3.

In addition, the control circuit 120 of the extension function module 12 may have a function of generating a drive signal for driving the loudspeaker 1231 and the vibrator 1232 of the stimulus generation circuit 123, from the captured image data and the sound data each of which is an example of a texture detection output from the texture detector 10TX. This configuration is not limited to the case where the captured image data and the sound data each of which is an example of a texture detection output from the texture detector 10TX are supposed to be inputted to the control circuit 120 of the extension function module 12. The reason for this is that the control circuit 120 may receive the captured image data and the sound data which are texture detection outputs from the texture detector 10TX, from the PC 3 via the wireless communication circuit 122, and may generate a drive signal based on the received data.

It is to be noted that the electronic stylus 1 in the example of FIG. 20 may have a configuration in which the extension function module 12 does not include an information generation circuit that obtains a motion detection output as actual characteristic selection information, but includes the texture detector 10TX to transmit a texture detection output as actual characteristic selection information to the PC 3.

Alternatively, the electronic stylus 1 may include the texture detector 10TX and the position detection module 11 without including the extension function module 12. In this case, a power source circuit and a wireless or wired communication section for transmitting a texture detection output to the PC 3 are provided to the texture detector 10TX.

Not only in the case where the electronic stylus 1 has the position detection module 11 and the extension function module 12 housed in the pen casing 13 but also in the case where the electronic stylus 1 has a cap type pen configuration in FIGS. 13A and 13B, the electronic stylus 1 according to the above-described embodiment explained so far is used while being held by a user's dominant hand during a writing input on the input surface 2*a* of the tablet 2 in a state where the position detection module 11 and the extension function module 12 are arranged in the axial direction of the pen casing 13.

However, in the case where the extension function module 12 is formed separately from the pen casing 13 as in the example in FIGS. 13A and 13B, the extension function module 12 and the pen casing 13 may be used while being individually held by the dominant hand and the non-dominant hand of the user during use.

Figure 21A:
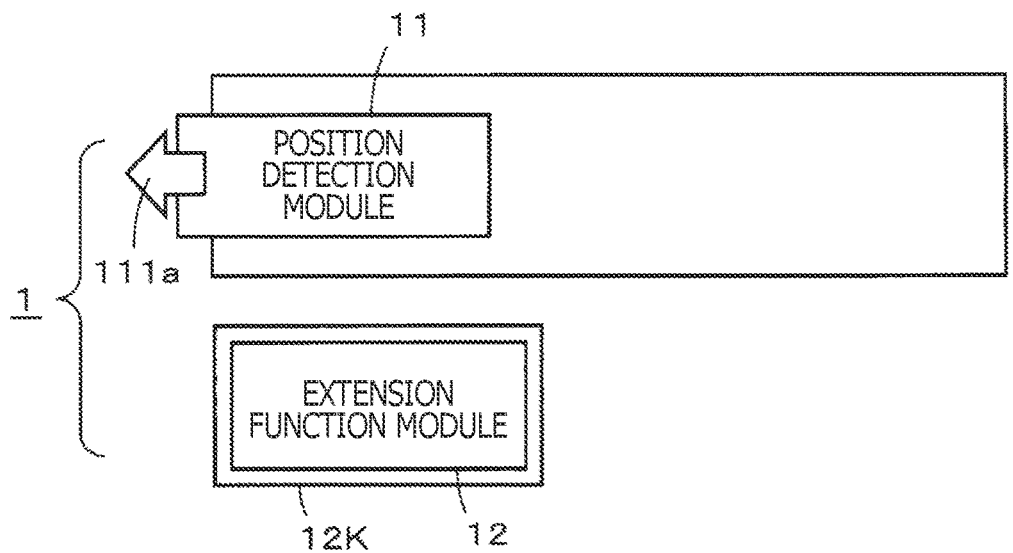
FIGS. 21A and 21B are diagrams depicting another configuration example of the position indicator according to the embodiment of the present disclosure.
Figure 21B:
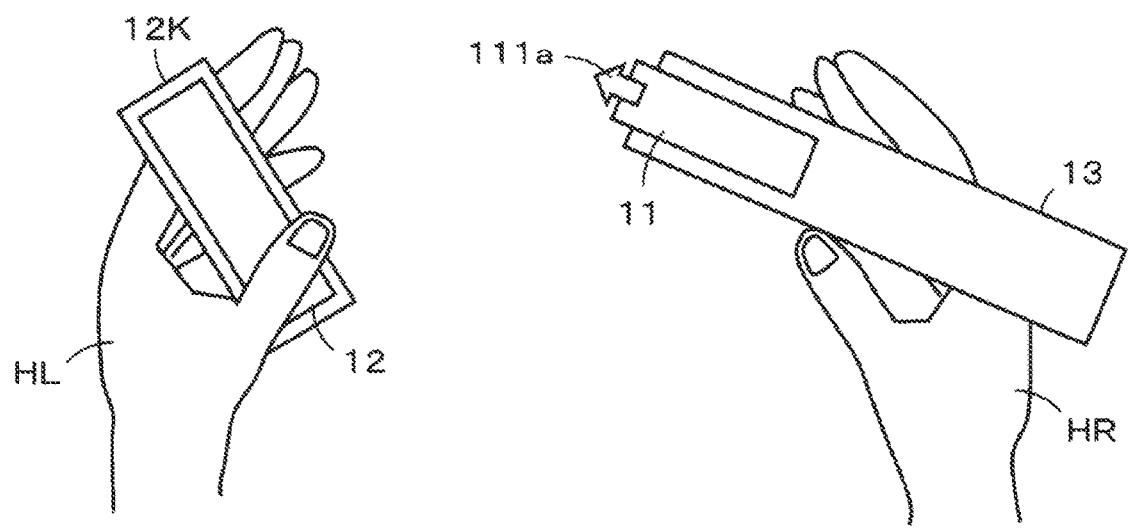

FIGS. 21A and 21B depict an example of the electronic stylus 1 in this case. In this example, only the position detection module 11 is housed in the pen casing 13 such that the tip end 111*a* of the core body 111C of the position detection module 11 is projected from an opening that is defined on one end side in the axial direction of the pen casing 13, while the extension function module 12 is housed in an extension function module casing 12K which is separate from the pen casing 13, as depicted in FIG. 21A.

During use, the pen casing 13 is held by the user's dominant hand HR to perform a writing input on the input surface 2*a* of the tablet 2, and the extension function module casing 12K is held by the user's non-dominant hand HL. The extension function module 12 of the electronic stylus 1 in FIGS. 21A and 21B does not include the information generation circuit 121 of the above-described example but includes the wireless communication circuit 122 and the stimulus generation circuit 123.

Next, some processing operation examples of an input system including the electronic stylus 1 having the above-described configuration, the tablet 2, and the PC 3 will be explained.

Processing Operation Example 1 of Input System; Determining Display Form of Writing Trace Processing Operation Example 1-1: Determining Display Form of Writing Trace of Electronic Stylus 1 According to Actual Characteristic Selection Information FIG. 22 is a block diagram for explaining a processing operation example 1 of the input system. In this example, in accordance with a drawing software program having been installed in the PC 3, the PC 3 displays, on the display screen 32D of the display device 32, a display image of a writing trace of the electronic stylus 1 inputted to the input surface 2*a* of the tablet 2, in a display form based on characteristic selection information supplied from the extension function module 12 of the electronic stylus 1. It is to be noted that, also in another processing operation example of the input system which will be explained later, the PC 3 displays a writing trace of the electronic stylus 1 obtained from the tablet 2 in accordance with a drawing software program having been installed in the PC 3.

As depicted in FIG. 22, the electronic stylus 1 of the input system of the present example includes the position detection module 11 of the electromagnetic induction method, and includes a coil 113M constituting a resonance circuit that is electromagnetically coupled with the position detection sensor of the tablet 2 and that performs signal interaction, and a pen pressure detector 114M. The extension function module 12 of the electronic stylus 1 of the present example includes the control circuit 120, the information generation circuit 121, the wireless communication circuit 122, the ID memory 124, and the power source circuit 125, but does not include the stimulus generation circuit 123. It is to be noted that the position detection module 11 may adopt the capacitance method as previously described. The same applies to examples described later.

The PC 3 of the input system of the present example includes a tablet output processing circuit 311 that receives and processes a tablet output from the tablet 2, a wireless communication circuit 312 that communicates with the wireless communication circuit 122 of the electronic stylus 1, a display form determination circuit 313, and a display information generation circuit 314. In this case, the PC 3 can process, in real time, the tablet output from the tablet 2 and information received from the extension function module 12 of the electronic stylus 1 via the wireless communication circuit 312 as the tablet output and the information are considered to be synchronized in terms of timing.

The display form determination circuit 313 determines a display form of a writing trace to be displayed on the display screen 32D of the display device 32 on the basis of characteristic selection information received via the wireless communication circuit 312 from the electronic stylus 1 and pen pressure value information supplied from the tablet output processing circuit 311.

The display information generation circuit 314 generates writing trace information from information regarding the coordinates of the tip end 111a of the core body 111 of the electronic stylus 1 supplied from the tablet output processing circuit 311, generates display information regarding the generated writing trace information on the basis of the display form determined by the display form determination circuit 313, and supplies the display information to the display device 32 to display the writing trace display information on the display screen 32D.

Figure 23:
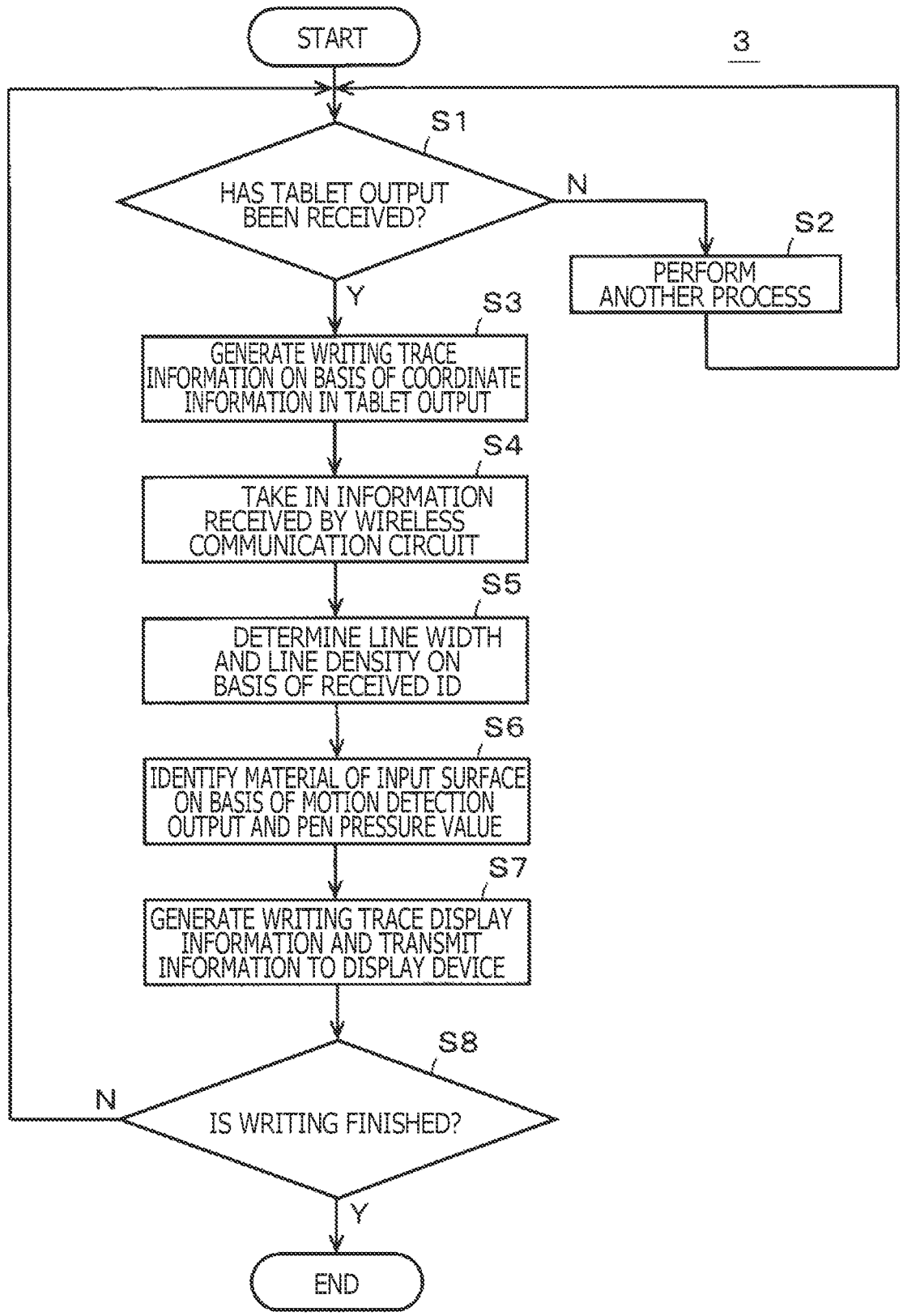
FIG. 23 is a flowchart for explaining a processing operation example in the input system according to the embodiment of the present disclosure, the input system using the position indicator according to the embodiment of the present disclosure.

It is to be noted that the tablet output processing circuit 311, the display form determination circuit 313, and the display information generation circuit 314 of the PC 3 are implemented by functional processing based on the program in the processor of the PC 3. FIG. 23 is a flowchart of an example of a processing flow that is executed by the processor of the PC 3 in accordance with a program. Hereinafter, a processing operation of the input system of the present example will be explained according to the flowchart.

In the present example, the user turns on a power source switch of the extension function module 12, holds the electronic stylus 1, and performs a writing input on the input surface 2a of the position detection sensor of the tablet 2. Subsequently, the position detection circuit performs signal interaction with a resonance circuit including the coil 113M of the position detection module 11 of the electronic stylus 1 through the position detection sensor 20 of the tablet 2. Accordingly, in the above-described manner, the position detection circuit detects a position indicated and inputted by the tip end 111a of the core body 111 of the electronic stylus 1, generates coordinate information corresponding to the writing input, and obtains information regarding the pen pressure value detected at the time by the electronic stylus 1. The tablet 2 transmits the generated coordinate information and pen pressure value information to the PC 3. For example, the pen pressure value changes according to a writing input target or a user's habit, as depicted in FIG. 24A.

Here, the information generation circuit 121 of the extension function module 12 of the electronic stylus 1 detects motion that corresponds to motion of the tip end 111a of the core body 111 of the electronic stylus 1 by using the gyro sensor 1211 and the acceleration sensor 1212. A detection output of the detected motion changes mainly according to the surface state (e.g., the surface roughness or the hardness) corresponding to the material of the input surface 2a, as depicted in FIG. 24B, for example. The influence of the pen pressure value is also exerted on the output. The extension function module 12 wirelessly transmits the detection output of the detected motion as actual characteristic selection information, together with the identification information ID2 read from the ID memory 124, to the PC 3 via the wireless communication circuit 122.

In the PC 3, whether or not a tablet output including coordinate information and pen pressure value information has been received from the tablet 2 is monitored (S1 in FIG. 23). In a case where it is determined that no tablet output has been received, another process is executed (S2). After the other process is finished, the processing returns to S1. In a case where it is determined, at S1, that a tablet output has been received, the PC 3 generates writing trace information from the coordinate information included in the tablet output (S3).

The PC 3 takes in information received by the wireless communication circuit 312 (S4) and determines the width and density of a line to indicate the writing trace on the basis of the identification information ID2 included in the received information (S5). In this case, since the PC 3 has obtained and stored correspondence table information between identification information ID2 and a line width/line density from the server device 4 via the communication network 5, the PC 3 determines the line width and the line density on the basis of the identification information ID2 at S4, with reference to the stored table information. It is to be noted that both the line width and the line density may be determined, or either one of the line width and the line density may be determined, or the color of the line corresponding to the identification information ID2 may additionally be determined.

Subsequently, the PC 3 extracts a motion detection output as actual characteristic selection information from the information received by the wireless communication circuit 312, eliminates, from the extracted motion detection output, the influence of a pen pressure value obtained from the tablet output processing circuit 311, and then identifies the material of the input surface 2a of the tablet 2 on the basis of the resultant motion detection output (S6).

In this case, the motion detection output varies according to the material of the input surface 2a of the tablet 2 as depicted in FIG. 24B. In the server device 4, information regarding a correspondence table between a plurality of change types of motion detection output for respective materials of the input surface 2a of the tablet 2 and materials corresponding to the change types is prepared, as depicted in FIG. 25. The PC 3 previously obtains and stores the correspondence table information from the server device 4 via the communication network 5. With use of the correspondence table information, the material of the input surface 2a is identified on the basis of the motion detection output extracted from the information received by the wireless communication circuit 312.

It is to be noted that, instead of using such correspondence table information, the PC 3 may analyze motion detection output information and make a calculation on the material-corresponding type of the motion detection output.

Subsequent to S6, the PC 3 generates, on the basis of the line width/line density determined at S5 and the material of the input surface 2*a* identified at S6, writing trace display information regarding a display form just like writing is directly performed on the input surface 2*a* of the identified material with a writing tool, and transmits the generated display information to the display device 32 such that the display information is displayed on the display screen 32D (S7). In this case, when writing trace display information is generated, the pen pressure value information extracted from the tablet detection output may be taken into account. Whether or not to take the pen pressure value information into account can be decided by the user. In the case where the pen pressure value information is not taken into account in the display information, a writing trace from which a user's writing habit has been eliminated is expected to be displayed.

Subsequent to S7, the PC 3 determines whether or not the writing is finished on the basis of whether or not the tablet detection output is stopped for a predetermined time period or longer (S8). In the case where it is determined, at S8, that the writing is not finished, the processing is returned to S1, and then, the PC 3 repeats the processing from S1. In the case where it is determined, at S8, that the writing is finished, the PC 3 ends the processing routine.

In this manner, the PC 3 can display a writing trace of the electronic stylus 1 obtained from the tablet 2, in a writing trace display form including a writing blur or the like according to the material of the input surface 2*a* or the hardness of the core body 111 of the electronic stylus 1 during actual writing using the electronic stylus 1, instead of displaying a writing trace in a uniform display form with a uniform line width or uniform line density while regarding the writing trace as mere continuous pieces of coordinate information. Therefore, this example provides a prominent effect that a writing trace, which is similar to that obtained when drawing is performed on a writing medium such as a paper medium with a pencil or the like, can be displayed on the display screen 32D according to the writing medium or the pencil core hardness.

It is to be noted that, in the above processing example, the material of the input surface 2*a* is identified at S6, and the writing trace is displayed as if a writing input is performed on the identified material. However, S6 may be omitted, and at S7, display information for changing the line width and the line density determined at S5 (including a change of the line width and a change of the line density) according to a motion detection output (including the relevance to the pen pressure value), may be generated.

It is to be noted that, in the above processing example, the PC 3 determines the line width and the line density by using the identification information ID2 supplied from the extension function module 12, but the identification information ID1 (ID11M or ID11C) obtained from the ID memory disposed in the position detection module 11 may be used instead. The same applies to examples below.

Processing Operation Example 1-2: Determining Display Attribute and Display Form of Writing Trace of Electronic Stylus 1 According to Desired Characteristic Selection Information The electronic stylus 1 constituting the input system of the present example includes, as an example of the operation section for designating desired characteristic selection information, the rotational ring 18R that is disposed in a position, on the outer circumferential portion of the pen casing 13 of the electronic stylus 1, where the extension function module 12 is disposed, as depicted in FIG. 18A. In the present example, the user is allowed to select the material of the input surface 2*a* through the rotational ring 18R. The extension function module 12 is configured to transmit, as desired characteristic selection information, information regarding the selected material of the input surface 2*a* to the PC 3 via the wireless communication circuit 122.

Further, in the present example, the PC 3 identifies the hardness and the thickness of the core body 111 on the basis of the identification information ID2 supplied from the extension function module 12 and determines a line width and a line density. In the present example, a motion detection output generated by the information generation circuit 121 is not transmitted from the extension function module 12 to the PC 3.

In the present example, the PC 3 receives information regarding selection of a rotation angle position of the opening 18Ra of the rotational ring 18R from the extension function module 12, and identifies the material of the input surface 2*a* selected and designated by the user with reference to table information previously stored and held, as previously explained. Further, the PC 3 determines the line width and line density of a writing trace on the basis of the identification information ID2 in the above-described manner.

Subsequently, the PC 3 receives coordinate information regarding the tip end 111*a* of the core body 111 of the electronic stylus 1 acquired from the tablet 2, generates writing trace information, and generates information for displaying the generated writing trace information so as to implement a writing trace on the input surface 2*a* of the identified material. In the generated writing trace display information, pen pressure value information included in information acquired from the tablet 2 can be reflected as in the above-described example. Whether or not to reflect the pen pressure value information can be determined by the user, as previously explained.

In the PC 3 of the present example, a writing blur of the electronic stylus 1 corresponding to the material of the input surface 2*a* selected and designated by the user can be included in the display form of the writing trace. Therefore, the present example provides a prominent effect that, irrespective of the actual material of the input surface 2*a*, a writing trace of a writing input performed with an electronic stylus on an input surface of a material desired by the user can be displayed on the display screen 32D.

It is to be noted that hardness of the core body 111 may be selected and designated through the rotational ring 18R of the electronic stylus 1, and the material of the input surface 2*a* may be determined according to identification information (ID) supplied from the extension function module 12. In addition, a combination of hardness of the core body 111 and the material of the input surface 2*a* may be selected and designated through the rotational ring 18R of the electronic stylus 1. Moreover, both the function of selective designation using the rotational ring 18R and the function of selective designation using the switch section depicted in FIGS. 18A and 18B may be provided to the electronic stylus 1 such that one of the functions selects and designates a characteristic such as the hardness of the core body 111 of the electronic stylus and the other of the functions selects and designates the material of the input surface 2a.

Processing Operation Example 1-3: Determining Display Form of Writing Trace of Electronic Stylus 1 According to Texture Detection Output from Texture Detector 10TX The electronic stylus 1 constituting the input system of this example includes the texture detector 10TX. A captured image output from the imaging element 101CM and a collected sound output from the microphone 102MC of the texture detector 10TX are inputted to the control circuit 120 of the extension function module 12 and are transmitted, as actual characteristic selection information, to the PC 3 via the wireless communication circuit 122.

Further, in the present example, the PC 3 identifies the hardness and the thickness of the core body 111 on the basis of the identification information ID2 supplied from the extension function module 12 and determines a line width and a line density. Also in the present example, a motion detection output generated by the information generation circuit 121 is not transmitted from the extension function module 12 to the PC 3. Therefore, in the present example, it is not necessary to provide the information generation circuit 121 to the extension function module 12.

The PC 3 receives the coordinate information on the tip end 111a of the core body 111 of the electronic stylus 1 acquired from the tablet 2, generates writing trace information, and generates information for displaying the generated writing trace so as to implement a writing trace on the input surface 2a of the material determined on the basis of a texture detection output of the texture detector 10TX received from the electronic stylus 1. In this case, since the PC 3 stores information regarding the correspondence table between texture detection outputs and materials of the input surface 2a, the PC 3 identifies the material of the input surface 2a corresponding to the received texture detection output, by using the correspondence table information. It is to be noted that, in the information for displaying the generated writing trace, pen pressure value information included in information acquired from the tablet 2 can be reflected, as in the above-described example.

In this case, texture detection outputs (a captured image output from the imaging element 101CM and a collected sound output from the microphone 102MC) vary according to the material of the input surface 2a of the tablet 2. Information regarding a correspondence table between different variation types of a texture detection output for respective materials of the input surface 2a of the tablet 2 and materials corresponding to the respective variation types is prepared in the server device 4. The PC 3 previously acquires and stores the correspondence table information from the server device 4 via the communication network 5, and identifies the material of the input surface 2a on the basis of a texture detection output extracted from the information received by the wireless communication circuit 312, by using the correspondence table information.

It is to be noted that a texture detection output may be either one of a captured image output from the imaging element 101CM and a collected sound output from the microphone 102MC.

In the above-described example, the material of the input surface 2a of the tablet 2 is identified from a captured image output from the imaging element 101CM and a collected sound output from the microphone 102MC, which are examples of texture detection outputs. However, a captured image output from the imaging element 101CM and a collected sound output from the microphone 102MC vary also according to the hardness and material of the core body 111. Therefore, a combination of a characteristic such as the material of the input surface 2a of the tablet 2 and a characteristic such as hardness or material of the core body 111 may be identified with respect to a texture detection output. In addition, in a case where a specific characteristic is fixedly determined as a characteristic such as the material of the input surface 2a of the tablet 2, a characteristic such as the hardness or material of the core body 111 may be identified with respect to a texture detection output. In either case, information regarding a correspondence table between a texture detection output and a characteristic value is prepared and used, as in the above-described example.

The PC 3 of the present example can display a writing trace in a display form including the writing blur of the electronic stylus 1 corresponding to the material of the input surface 2a or the hardness of the electronic stylus determined by the above-described actual characteristic selection information.

It is to be noted that the wireless communication circuit 122 of the extension function module 12 is used to transmit a texture detection output with the identification information ID2 to the PC 3 in the above-described examples, but the texture detection output is not necessarily transmitted via the wireless communication circuit 122 of the extension function module 12 if the texture detector 10TX includes a wireless communication circuit. In a configuration in which the identification information ID1 is acquired from the position detection module 11 and is used in place of the identification information ID2, it is not necessary to provide the extension function module 12 to the electronic stylus 1.

In all the above examples, the hardness of the core body and the like are identified from the identification information ID1 and ID2. Alternatively, the PC 3 may process a predetermined default value as hardness of the core body. In this case, the identification information is not required to identify the hardness and the like of the core body.

Figure 26:
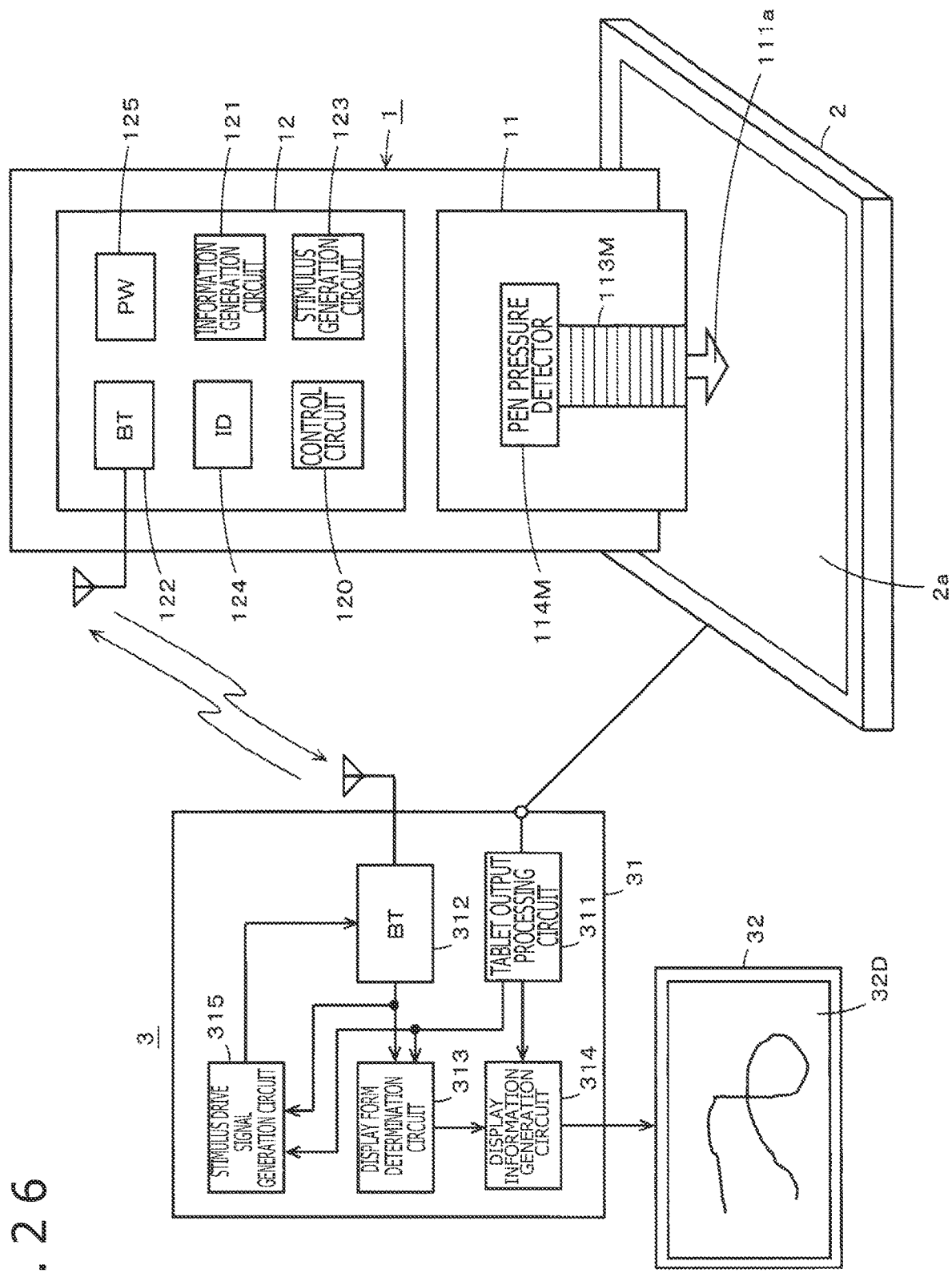
FIG. 26 is a diagram depicting another configuration example of the input system according to the embodiment of the present disclosure, the input system using the position indicator according to the embodiment of the present disclosure.

Processing Operation Example 2 of Input System; Giving Writing-Time Stimulus to User Processing Operation Example 2-1: Generating Stimulus Corresponding to Writing-Time Actual Characteristic Selection Information FIG. 26 is a block diagram for explaining the processing operation example 2 of the input system. In this example, not only the function for determining a writing trace display form in the processing operation example 1-1 of the input system, which has been explained with reference to FIGS. 22 to 25, but also a function for giving a writing-time stimulus to the user is provided. In FIG. 26, a part identical to that in FIG. 22 is denoted by the same reference symbol, and an explanation thereof will be omitted.

As depicted in FIG. 26, in the present example, in addition to the elements depicted in FIG. 22, the stimulus generation unit 123 is connected to the control circuit 120 in the extension function module 12 of the electronic stylus 1. In addition to the elements depicted in FIG. 22, a stimulus drive signal generation unit 315 is disposed in the PC 3.

The stimulus drive signal generation unit 315 of the PC 3 identifies the material of the input surface 2a on the basis of a motion detection output received via the wireless communication circuit 312 and pen pressure value information supplied from the tablet output processing unit 311 with reference to correspondence table information previously stored in the PC 3 in the above-described manner, and on the basis of the identified material of the input surface 2*a*, generates a sound drive signal for acoustically driving the loudspeaker 1231 and a vibration drive signal for driving the vibrator 1232 of the stimulus generation unit 123 of the electronic stylus 1. Then, the PC 3 transmits the generated sound drive signal and the generated vibration drive signal to the electronic stylus 1.

The extension function module 12 of the electronic stylus 1 of the present example acquires the sound drive signal and the vibration drive signal via the wireless communication circuit 122 and supplies the signals to the stimulus generation unit 123 to drive the loudspeaker 1231 and the vibrator 1232. The remaining operations are the same as those in the above-described example in FIG. 22.

Figure 27:
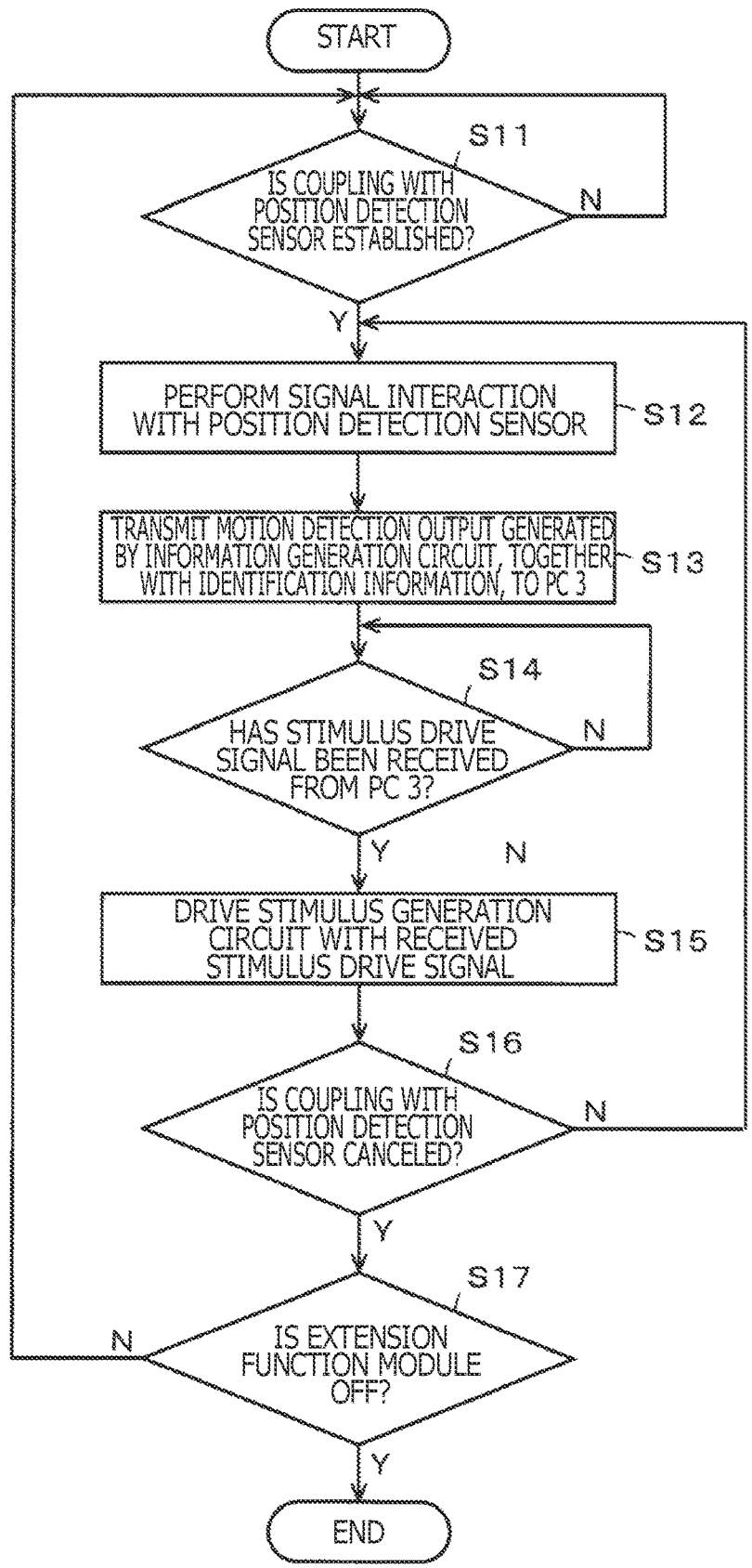
FIG. 27 is a flowchart for explaining a processing operation example in the other configuration example of the input system according to the embodiment of the present disclosure, the input system using the position indicator according to the embodiment of the present disclosure.

FIG. 27 depicts an example of the operation flow of the electronic stylus 1 of the present example. That is, the position detection module 11 of the electronic stylus 1 monitors electromagnetic induction coupling with the position detection sensor of the tablet 2 (S11). When the electromagnetic induction coupling is established, signal interaction between the position detection sensor and the position detection module 11 is performed through the electromagnetic induction coupling such that the coordinates of the position of the tip end 111*a* of the core body 111 on the tablet 2 can be detected (S12).

Then, the control circuit 120 of the extension function module 12 of the electronic stylus 1 transmits a motion detection output generated by the information generation unit 121, together with the identification information ID2 to the PC 3 via the wireless communication circuit 122 (S13).

Next, the control circuit 120 of the extension function module 12 monitors whether a stimulus drive signal is received from the PC 3 (S14). In the case where it is determined that the stimulus drive signal has been received, the loudspeaker 1231 and the vibrator 1232 of the stimulus generation unit 123 are driven with the received stimulus drive signal, so that a writing-input-time stimulus corresponding to the material of the input surface 2*a* is transmitted to the user (S15).

Next, the electronic stylus 1 determines whether or not the electromagnetic induction coupling between the position detection module 11 and the position detection sensor of the tablet 2 is canceled (S16). In the case where it is determined that the electromagnetic induction coupling is not canceled, the processing returns to S12, and the processing is repeated from S12.

In the case where it is determined, at S16, that the electromagnetic induction coupling between the position detection module 11 and the position detection sensor of the tablet 2 is canceled, whether or not the start switch is off and the extension function module 12 is off in the electronic stylus 1 is determined (S17). In the case where that it is determined that the start switch and the extension function module 12 are not off, the processing returns to S11, and the processing is repeated from S11.

Figure 28:
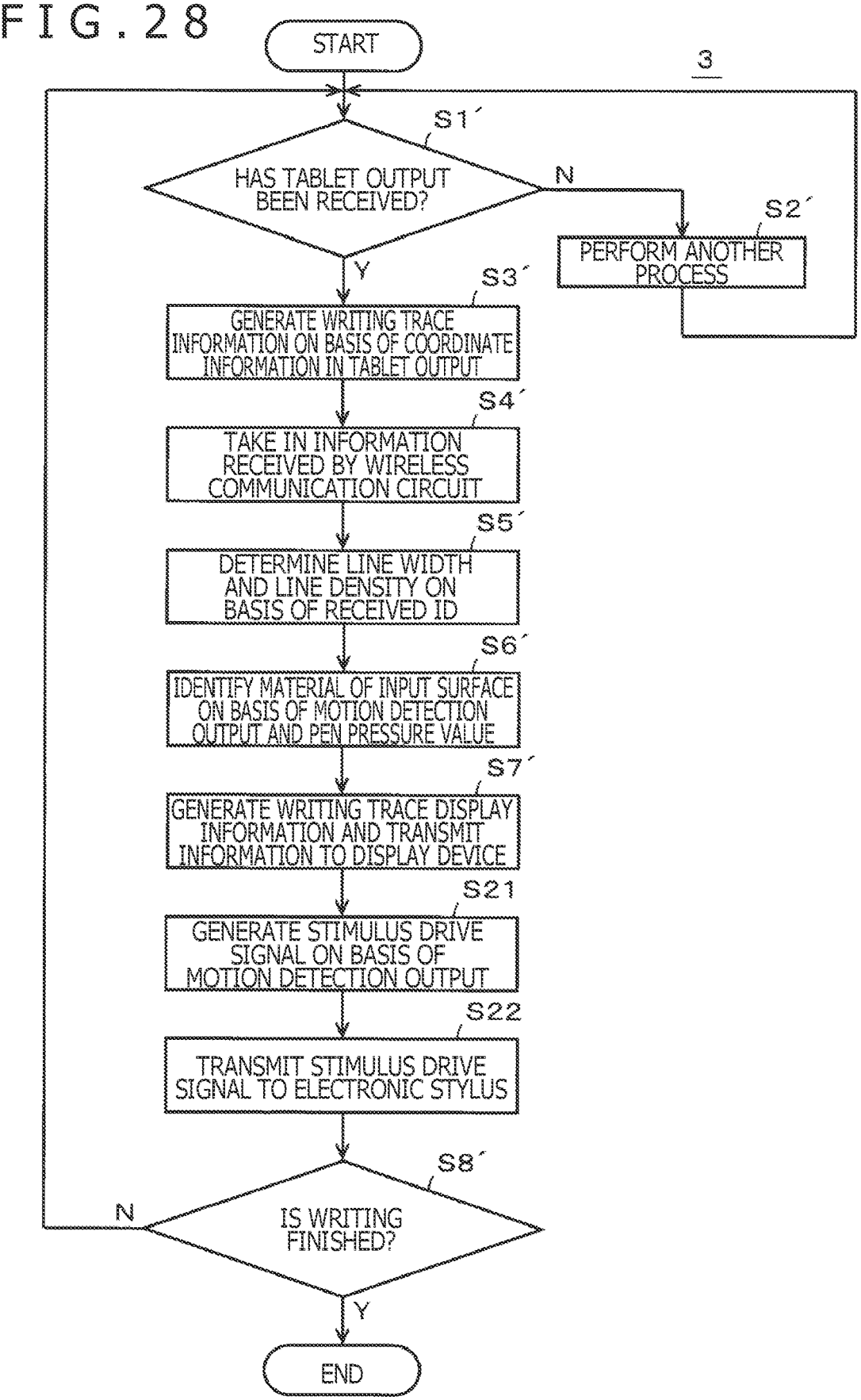
FIG. 28 is a flowchart for explaining a processing operation example in the other configuration example of the input system according to the embodiment of the present disclosure, the input system using the position indicator according to the embodiment of the present disclosure.

Next, FIG. 28 depicts an example of the processing operation flow in the PC 3 of the present example. S1' to S7' in FIG. 28 are identical to S1 to S7 in the flowchart in FIG. 23.

In the present example, after S7', the PC 3 identifies the material of the input surface 2*a* of the tablet 2 on the basis of the motion detection output received via the wireless communication circuit 312 and the pen pressure value information acquired from the tablet 2, and generates a stimulus drive signal for driving the loudspeaker 1231 and the vibrator 1232 of the extension function module 12 of the electronic stylus 1 on the basis of the identification (S21). Then, the generated stimulus drive signal is transmitted to the electronic stylus 1 via the wireless communication circuit 312 (S22).

Subsequent to S22, the PC 3 determines whether or not the writing is finished, on the basis of whether or not a tablet detection output is stopped for a predetermined time period or longer (S8'). In the case where it is determined at S8' that the writing is not finished, the processing returns to S1', and the PC 3 repeats the processing from S1'. In the case where it is determined at S8' that the writing is finished, the PC 3 ends the processing routine.

Accordingly, in the present example, the user of the electronic stylus 1 can receive, through the electronic stylus 1, a stimulus corresponding to the material of the input surface 2*a* when performing a writing input on the input surface 2*a* of the tablet 2.

Processing Operation Example 2-2: Generating Stimulus Based on Texture Detection Output from Texture Detector 10TX During Writing The electronic stylus 1 constituting the input system of the present example includes the texture detector 10TX, as in the above-described processing operation example 1-3. In the present example, a captured image output from the imaging element 101CM and a collected sound output from the microphone 102MC of the texture detector 10TX are inputted to the control circuit 120 of the extension function module 12. The extension function module 12 of the present example transmits, as actual characteristic selection information, the captured image output from the imaging element 101CM and the collected sound output from the microphone 102MC of the texture detector 10TX to the PC 3 via the wireless communication circuit 122. In the present example, the stimulus generation unit 123 is further disposed in the extension function module 12.

The PC 3 of the present example has the configuration similar to that in FIG. 26, and the operation thereof is similar to the processing operation example 1-3. However, the present example differs from the processing operation example 1-3 in that, in the present example, a texture detection output received from the electronic stylus 1 is used by the display form determination unit 313 to determine a display form of the writing trace, and also is used by the stimulus drive signal generation unit 315 to generate a stimulus drive signal. In the present example, the stimulus drive signal generated on the basis of texture by the stimulus drive signal generation unit 315 is transmitted to the electronic stylus 1 via the wireless communication circuit 312.

In the electronic stylus 1 of the present example, the control circuit 120 of the extension function module 12 supplies a stimulus drive signal received from the PC 3 via the wireless communication circuit 122, to the stimulus generation unit 123 to drive the loudspeaker 1231 and the vibrator 1232 in the same manner as that in the processing operation example 2-1 such that an acoustic stimulus and a vibration stimulus are given to the user of the electronic stylus 1.

Processing Operation Example 3 of Input System; Giving Writing-Time Stimulus to User by Virtual Experience

Processing Operation Example 3-1: Generating Stimulus Corresponding to Desired Characteristic Selection Information Supplied from Electronic Stylus 1

The extension function module 12 of the electronic stylus 1 constituting the input system of the present example includes the operation section 18 for designating desired characteristic selection information and the stimulus generation unit 123, which are similar to those in the processing operation example 1-2.

In the present example, through the rotational ring 18R which is an example of the operation section 18 for designating desired characteristic selection information on the electronic stylus 1, the user selectively designates a material of the input surface 2a in the same manner as that explained in the processing operation example 1-2. After receiving the selective designation, the extension function module 12 transmits, as desired characteristic selection information, information indicating the selectively designated material of the input surface 2a to the PC 3 via the wireless communication circuit 122.

The PC 3 identifies the material of the input surface 2a selectively designated by the user of the electronic stylus 1, on the basis of the desired characteristic selection information received from the electronic stylus 1, and generates writing trace display information so as to implement the writing trace on the input surface 2a of the identified material, as previously explained.

Further, in the present example, the PC 3 generates a stimulus drive signal for causing the stimulus generation unit 123 of the electronic stylus 1 to generate stimuluses (e.g., an acoustic stimulus and a vibration stimulus) that are expected to be perceived by the user if the user performs writing input with the electronic stylus 1 on the input surface 2a of the material determined by desired characteristic selection information, and transmits the stimulus drive signal to the electronic stylus 1.

The electronic stylus 1 receives the stimulus drive signal from the PC 3 and drives the loudspeaker 1231 and the vibrator 1232 of the stimulus generation unit 123 of the extension function module 12, in the same manner as that in the processing operation example 2-1. Accordingly, the acoustic stimulus and the vibration stimulus are given to the user.

The present example provides effects that a stimulus corresponding to the material of the input surface 2a selectively designated by the user of the electronic stylus 1 through the operation section on the electronic stylus 1, rather than a stimulus corresponding to the actual use state, can be given to the user, and that the user can perceive a virtual stimulus as if the user generated a writing trace on the input surface 2a of the selectively designated material.

It is to be noted that, as desired characteristic selection information, not the material of the input surface 2a but the hardness of the core body 111 may selectively be designated through the operation section, or both the hardness of the core body 111 and the material of the input surface 2a may selectively be designated through the operation section, as previously explained.

Processing Operation Example 3-2: Generating Experience Stimulus Under Condition Designated Through Application in PC 3

In the processing operation example 3-1, the operation section 18 disposed on the electronic stylus 1 for selectively designating desired characteristic selection information is used to select a characteristic such as hardness of the core body 111 or a characteristic such as the material of the input surface 2a. Alternatively, a characteristic such as the hardness of the core body 111 or a characteristic such as the material of the input surface 2a may be selected at the PC 3 side.

Figure 29:
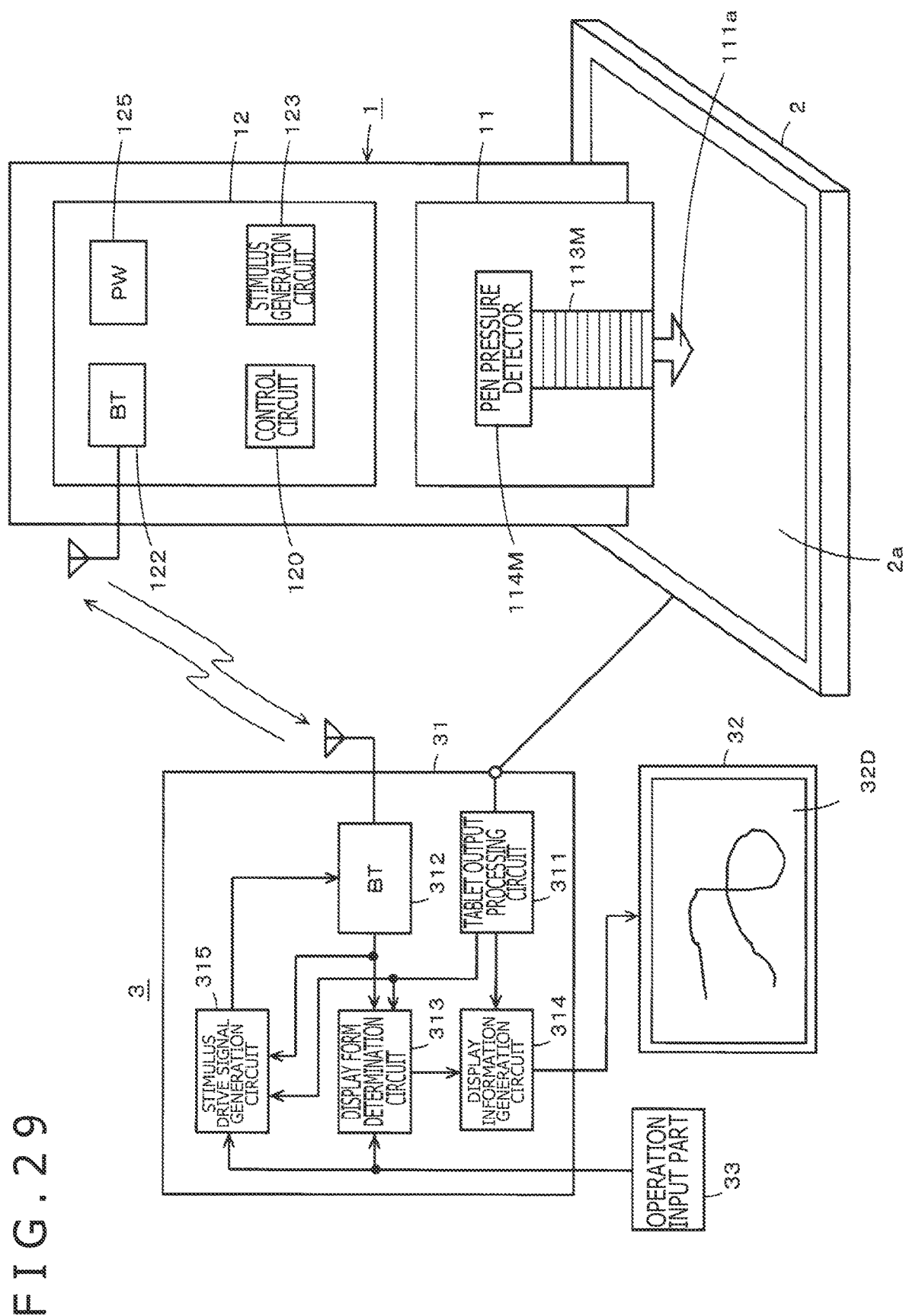
FIG. 29 is a diagram depicting a further configuration example of the input system according to the embodiment of the present disclosure, the input system using the position indicator according to the embodiment of the present disclosure.

FIG. 29 is a block diagram for explaining a configuration example of the input system in a case where the processing operation example 3-2 is executed.

In the electronic stylus 1 of the present example, the stimulus generation unit 123 is provided but the information generation unit 121 and the ID memory 124 are not provided to the extension function module 12 as depicted in FIG. 29. In the present example, the control circuit 120 of the extension function module 12 receives, via the wireless communication circuit 122, a stimulus drive signal transmitted from the PC 3 and supplies the stimulus drive signal to the stimulus generation unit 123 to generate an acoustic stimulus and a vibration stimulus to the user who is holding the electronic stylus 1.

The PC 3 of the present example includes an operation input part 33 for receiving a user operation input, as depicted in FIG. 29. The operation input part 33 includes a keyboard, a mouse pad, a touch panel, or the like.

In the PC 3 of the present example, a drawing software program (hereinafter, abbreviated as drawing software) for drawing a writing trace on the basis of coordinate information supplied from the tablet 2 has a function of receiving selective designation of a desired characteristic such as the hardness of the core body 111 of the electronic stylus 1 and a desired characteristic such as the material of the input surface 2a of the tablet 2, which are examples of desired characteristic selection information. Prior to position indication input (writing input) on the input surface 2a of the tablet 2 with the core body 111 of the electronic stylus 1, the user selectively designates a desired characteristic for the core body 111 of the electronic stylus 1 and a desired characteristic for the input surface 2a of the tablet 2 through the operation input part 33 by using the function of the drawing software.

The stimulus drive signal generation unit 315 of the PC 3 generates a stimulus drive signal corresponding to the selective designation and transmits the generated stimulus drive signal to the electronic stylus 1 via the wireless communication circuit 312. In the present example, the stimulus drive signal generation unit 315 of the PC 3 holds table information for generating a stimulus drive signal according to a selectively designated desired characteristic for the core body 111 of the electronic stylus 1 and a selectively designated desired characteristic for the input surface 2a of the tablet 2. The table information is previously acquired from the server device 4 via the communication network 5.

FIG. 30 is a diagram depicting one example of table information for generating a stimulus drive signal. In the present example, "B," "HB," "H," and "F" which are index signs of a core density/hardness of a pencil which is a writing tool are used as examples of a desired characteristic for the core body 111. For example, in FIG. 30, selection can be made from among the index signs "B," "HB," "2H," and "3H." In FIG. 30, selection can be made from among the materials "glass," "Kent paper," "drawing paper," and "Japanese paper" which are examples of a desired characteristic for the input surface 2a.

As is well known, the index sign "B" indicates that the density of the core is high and the core is soft, while the index sign "H" indicates that the density of the core is low and the core is hard. Further, a greater numerical value ("2B," "3B," . . . ) indicates a higher-density and softer core, while a greater numerical value ("2H," "3H," . . . ) indicates a lower-density and harder core. "HB" indicates density and hardness between "B" and "H." A pencil having a higher-density and softer core is thicker, and a pencil having a lower-density and harder core is thinner, as depicted above the index signs in FIG. 30.

Further, a surface state of the input surface 2a depends on the material. "Glass" provides a roughly smooth surface state. "Kent paper," "drawing paper," and "Japanese paper" provide respective irregular surface states, as depicted on the left side of the materials of the input surface 2a in FIG. 30.

For example, the table information prepared in the server device 4 is created in the following manner. That is, writing input with pencils having different core densities and hardness levels are actually performed on "glass," "Kent paper," "drawing paper," and "Japanese paper." Sound corresponding to the relation between the pencil core density/hardness and the material of the input surface 2a is generated, and vibration is transmitted to the user who is holding the pencil. The generated sound is collected by a microphone, and the vibration perceived by the user who is holding the pencil is detected by a motion sensor or the like.

From a sound signal of the sound collected by the microphone, an acoustic drive signal for acoustically driving the loudspeaker 1231 of the stimulus generation unit 123 of the electronic stylus 1 is generated. Alternatively, a sound signal of the sound collected by the microphone is directly used as an acoustic drive signal. Further, from a motion detection output from the motion sensor, a vibration drive signal for driving the vibrator 1232 of the stimulus generation unit 123 of the electronic stylus 1 is generated.

In this case, different acoustic drive signals SP1, SP2, . . . , and SP16 and different vibration drive signals VB1, VB2, . . . , and VB16 are generated for respective combinations of the pencil core density/hardness and the material of the input surface, as depicted in FIG. 30. As depicted in FIG. 30, stimulus drive signals each including a pair of an acoustic drive signal and a vibration drive signal are brought into correspondence with respective combinations of the pencil core density/hardness and the material of the input surface. Accordingly, the correspondence table is created.

Figure 31:
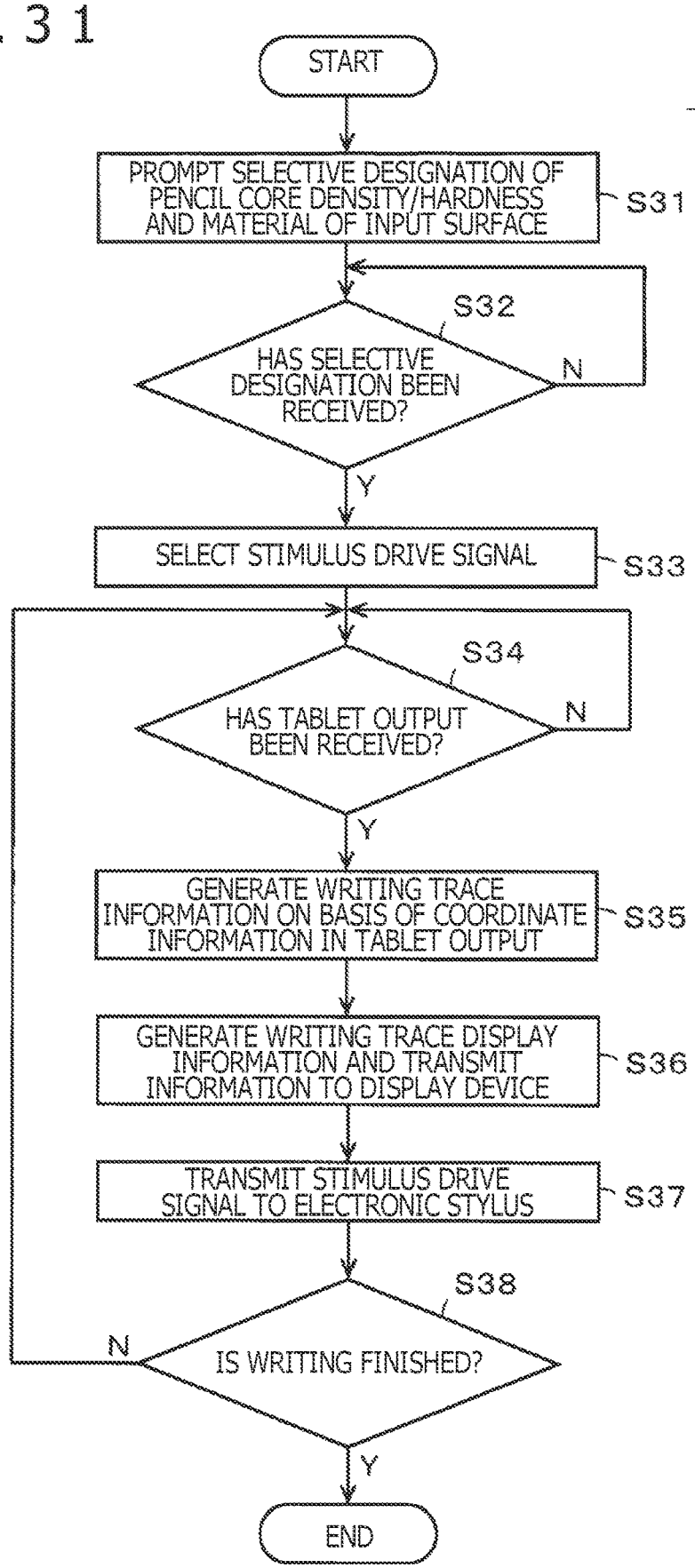
FIG. 31 is a flowchart for explaining a processing operation example in the further configuration example of the input system according to the embodiment of the present disclosure, the input system using the position indicator according to the embodiment of the present disclosure.

Next, a processing operation flow of the PC 3 of the present example will be explained with reference to a flowchart in FIG. 31.

Prior to processing a tablet output from the tablet 2, the PC 3 (hereinafter, a drawing application) provides notification of a message for prompting the user to selectively designate the material of the input surface 2a of the tablet 2 and the pencil core density/hardness which are information for selectively designating hardness and a line density of the core body 111 of the electronic stylus 1, to the user through the display screen 32D and/or by sound (S31).

Next, the PC 3 monitors whether selective designation of a pencil core density/hardness and a material of the input surface 2a of the tablet 2 has been received from the user through the operation input part 33 (S32). In the case where it is determined that the selective designation has been received, the PC 3 selects a stimulus drive signal including both an acoustic drive signal and a vibration drive signal, by checking the received pencil core density/hardness and the received material of the input surface 2a of the tablet 2 in the correspondence table in FIG. 30 (S33).

Next, the PC 3 waits for reception of a tablet output including both coordinate information and pen pressure value information from the tablet 2 (S34). In the case where it is determined that such a tablet output has been received, information regarding a writing trace is generated on the basis of the coordinate information in the tablet output (S35).

Next, on the basis of the information regarding the selected pencil core density/hardness and the selected material of the input surface 2a received at S32, the PC 3 generates information for displaying a writing trace as if writing with a pencil having the selected core density/hardness were performed on the input surface 2a of the selected material, and transmits the generated display information to the display device 32 to display the writing trace on the display screen 32D (S36). In this case, pen pressure value information extracted from a tablet detection output may normally be added to generate writing trace display information, or whether or not to add the pen pressure value information may be determined by the user.

Then, the PC 3 transmits the stimulus drive signal selected at S33 to the electronic stylus 1 via the wireless communication circuit 312 (S37). Pen pressure value information extracted from a tablet detection output is added to the stimulus drive signal to be transmitted to the electronic stylus 1 in this case. It is to be noted that whether or not to add the pen pressure value information may be determined by the user.

Subsequent to S37, the PC 3 determines whether or not the writing is finished, on the basis of whether or not the tablet detection output is stopped for a predetermined time period or longer (S38). In the case where it is determined at S38 that the writing is not finished, the processing is returned to S34, and the PC 3 repeats the processing from S34. In the case where it is determined at S38 that the writing is finished, the PC 3 ends the processing routine.

In the present example, a stimulus corresponding to the hardness/line density of the core body of the electronic stylus 1 and the material of the input surface 2a selectively designated in a drawing application by the user of the electronic stylus 1 through the operation section on the PC 3, rather than a stimulus corresponding to the actual use state, can be given to the user, and the user can perceive a virtual stimulus as if the user generated, on the input surface 2a of the material selectively designated through the PC 3, the writing trace by the hardness/line density of the core body 111 of the electronic stylus 1 selectively designated through the PC 3.

It is to be noted that nothing is transmitted from the extension function module 12 in the example in FIG. 29. However, the identification information ID2 stored in the ID memory 124 of the extension function module 12 may be transmitted to the PC 3 such that the line type (solid line, broken line, dot-and-dash line, for example) or line color of a writing trace can be selected at the PC 3 side according to the identification information ID2.

Moreover, the line type or line color of a writing trace may be selected at the PC 3 side according to the identification information ID2, not in accordance with the identification information supplied from the extension function module 12 but in accordance with the identification information ID1 supplied from the position detection module 11.

It is to be noted that, in the processing operation examples 2 and 3, the PC 3 is configured to transmit (return) a stimulus drive signal to only the electronic stylus 1 having transmitted actual characteristic selection information, desired characteristic selection information, or a texture detection output to the PC 3. Alternatively, the PC 3 may transmit the stimulus drive signal also to another electronic stylus such that a stimulus given to the electronic stylus 1 is also transmitted to a user of the other electronic stylus.

OTHER EMBODIMENTS AND MODIFICATIONS

In the above embodiment, only the feature in which the motion sensor is used for detecting motion of the core body of the electronic stylus on the input surface of the sensor during writing input. However, the motion sensor also can be used for detecting motion of the electronic stylus in a space separated from the input surface when the electronic stylus is shaken by the user back and forth, from side to side, in the axial direction, or to draw a predetermined shape such as a circle such that the PC 3 recognizes a predetermined processing operation that is predetermined for corresponding motion, and performs control to execute the processing operation.

In addition, the PC may be configured to recognize, as a user gesture, the above-described motion of the electronic stylus 1 and execute processing corresponding to the gesture.

It is to be noted that the position detection module 11 and the extension function module 12 are not limited to a configuration in which the position detection module 11 and the extension function module 12 are arranged side by side in the axial direction of the casing of the position indicator. For example, the position detection module 11 and the extension function module 12 may be arranged, on one end side of the axial direction of the casing of the position indicator, side by side in a direction intersecting the axial direction, or the extension function module 12 may be disposed in a ring-shaped region surrounding the position detection module 11.

The electronic stylus using a pen-shaped casing has been explained as an example of the position indicator. However, the position indicator is not limited to electronic styluses. A position indicator having a casing of any shape can be used.

In the above-described input system, the PC 3, which is an information processing device, is formed separately from the tablet 2. However, an apparatus (e.g., a tablet PC) having both the function of the PC 3 and the function of the tablet 2 may be provided.

It is to be noted that the characteristic selection information (actual characteristic selection information and desired characteristic selection information) generated by the extension function module 12 may be transmitted to the PC 3 via a wireless communication circuit that is disposed in the position detection module 11.

Alternatively, without disposing a wireless communication circuit in the position detection module 11, the characteristic selection information (actual characteristic selection information and desired characteristic selection information) generated by the extension function module 12 may be transmitted, together with a position detection signal supplied from the position detection module 11, to the tablet 2, and be transmitted from the tablet 2 to the PC 3. Therefore, in such a configuration in which characteristic selection information is transmitted from the electronic stylus 1 to the PC 3 through the tablet 2, particularly, the rotational ring 18R and the switch operation section 18S for selecting desired characteristic selection information may be disposed in connection with the position detection module 11 rather than the extension function module 12, and a section for detecting the state of selection made by the rotational ring 18R and the state of selection made by the switch operation section 18S may be disposed in the position detection module 11.

It is to be noted that, in the above-described electronic stylus which is an example of the position indicator, a position detection module and an extension function module are separately formed. However, it is not necessary to provide two separate modules as long as the electronic stylus has both the function of the position detection module and the function of the extension function module.

It is to be noted that the embodiment of the present disclosure is not limited to the foregoing embodiments, and that various changes can be made without departing from the spirit of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A position indicator that is used with a position detection device including a position detection sensor, the position indicator comprising:
   a first function module including a core body that, in operation, is brought into contact with an input surface for position detection in the position detection sensor, and a position detection signal transmission circuit that, in operation, transmits a position detection signal to the position detection sensor; and
   a second function module including a first function circuit that, in operation, generates characteristic selection information corresponding to a characteristic of the core body or a characteristic of the input surface and transmits the characteristic selection information to an outside of the position indicator, or a second function circuit that generates, in operation, a stimulus corresponding to the characteristic selection information such that a user who is holding the position indicator audibly or tactilely perceives the stimulus,
   wherein the first function module and the second function module are disposed in an axial direction of a casing,
   wherein a tip end of the core body of the first function module projects to the outside of the position indicator from an opening on a first end in the axial direction of the casing, and
   wherein the second function module is disposed on the first end in the axial direction of the casing and is attachable to and detachable from the casing.

2. The position indicator according to claim 1, wherein the stimulus corresponds to a state change that occurs in the position indicator during an input operation with the core body in contact with the input surface.

3. The position indicator according to claim 1, wherein the first function module and the second function module are integrally formed.

4. The position indicator according to claim 1, wherein the first function module and the second function module are formed separately from each other.

5. The position indicator according to claim 1, wherein the casing is formed from resin.

6. The position indicator according to claim 1, wherein the first function module excluding the core body and the second function module are embedded in an axial direction of a casing.

7. The position indicator according to claim 1, wherein the second function module is embedded in a casing.

8. A position indicator that is used with a position detection device including a position detection sensor, the position indicator comprising:
 a first function module including a core body that, in operation, is brought into contact with an input surface for position detection in the position detection sensor, and a position detection signal transmission circuit that, in operation, transmits a position detection signal to the position detection sensor; and
 a second function module including a first function circuit that, in operation, generates characteristic selection information corresponding to a characteristic of the core body or a characteristic of the input surface and transmits the characteristic selection information to an outside of the position indicator, or a second function circuit that generates, in operation, a stimulus corresponding to the characteristic selection information such that a user who is holding the position indicator audibly or tactilely perceives the stimulus,
 wherein a tip end of the core body projects to the outside of the position indicator from an opening on a first end in an axial direction of a casing, and
 wherein the second function module covers the first end in the axial direction of the casing and a second end opposite to the first end, and is attachable to and detachable from the first end and the second end in the axial direction of the casing.

9. The position indicator according to claim 8, further comprising:
 a start switch that, in operation, turns on and off an operation state of the second function module,
 wherein when the second function module is mounted to cover the second end in the axial direction of the casing, the start switch turns on the operation state of the second function module.

10. The position indicator according to claim 1, further comprising:
 a start switch that, in operation, turns on and off an operation state of the second function module, and
 the start switch is a press button switch that is disposed such that an operation state of the second function module is on during a position indication input in which the position detection signal is transmitted from the first function module to the position detection sensor.

11. A position indicator that is used with a position detection device including a position detection sensor, the position indicator comprising:
 a first function module including a core body that, in operation, is brought into contact with an input surface for position detection in the position detection sensor, and a position detection signal transmission circuit that, in operation, transmits a position detection signal to the position detection sensor; and
 a second function module including a first function circuit that, in operation, generates characteristic selection information corresponding to a characteristic of the core body or a characteristic of the input surface and transmits the characteristic selection information to an outside of the position indicator, or a second function circuit that generates, in operation, a stimulus corresponding to the characteristic selection information such that a user who is holding the position indicator audibly or tactilely perceives the stimulus,
 wherein the second function module is separate from a casing in which the first function module is disposed and which, in operation, is held by a first hand of the user, and the second function module, in operation, is held by a second hand of the user.

12. The position indicator according to claim 11, wherein the stimulus corresponds to a state change that occurs in the position indicator during an input operation with the core body in contact with the input surface.

13. The position indicator according to claim 11, further comprising:
 a start switch that, in operation, turns on and off an operation state of the second function module.

14. The position indicator according to claim 13, wherein the start switch is a press button switch that is disposed such that an operation state of the second function module is on during a position indication input in which the position detection signal is transmitted from the first function module to the position detection sensor.

15. The position indicator according to claim 8, wherein the stimulus corresponds to a state change that occurs in the position indicator during an input operation with the core body in contact with the input surface.

16. The position indicator according to claim 8, further comprising:
 a start switch that, in operation, turns on and off an operation state of the second function module,
 wherein when the second function module is mounted to cover the second end in the axial direction of the casing, the start switch turns on the operation state of the second function module.

17. The position indicator according to claim 8, further comprising:
 a start switch that, in operation, turns on and off an operation state of the second function module, and
 the start switch is a press button switch that is disposed such that an operation state of the second function module is on during a position indication input in which the position detection signal is transmitted from the first function module to the position detection sensor.

* * * * *